United States Patent
Chiles et al.

(10) Patent No.: US 6,618,393 B1
(45) Date of Patent: Sep. 9, 2003

(54) METHOD AND APPARATUS FOR TRANSPARENT SUPPORT OF NETWORK PROTOCOLS WITH HEADER TRANSLATION

(75) Inventors: David C. Chiles, Mitchellville, MD (US); Brenda Whitehurst, Laytonsville, MD (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/140,363

(22) Filed: Aug. 26, 1998

(51) Int. Cl.[7] .................................................. H04J 3/16
(52) U.S. Cl. ..................... 370/466; 370/395.5; 370/389
(58) Field of Search ............................... 370/466, 465, 370/464, 467, 468, 469, 470, 471, 474, 475, 395.1, 392, 395.5, 395.52, 395.53, 400, 401, 351, 352, 353–357, 389

(56) References Cited

U.S. PATENT DOCUMENTS

| | | | |
|---|---|---|---|
| 5,446,736 A | | 8/1995 | Gleeson et al. .......... 370/85.13 |
| 5,651,002 A | | 7/1997 | Van Seters et al. ......... 370/392 |
| 5,657,452 A | | 8/1997 | Kralowetz et al. ...... 395/200.57 |
| 5,666,362 A | * | 9/1997 | Chen et al. ................. 370/420 |
| 5,732,081 A | | 3/1998 | Grenot et al. ............... 370/392 |
| 5,742,762 A | * | 4/1998 | Scholl et al. ............... 709/200 |
| 5,768,525 A | * | 6/1998 | Kralowetz et al. ......... 709/228 |
| 5,905,781 A | * | 5/1999 | McHale et al. ........... 379/93.14 |
| 6,418,324 B1 | * | 7/2002 | Doviak et al. .............. 455/556 |

FOREIGN PATENT DOCUMENTS

EP 0652668 A2 5/1995

OTHER PUBLICATIONS

George E. Conant, "Multilink PPP: One Big Virtual WAN Pipe", Data Communications, Sep. 21, 1995, pp. 85–90.

Patent Application of David C. Chiles, et al., Ser. No. 09/177,438, filed Oct. 21, 1998.

RFC 1661 The Point–to–Point Protocol, W.Simpson, ed, (Jul. 1994).

RFC 1662 PPP in HDLC–like framing, W.Simpson, ed., (Jul. 1994).

RFC 1144 Compressing TCP/IP Headers for Low–Speed Serial Links, V. Jacobson (Feb. 1990).

RFC 1332 The PPP Internet Protocol Control Protocol (IPCP), G. McGregor (May 1992).

RFC 1552 the PPP Internetwork Packet Exchange Control Protocol (IPXCP), W. Simpson, (Dec. 1993).

RFC 1570 PPP LCP Extensions, W. Simpson, (Jan. 1994).

RFC 1334 PPP Authentication Protocols, B. Lloyed, (Oct. 1992).

RFC 1717 The PPP Multilink Protocol (MP), K. Sklower, B. Lloyed, G. McGregor, D. Carr, (Nov. 1994).

RFC 1618 PPP over ISDN, W. Simpson, (May 1994).

RFC 1483 Multiprotocol Encapsulation over ATM Adaptation Layer 5 Juha Heinanen, (Jul. 1993).

* cited by examiner

Primary Examiner—Douglas Olms
Assistant Examiner—Brian Nguyen
(74) Attorney, Agent, or Firm—McDonnell Boehnen Hulbert & Berghoff

(57) ABSTRACT

Methods and apparatus for permitting a host system such as a general-purpose computer to communicate over a network with a remote peer where the host system does not provide native network protocol support for protocols required by the network elements, such as a remote router or bridge. Such protocol support is provided by spoofing modules that emulate a network protocol negotiation between the host system and the remote router and perform packet header translation between the headers supported by the host system (e.g., PPP), and the headers supported by the network, such as RFC 1483.

12 Claims, 4 Drawing Sheets

METHOD AND APPARATUS FOR TRANSPARENT SUPPORT OF NETWORK PROTOCOLS WITH HEADER TRANSLATION

BACKGROUND OF THE INVENTION

A. Field of the Invention

This invention relates to the field of telecommunication and more particularly to methods for providing support of network protocols for a host system (such as a general-purpose computer) in a transparent manner such that the host system can communicate with a peer over a network where the host system lacks native support for the protocols required by the network's routers. For example, the invention provides wide area network access for a host system via asynchronous transfer mode over asynchronous digital subscriber line service, where the host system does not have native support for the RFC 1438 protocol used by the network, and only supports the Point-to-Point Protocol.

B. Description of Related Art and Advantages of the Invention

In order for two computers or other items of digital communications equipment to exchange data over a communications medium such as a wide area computer network, both computers have to transmit and receive data in accordance with a set of standards or procedures. These standards or procedures are known as "protocols". As an example, a protocol may assign or designate specific bytes in a packet of data for containing certain information related to the transmission, such as the length of the data, address information, and control characters. Without such protocols, data would be unintelligible to the receiving computer and communication would not be possible. The establishment of protocols enables diverse equipment manufacturers to supply hardware to the public and build computer networks (such as the Internet), with the hardware and networks generally interoperable with equipment of other manufacturers.

The communication industry has standards bodies that formally adopt protocols. Other protocols are "de facto" industry standards, in that the early manufacturers adopt them and other companies selling similar equipment use the same techniques in order to be compatible. As technology advances new standards or protocols are proposed by people working in the industry, typically in the form of a "Request for Comment" document, also referred to in the art as an RFC. Persons skilled in the art are familiar with the RFC's.

The Point-to-Point Protocol, also known as the PPP, is a network level protocol in wide usage today that enables general-purpose computers to communicate over certain packet switched networks. Persons skilled in the art are familiar with the PPP and the several RFCs describing this protocol and various features and implementations thereof.

Over the last few years, new and faster networks have become available for connecting computers together over a local or wide area. Access to such networks to the general public from their personal computer is now becoming available. One example is wide area network access via Asynchronous Transfer Mode (ATM) over Asynchronous Digital Subscriber Line (ADSL) service.

Companies such as 3Com Corporation, the assignee of the present invention, provide products to provide such access for host computer systems, such as general-purpose computers running a Windows® operating system from Microsoft Corporation. These products can take the form of adapter cards for a computer chassis, and external devices that plug into a port on the computer. Typically, the network routers use a special protocol for encapsulating lower lever protocols when providing wide area network access using ATM over ADSL. This protocol is described in RFC 1483 "MultiProtocol Encapsulation over ATM Adaptation Layer 5", by J. Heinanen, July 1993. The RFC 1483 document is fully incorporated by reference herein.

The situation may arise wherein the host computer system only supports the transport of PPP traffic across wide area network devices. In other words, the communications software installed in the host computer system and in the network elements (such as routers) provide or enable the communications protocols in the PPP suite of protocols. If the host computer system were to try to communicate with a remote peer on a wide area network in which the network routers do not support PPP and instead only supported the RFC 1483 protocol, for example in a network providing wide area network access via ATM over ADSL, an incompatible situation would result. PPP and RFC 1483 are mutually incompatible.

The present invention solves this problem. The present invention provides a method and apparatus by which a host system, which only provides support for one protocol (such as PPP), can support network traffic in accordance with a second incompatible network protocol, such as RFC 1483 wide area network support.

U.S. Pat. Nos. 5,768,525 and 5,657,452, both awarded to Joseph D. Kralowetz and Douglas F. Ortega and assigned to the assignee of the present invention, describe a technique for providing transparent support of network protocols that enables two computers to communicate over a network. The technique uses a proxy engine to negotiate parameters and provide support for protocols that are enabled by the remote computer but not enabled by the host system. The present invention represents improvements to the technique of the above patents.

SUMMARY OF THE INVENTION

In one aspect of the invention, a method is provided for supporting network protocols for a host source of data at one end of a network. An example of the host source or system is a general-purpose computer. The host transmits data to and receives data from a remote peer at another point in the network.

The method involves a first step of emulating a negotiation of a first network protocol between the host source of data and a remote router in a network connecting the host source and the remote peer. The first network protocol is supported by the host but is not supported by routers in the network. For example, the first network protocol that is negotiated with the host source may be the Point-to-Point Protocol.

The method continues with a second step of translating or converting headers of data packets transmitted between the host source of data and the remote peer. For transmission of data from the host source to the remote peer, the step of translating headers comprising the step of translating a header associated with the first network protocol (e.g., PPP) into a header associated with a second network protocol, such as the RFC 1483 protocol. The second network protocol is supported by network routers but is not supported by the host source of data. The network traffic with the RFC 1483 header is then delivered to a driver for placement on the network and transmitted to the remote peer.

Note that while the host system has no native support for the second network protocol, the support is provided by the invention. In a representative preferred embodiment, a communications software structure in accordance with the invention, referred to herein as a spoofing module, essentially "spoofs" the host system and provides that support for it. The support is provided by an emulation of the negotiation of the first network protocol and providing the translation of packet headers from the first protocol to the other. This spoofing module consists of two separate functions or modules, one module for protocol negotiation and the other for packet header translation.

The reverse header translation process is preformed for data that is received as network traffic from the remote peer. In particular, the method involves the step of translating a header associated with the second network protocol, e.g., RFC 1483, into a header associated with the first network protocol, e.g., PPP. The translation module then delivers the transport data with the valid PPP header to a transport layer processing module in the host system for processing.

As a result of this technique, a host system that only supports the first network protocol over a wide area network, such as PPP, is able to function in an network that has routers that only support a second, incompatible, network protocol such as RFC 1483. This invention allows the owners of the host systems to take advantage of the new networking technologies in an efficient manner.

In another aspect of the invention, the step of emulating the negotiation of the first network protocol is performed by a spoofing module associated with the host system and wherein the method further comprises the step of providing user-defined configuration parameters permitting the spoofing module to negotiate control protocols between the host and the routers on the network that only support the second network protocol. These user-defined parameters may be stored in memory in a file in the host system. The user defined configuration parameters may include such features as remote and local Internet Protocol addresses, primary and secondary DNS addresses, Internet Packet Exchange (IPX) addresses, and IPX node numbers. These configuration parameters allow the emulator to negotiate the Link Control Protocol (LCP), Internet Protocol Control Protocol (IPCP) and Internet Packet Exchange Control Protocol (IPXCP). The packet translation module may use the negotiation of such lower level protocols when translating packet headers between the first and second network protocols.

There are a number of ways in which the above method may be practiced. In a representative preferred embodiment, the host system is a general-purpose computer running a Windows® operating system from Microsoft Corporation, such as Windows 95 or Windows NT. The operating system typically incorporates communications software for enabling the host system to communicate over a wide area network, and thus includes modules or "stacks" for the network layer protocols, e.g., PPP, and transport layer protocols, such as TCP/IP. When the user buys an adapter card or external module to communicate over a new type of network, such as an adapter card providing wide area network access over ATM and ADSL, the vendor of the adapter card provides a computer readable storage medium, such as an installation disk or CD ROM, containing a software program that is loaded into the host system when the device is used the first time. This software program includes a "spoofing" routine or module with two separate modules: a PPP negotiation module for conducing the PPP negotiation session between the host system and the remote peer, and a packet header translation module for converting headers for network traffic from one protocol to the other, as described herein.

Accordingly, one possible form of the invention is a computer-readable storage medium containing a set of instructions for a general-purpose computer to perform the support for network protocols in accordance with the methods described herein. Another form or embodiment of the invention is an operating system for a general-purpose computer or other type of processor (such as may be found in an element of a network, such as a bridge or router), that performs emulation of a network level protocol negotiation and translation of packet headers from one form to another. Yet another embodiment of the invention consists of a general-purpose computer connected to a network that contains a communications program for providing the network protocol support in accordance with the methods described herein.

These and many other advantages and features of the invention will be described in greater detail in the following detailed description of a presently preferred embodiment.

DETAILED DESCRIPTION OF THE PREFERRED EMBODIMENT

Figure 1:
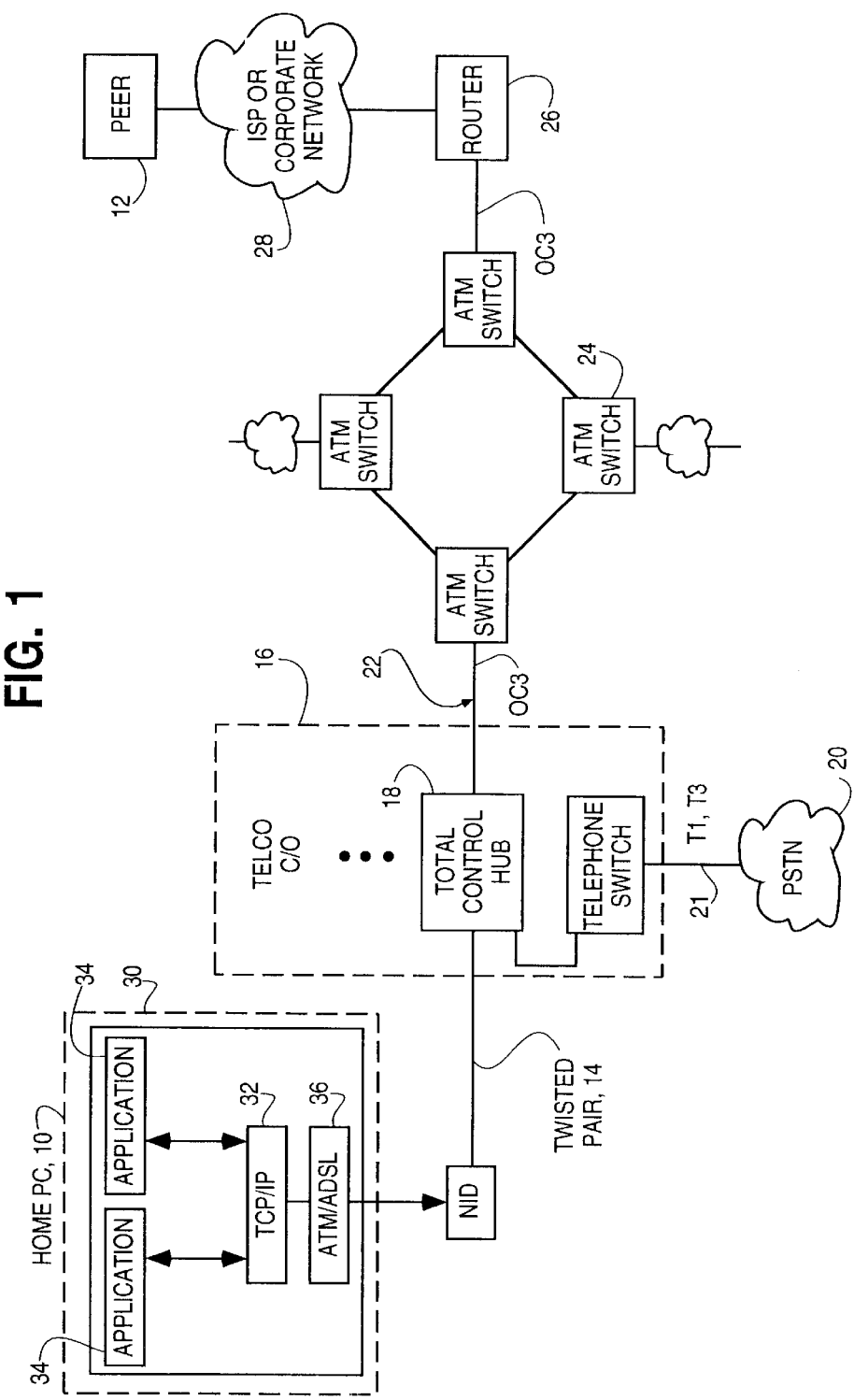
FIG. 1 is an illustration of an environment in which the invention may be practiced, in which a host system comprising a personal computer running a Windows operating system communicates with another computer over an ATM network.

Referring now to FIG. 1, an overview of one representative environment in which the invention may be practiced is shown in a schematic form. A host system comprising a general-purpose computer 10 or PC is shown communicating with a peer 12 over communication path comprising, from left to right, a twisted pair copper wire 14 connected to a telephone company central office 16, and networks 22 and 28. The central office 16 includes a network access server or chassis 18 that receives data communications from the personal computer 10 and other devices via the public switched telephone network 20 and high speed T1 or T3 digital telephone lines 21. The chassis 18 is connected on the other side to a high speed digital network such as a fiber optic OC3 Asynchronous Transfer Mode network 22. The ATM network 22 includes various ATM switches 24, one of which is connected via OC3 network and a router 26 to an Internet Service Provider (ISP) network or corporate backbone network 28. In the present example, peer 12 is another general-purpose computer on the network 28.

The communications chassis 18 that interfaced between the line 14 and the PSTN network 20 and the ATM network 22 is a device known in the art as a remote access server or RAS, also sometimes referred to as a network access server. Such devices are currently available from several companies, for example the Total Control™ Enterprise Network Hub from 3Com Corporation.

The host system 10 includes an operating system or other software that provides communications functionality to allow the host system 10 to have wide area network access. At the present time, the Windows 95 and Windows NT programs provide software modules to perform some protocol processing, for example PPP and TCP/IP stacks, for enabling data from various applications programs 34 to be transmitted onto the line 14 for distribution to the remote peer 12. Where the host system 10 does not provide native support for protocols required by routers 26 or other communications elements for transmission on the ATM network 22 (e.g., RFC 1483), such as where such protocols are not supported by the operating system 30, a potential incompatibility arises. For example, if router 26 (or other elements in network 22) uses RFC 1483 for multiprotocol encapsulation and does not support PPP, then data sent from the peer 12 and arriving at host system 10 via network interface device NID would have RFC 1483 headers. If the operating system 30 at the host system does not provide support for RFC 1483 and just supports PPP, communication between host system 10 and remote peer 12 would not be possible. The present invention solves this problem.

In one representative embodiment, the host system 10 includes an ATM over ADSL adapter card 36 built into the host system which provides the required processing of data in order to take advantage of the high speed communication features of ADSL. When the user installs the adapter card 36, they also use an installation disk that contains software routines, set forth below, that become integrated into the operating system 30 and perform the packet header translation and emulate a PPP negotiation session between the router 26 and the host system 10. This allows the user to successfully communicate between the host 10 and the remote peer 12 over network 22. ATM over ADSL adapter cards and external devices are now commercially available, such as from 3Com Corporation.

Figure 2:
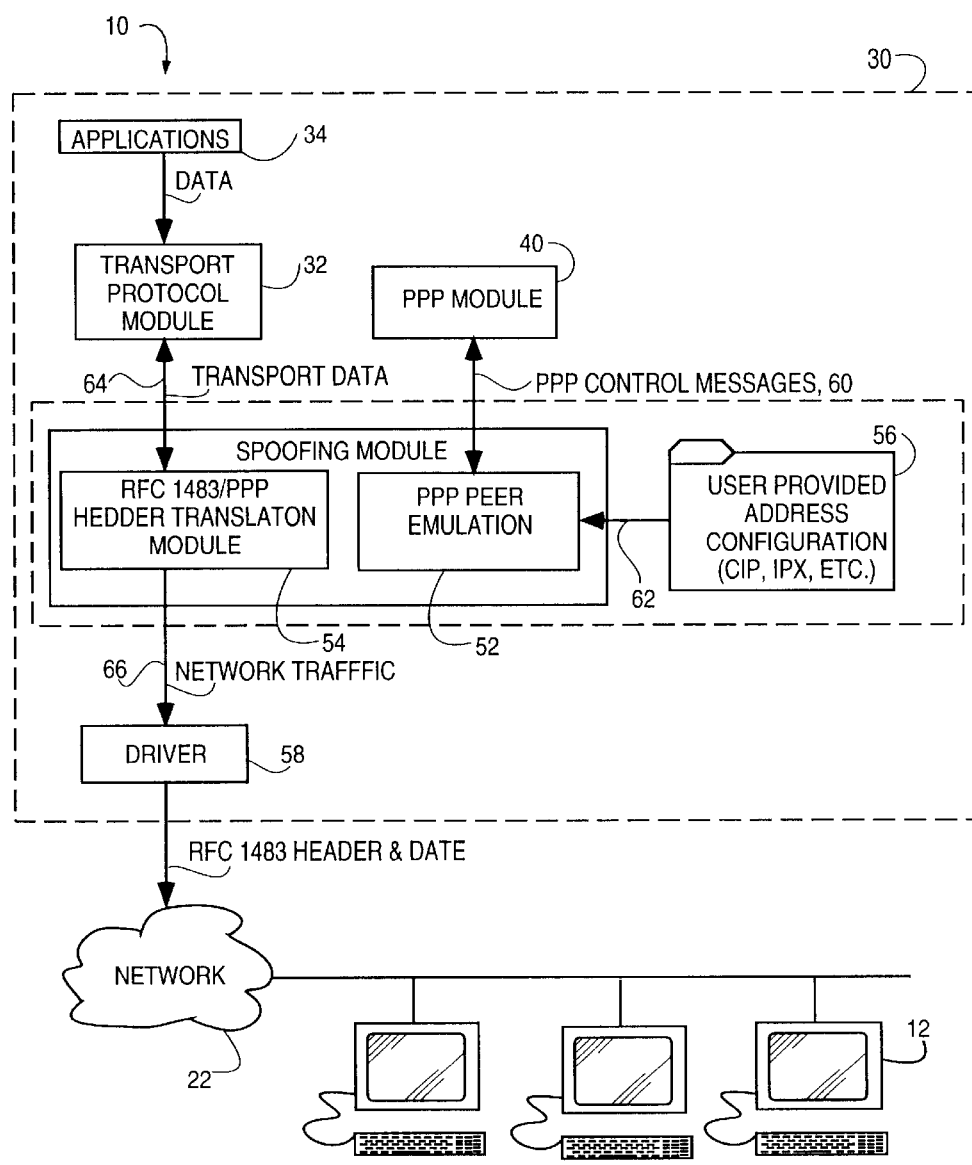
FIG. 2 is a schematic illustration of the computer software modules running in the host system that perform the PPP peer emulation negotiation and packet header translation functions in accordance with the invention.

FIG. 2 is a more detailed schematic diagram of the software modules that are provided with the present invention and the methods by which they operate. As noted earlier, the operating system 30 supports applications programs 34 (the details of which are unimportant), which generate data to be transmitted to the remote peer 12. The operating system includes a transport protocol module 32. An example of the transport protocol module is a TCP/IP protocol stack provided in current versions of the Microsoft Corporation Windows® operating system. Other vendors of communications software in the industry provide transport protocol modules or stacks, so the invention is of course not limited to a general-purpose computer operating system environment. The transport support protocol module 32 performs certain processing in accordance with TCP/IP protocols and transmits data to a spoofing module 50. The operating system also provides a PPP module 40 for performing PPP protocol processing. Again, in the illustrated embodiment the PPP module 40 is integrated into the operating system 30 but is also available as a communications software product from various companies in the industry if the invention is practiced in other environments.

The spoofing module 50 performs two primary functions: (1) it contains a PPP peer emulation module 52 that is used to negotiate a PPP session with the PPP module 40. The module 52 mimics or imitates the remote router 26 by using user-provided address configuration and other information associated with the router 26 in the network 22 and stored as a file 56 in memory in the host system. This example assumes that the network routers in the ATM network 22 do not support PPP. This user defined configuration information for the router 26 in the network 22, which is stored in the file 56, can be obtained from the user by a menu-driven interactive program on a graphical user interface for the host system or loaded into memory by some other suitable means, such as from the installation disk, or loaded in by the user from an instruction sheet from an Internet Service Provider or telephone service company.

The spoofing module 50 also includes a packet header translation module 54. The module 54 translates headers of packets containing network traffic or transport data from the transport module 32 between PPP and RFC 1483 formats. For transmission of data from the host source of data to the remote peer, the module 54 translates a header associated with a first network protocol supported by the host system 10 (e.g., PPP) into a header associated with a second network protocol supported by the routers in the network 22 but not supported by the host system, such as RFC 1483. For receipt of data from the remote peer 12 destined for the host 10, the module 54 translates a header associated with the second network protocol into a header associated with the first network protocol.

The host system 10 further includes a driver module 58 that performs low level processing of protocols and signal conversions associated with the communications medium connected to the host system. The driver module software may be resident in the operating system, or resident in the adapter card or other device that is used to couple the host system to the two-wire line 14 in FIG. 1. The data from the driver module 58 includes the underlying data formatted with RFC 1483 headers supported by the routers and other devices in the network 22.

In operation, the PPP module 40 starts a PPP negotiation session with what it thinks is the router 26 in the network 22. Inside, router 26 is emulated by the PPP peer emulation module 52, since the router 26 does not support PPP. Negotiation is done through the exchange of PPP control messages 60. The PPP peer emulation module 52 then uses the user defined parameters in the file 56 to complete its spoofing via the interface 62 between the file 56 and the module 52. The user defined configuration in the file 56 used by the PPP peer emulation module 52 consists of remote and local Internet Protocol (IP) addresses, primary and secondary Domain Naming System (DNS) addresses, IPX network address and IPX remote node number. These configuration parameters allow the PPP peer emulation module 52 to negotiate control protocols with the host PPP module 40, including the Link Control Protocol (LCP), Internet Protocol Control Protocol (IPCP) and the Internet Protocol Exchange Control Protocol (IPXCP).

After the PPP peer emulation is performed, the transport protocol module 32 may send and receive data indicated by 64. The module 32 sends data packets with a PPP header and must receive packets with a PPP header. In the environment of the invention illustrated in FIGS. 1 and 2, the network traffic 66 must be sent with an RFC 1483 header and be received with and RFC 1483 header, due to, for example the protocols used by network 22 equipment, e.g., router 26. Therefore, a header translation function is performed in the header translation module 54.

For transmitted data, the transport module 32 sends PPP traffic 64 to the spoofing module 50. The translation module 54 strips off the PPP header and replaces it with an applicable RFC 1483 header. Both headers (PPP and RFC 1483) differ based on protocol (e.g., IP or IPX). Network traffic 66 is then sent with a valid RFC 1483 header to the driver 58 for transmission to the remote peer 12 via network 22.

For received data, the network traffic 66 is received with an RFC 1483 header. Translation module 54 replaces the RFC header with a valid PPP header and delivers the transport data 63 to the transport module 32 with a valid PPP header for processing by the host system 10.

The system of FIGS. 1 and 2 allows the user to select different remote peer entities to connect with. Multiple endpoint configurations can be stored in multiple files 56, one for each remote peer. This configuration information can be placed in memory in the host system by any convenient means, such as by a program presenting menu screens on the graphical user interface and prompting the user to enter the connection information. Other methods can be used, such a downloading the file from a disk or from an on-line server.

We have thus described a method of providing support for network protocols for a host source of data 10 at one end of a network 22, the host source of data communicating with a remote peer at another point in the network, comprising the steps of:

(a) emulating a negotiation of a first network protocol (e.g., PPP) between the host source of data and a router on the network 22, as indicated by module 52, wherein the first network protocol is supported by the host source of data 10 but is not supported by the router 26 on the network 22; and (b) translating headers of data packets transmitted between the host source of data and the peer on the network, as indicated by module 54; the step of translating headers comprising the steps of:

(1) for transmission of data from the host source of data to the remote peer, translating a header associated with the first network protocol into a header associated with a second network protocol, e.g., RFC 1483, wherein the second network protocol is supported by the network 22 (e.g., the router 26) but is not supported by the host 10; and (2) for receipt of data from the remote peer destined for the host, translating a header associated with the second network protocol into a header associated with the first network protocol.

The second network protocol preferably comprises a network protocol associated with an asynchronous mode of data transmission, for example ATM. In the present example, the second protocol, RFC 1483, relates to multi-protocol encapsulation over ATM adaptation layer 5, which is associated with ATM over ADSL. It will be readily apparent to persons skilled in the art that other protocols could be used.

In another aspect of the invention, a system 30 (FIG. 2) provides network protocol support for a host system 10. The system includes a network protocol module 40 for negotiating a network protocol with a remote router, a transport protocol module 32 for exchanging data between the host 10 and the network 22, and a spoofing module 50. The spoofing module 50 includes a network protocol emulation module 52 exchanging control messages associated with a first network protocol such as PPP with the network protocol module 40 to thereby emulate protocol negotiation between the host system and a remote router 26. The spoofing module 50 further includes a header translation module 54 translating headers of packets associated with the first network protocol into headers associated with a second network protocol.

The system further includes a driver module 58 responsive to the header translation module 54 receiving packets of data with headers associated with the second network protocol and forwarding the packets onto a network 22 for distribution to the remote peer 12.

As noted earlier, in one possible embodiment of the invention, an adapter module or card, or external device, with an ATM over ADSL interface may be supplied to the user operating the host system. The adapter card or external device is preferably provided to the customer with a computer-readable storage medium containing a set of instructions configuring the host system or computing platform to perform the PPP emulation and header translation features described herein.

In a preferred embodiment the host system comprises a general-purpose computer operated by a Windows operating system of Microsoft Corporation. In this embodiment, the spoofing module 50 is essentially downloaded from the disk and integrated with the operating system run on the general-purpose computer to emulate the PPP negotiation with the remote router and to perform the packet header translation.

In an alternative embodiment, the host system comprises a computing platform integrated into a communications hardware interfacing with the network, such as a network router, bridge or network access server.

In another aspect of the invention, an improvement is provided to an operating system for a general-purpose computer. The general-purpose computer 10 interfaces with a network 22 supporting communications in accordance with a first network protocol (e.g., PPP), but the operating system does not support a second network protocol (e.g., RFC 1483).

The improvement to the operating system comprises a spoofing module 50 comprising (1) a network protocol emulation module 52 for exchanging control messages associated with the first network protocol with a network protocol module 40 implemented by the operating system to thereby emulate protocol negotiation between the general-purpose computer and a remote router; and (2) a header translation module 54 for translating headers of packets associated with the first network protocol into headers associated with the second network protocol and vice versa. Further, a driver module 58 is provided that is responsive to the header translation module 54 receiving packets of data with headers associated with the second network protocol and forwarding the packets onto the network 22 for transmission to the remote peer.

In a preferred embodiment, the operating system further comprises a routine displaying information on a graphical user interface for the general-purpose computer 10 for enabling a user to enter internet protocol and address configuration parameters 56 into the general-purpose computer and a memory storing the parameters for use by the emulation module 52. The routine is preferably loaded onto the installation disk that includes the spoofing module 50, and transported into the operating system. Persons skilled in the art can readily code such a graphical user interface routine using known I/O control tools supplied by the vendor of the operating system.

Figure 3A:
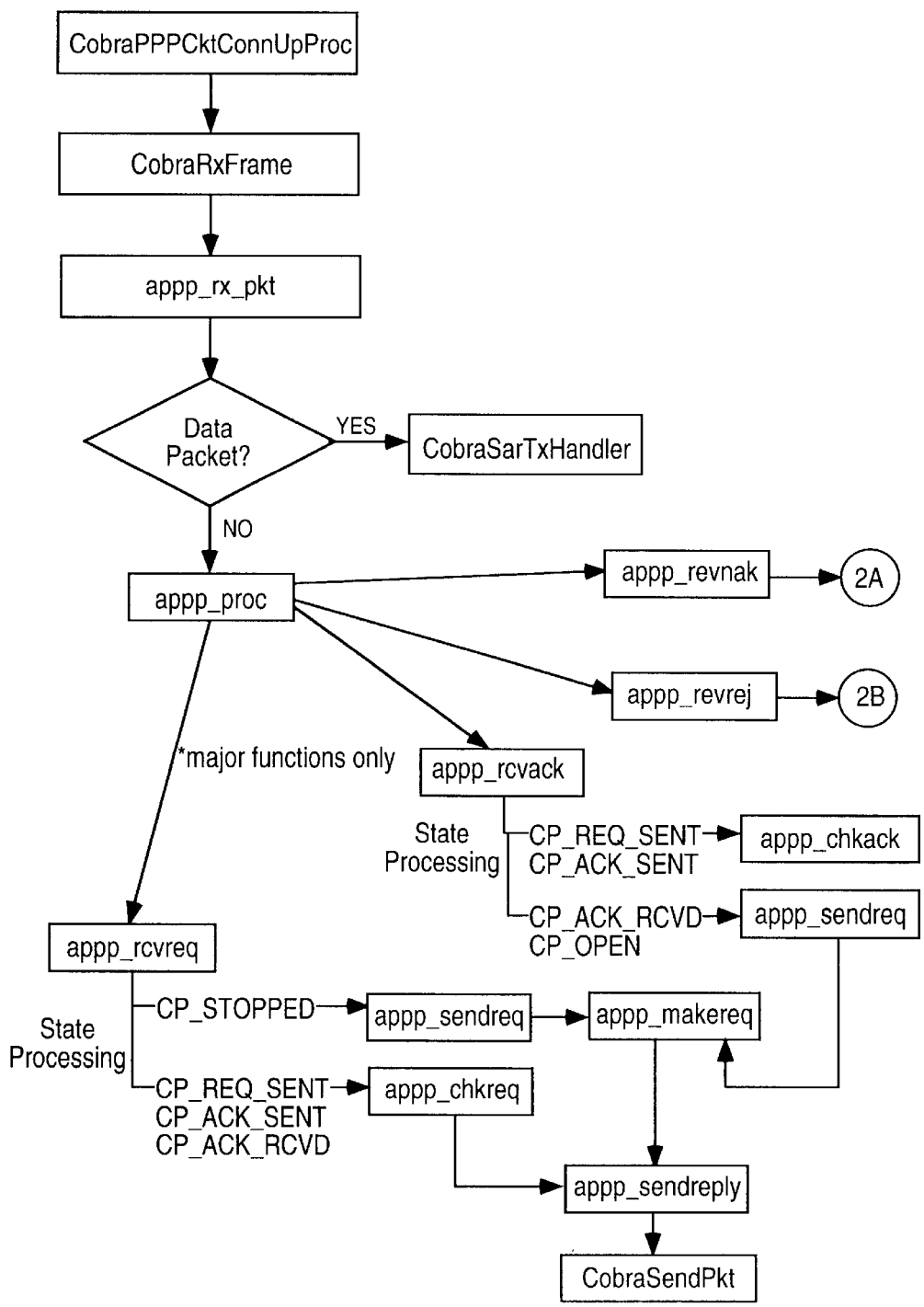
FIGS. 3A and 3B are illustrations of the relationships between the functions for the appended software routines that implement the spoofing module of FIG. 2 in a preferred embodiment of the invention.
Figure 3B:
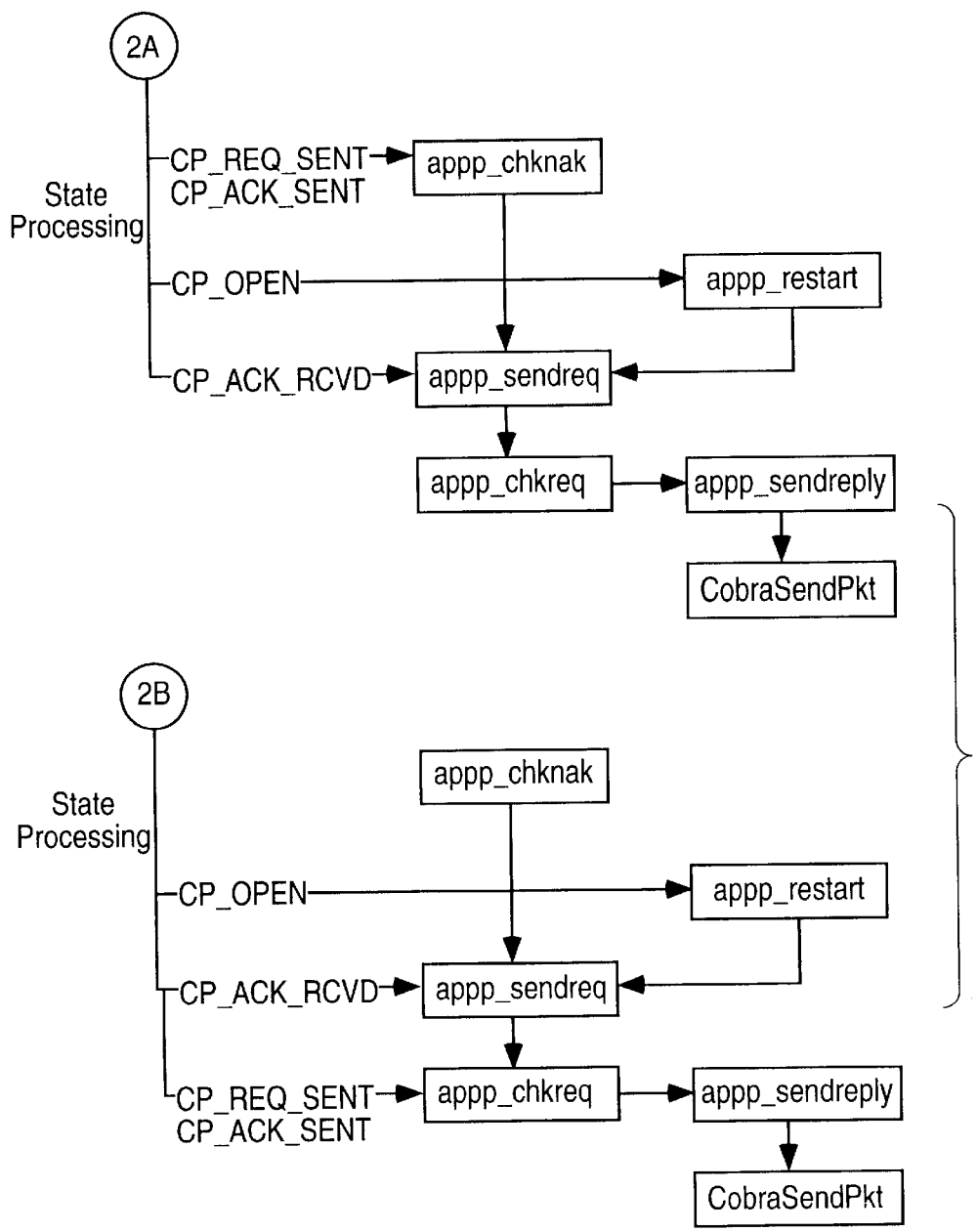

A source code listing is appended to this Specification which, when loaded on a general-purpose computer operating a Windows 95, Windows 98, or Windows NT operating system, will perform the functionality described above for the spoofing module 50 for an ATM over ADSL interface. The function flow relationships are shown in FIGS. 3A and 3B. Persons skilled in the art will be able to code the driver module 58 from the description provided herein using known techniques. The driver code is generally specific to the hardware platform used for the adapter or external device that is coupled to the telephone line at the host location. These details are know to and within the ability of persons of ordinary skill.

General Function Descriptions for Appended Code

The reader is directed to FIGS. 3A and 3B, which illustrate the functional flow relationships between the various modules implementing the spoofing module 50. A description of each of the modules is provided below.

cobraPPPCktConnUpProc

This function is the spoofing code's entry point for outbound traffic. This is a "state" function correlating to the "up" state of the ADSL line. Therefore, outbound traffic is just one of the events processed in function CobraPPPCktConnUpProc. Outbound traffic is defined as traffic flowing from the operating system PPP stack (or the local PPP stack—if it isn't Microsoft's) towards the remote peer (through the network connection). For event PPP_EVENT_PACKET_TX the processing calls function CobraRXFrame passing it a pointer to Microsoft's PPP packet and a pointer to a session structure. The "Rx" portion of CobraRXFrame means Received from the application level (Microsoft's PPP stack) for transmission to the remote peer.

Inbound traffic is also processed in this function. Incoming traffic is represented by event PPP_EVENT_FRAME_RX. Function CobraRANetFrame gets called to process inbound traffic.

cobraRXFrame

This function receives a frame from the Microsoft PPP stack. It performs normal PPP-like processing such as Address Control field Compression and Protocol Field Compression. Our spoofing logic doesn't negotiate these compression options. The packet gets passed to function appp_rx_pkt.

appp_rx_pkt

Processing in appp_rx pkt filters data based on the packet's (whose pointer gets passed in as a parameter) Protocol ID. Both control packets and data packets get sent through this function. For data packets the PPP header is replaced with a RFC 1483 header. The RFC 1483 headers for IP and IPX traffic are as follows:

| Type | 8 Byte 1483 Header (in Hex) |
|---|---|
| IP | AA AA 03 00 00 00 08 00 |
| IPX | AA AA 03 00 00 00 81 37 (COBRA-DSL 2.1.5 and above only) |

After replacing the PPP header with a RFC 1483 header, the data is forwarded to the hardware via function CobraSarTxHandler.

The PPP Header (in HEX) consists of FF 03 XX XX, where XX XX is a two byte protocol ID. For example, the PID for IP is 80 21 (in HEX).

All control packets are passed to function appp_proc.

appp_proe

This function process messages based on their PPP ID code (Configuration Requests, Configuration Rejects, Protocol Rejects, Configuration Acks, etc.). Functions are defined for each code type: appp_rcvreq, appp_rcvack, appp_rcvnak, appp_rcvtermreq, appp_rcvtermack, appp_rcvcoderej, appp_rcvProtorej.

appp_rcvreq

This function processes all received Configuration Requests (from the application layer, i.e., Microsoft's PPP stack). A Configuration Request gets exchanged for each PPP layer (LCP, IPCP, IPXCP). The processing in this function is based on the control protocol state. The states and function called are defined below.

| Control Protocol State | Function |
|---|---|
| CP_INITIAL & CP_STARTING | None |
| CP_CLOSED | appp_sendtermack |
| CP_STOPPED | appp_sendreq & appp_chkreq |
| CP_CLOSING | None |
| CP_STOPPING | None |
| CP_REQ_SENT & CP_ACK_SENT | appp_chkreq |
| CP_ACK_RCVD | appp_chkreq |
| CP_OPEN | appp_restart, appp_sendreq, appp_chkreq | appp_sendreq

This function starts the process for building a configuration request. It calls appp_makereq to build a request then calls appp_sendreply to send the reply to Microsoft's PPP stack. Data stored in control blocks dictate what options should be included in the request (see appp_makereq). The spoofing logic's job is to set fields in the control block causing the desired message to be built by appp_makereq.

appp_makereq

This function builds a configuration request (called for all control protocol layers—LCP,IPXCP, IPCP). The fields (options for the request) depend on fields set in the Application Control Block (ACB).

appp_sendreply

This is a generic function that sends all control packets to the driver (via function CobraSendPkt). This function builds the applicable Control Protocol headers prior to calling CobraSendPkt.

CobraSendPkt

This function builds the PPP header, then delivers the packet to Microsoft's PPP stack.

appp_chkreq

This function checks a config request (from Microsoft's PPP stack) to determine if it can be ACKed or NACKed. The decision is based on field values contained within the ACB and based on the layer being processed (LCP, IPXCP,IPCP). This function is an integral part of spoofing, in that it creates the response normally done by a remote peer. Function appp_sendreply is used to format and send the ACK or NAK to our local PPP stack.

appp_revack

This function processes all received Configuration Acks (from the application layer, i.e, Microsoft's PPP stack). An ACK gets exchanged for each PPP layer (LCP, IPCP, IPXCP) and is in response to a Configuration Request. Like function appp_rcvreq, the control protocol state controls the processing. The states and applicable function are shown below.

| Control Protocol State | Function |
|---|---|
| CP_INITIAL & CP_STARTING | None |
| CP_CLOSED | appp_sendtermack |
| CP_STOPPED | appp_sendtermack |
| CP_CLOSING | None |
| CP_STOPPING | None |

-continued

| Control Protocol State | Function |
| --- | --- |
| CP_REQ_SENT | appp_chkack |
| CP_ACK_RCVD | appp_sendreq |
| CP_OPEN | appp_restart, appp_sendreq |
| CP_ACK_SENT | appp_chkack | appp_chkack

This function validates a received ACK (from the local PPP stack). It makes sure the ACKed options match those sent in the, locally originated, configuration request. This refers to a config request sent to the local PPP Stack from our spoofing code.

appp_rcvnak

This function processes all received Configuration Naks (from the application layer, i.e, Microsoft's PPP stack). A NAK may be exchanged for each PPP layer (LCP,IPCP, IPXCP) and is in response to a Config Request for options whose values aren't desired. A NAK allows new option values to be negotiated. Control protocol state defines the function's processing. The states and applicable function are shown below.

| Control Protocol State | Function |
| --- | --- |
| CP_INITIAL & CP_STARTING | None |
| CP_CLOSED | appp_sendtermack |
| CP_STOPPED | appp_sendtermack |
| CP_CLOSING | None |
| CP_STOPPING | None |
| CP_REQ_SENT | appp_chknak, appp_sendreq |
| CP_ACK_RCVD | appp_sendreq |
| CP_OPEN | appp_restart, appp_sendreq |
| CP_ACK_SENT | appp_chknak, appp_sendreq | appp_chknak

This function validates a received NAK (from the local PPP stack). It makes sure the NAKed options match those sent in the, locally originated, configuration request. This refers to a config request sent to the local PPP Stack from our spoofing code.

appp_rcvrej

This function processes all received Configuration Rejects (from the application layer, i.e, Microsoft's PPP stack). A REJ may be exchanged for each PPP layer (LCP, IPCP,IPXCP) and is in response to the Config Request for supported options that aren't desired. A REJ allows unwanted options to be removed from the negotiation process. This differs from the NAK's purpose. A NAK says I like the option—I just don't like its value. A REJ says I don't like the option period. Control protocol state defines the function's processing. The states and applicable functions are shown below.

| Control Protocol State | Function |
| --- | --- |
| CP_INITIAL & CP_STARTING | None |
| CP_CLOSED | appp_sendtermack |
| CP_STOPPED | appp_sendtermack |

-continued

| Control Protocol State | Function |
| --- | --- |
| CP_CLOSING | None |
| CP_STOPPING | None |
| CP_REQ_SENT | appp_chkrej, appp_sendreq |
| CP_ACK_RCVD | appp_sendreq |
| CP_OPEN | appp_restart, appp_sendreq |
| CP_ACK_SENT | appp_chkrej, appp_sendreq |

This function validates a received REJ (from the local PPP stack). It makes sure the Rejected options match those sent in the locally originated, configuration request. This refers to a configuration request sent to the local PPP Stack from our spoofing code.

Summary of Code

The invention spoofs LCP, IPXCP and IPCP. This spoofing involves using configured data to negotiate PPP with Microsoft's PPP stack in place of the remote router 26. In this case, the remote router doesn't support PPP (but supports RFC 1483 instead).

After establishing IPCP and/or IPXCP—data packets are allowed to flow. Data packets require header translation—that is, replacing the PPP header with a RFC 1483 header for outbound traffic and replacing the RFC 1483 header with a PPP header for inbound traffic.

Control Protocol Negotiation

LCP,IPXCP and IPCP are all control protocols. Although they represent different layers, the rules for PPP negotiation are identical. That is, both sides must send Configuration Requests and both sides must ACK their received Configuration Requests. When this happens the Control Protocol layers are open (thereby allowing data transfer).

NAK and REJ may be exchanged; however, the general rule still applies. Regardless of the number of REJs and/or NAKs exchanged—the exchange of ACKs must be done to open the layer.

Header Translation

With that said, function appp_rcvreq processes a received Control Protocol packet and processes it based on the current state. It's overall job is to not only respond with a Config Request (when applicable) but to process the received Control Protocol packet, validate it and respond accordingly. This is all done on behalf of the remote router and in accordance with the function diagram of FIGS. 3A and 3B. The overall spoofing procedure will be apparent to a person of skill in the art from a review of the functions listed in the diagram.

Header translation is done in function appp_rx_jpkt for outbound traffic. For incoming traffic (from the remote peer), the header translation is done in function CobraRANet-Frame. This function is called from CobraPPPCktConnUpProc.

The reader is directed to the Notice Regarding Copyright at the beginning of this document. The owner of the copyright in the appended software claims and reserves all copyright rights in the software subject to the limited exception set forth in the Notice.

```
/**    :ts=4 ****************************************************************
*
*
*      +  ------------------------------------------------------------------  +
*      |  Copyright © 1995–98 3Com Corporation, Skokie, IL 60076              |
*      |                                                                      |
*      |  The information in this software is subject to change without notice|
*      |  and should not be construed as a commitment by 3Com Corporation     |
*      |  Broadband Access Group - Vienna.                                    |
*      |                                                                      |
*      |  3Com Corporation assumes no responsibility for the use or           |
*      |  reliability of its software on equipment which is not supplied by   |
*      |  3Com Corporation                                                    |
*      |                                                                      |
*      |  This software is furnished under a license and may be copied only   |
*      |  with the inclusion of the above copyright notice. This software, or |
*      |  any other copies thereof, may not be provided or otherwise made     |
*      |  available to any other person except to one who agrees to these     |
*      |  license terms. Title to and ownership of the software shall at all  |
*      |  times remain in 3Com Corporation.                                   |
*      +  ------------------------------------------------------------------  +
*
*      Filename:       pppdefs.h
*
*      Description:    This module contains definitions of symbols and
*                      major data structures for the ISDN Program Entity.
*
*      Modification Log:
*
*      Date       Authors    Notes/Description of Change
*      02-09-93   K. Berry   Genesis
*      06-29-94   fug        PRI
*      09-01-94   jlm        NT driver
*      12-20-95   jlm        Added dynamic bandwidth expansion.
*      05-18-96   jlm        BACP support.
*      09-16-96   jlm        Added fields to support Netbeui Name Projection for
*                            TurboPPP.
*      09-23-96   jlm        Added support for new IPX options to TurboPPP.
*      10-14-96   jlm        Added support in PPP control block for several
*                            IPX and Netbeui bugs.
*      10-20-96   jlm        STAC seq nbr support STACSEQ
*      12-02-96   JLM        Modified TurboPPP to pass thru negotiations of the
*                            protocol NCPs (IPX, MBF, BRCP). We are unable to
*                            currently pass thru IPCP negotiations. See
*                            appp_chkreq( ) for why.
*      03-26-97   DCC        Modified for use with the COBRA-DSL
*                            driver.
*****************************************************************************/
#ifndef   _pppdefs_h_included
#define   _pppdefs_h_included
#define        NO_WINDOWS
/****************************************************************************
*                               MACROS
*
*****************************************************************************/
#define   MAX_DISCRIMINATOR_LEN   20
#define   HIGH_BYTE(a)     ((a >> 8) & 0xff)
#define   LOW_BYTE(a)               (a & 0xff)
#define   HIGH_NIBBLE(a, b)   (a &= 0x0f, a |= ((b & 0xf) << 4))
#define   LOW_NIBBLE(a, b)    (a &= 0xf0, a |= (b & 0xf))
/****************************************************************************
*                            STATE MACHINES
*
*****************************************************************************/
/* PPP Connection States */
typedef enum
{
    PPP_STATE_UNDEFINED,            /* PPP ckt conn is undefined   */
    PPP_STATE_CONN_UP,              /* PPP ckt conn is up             */
    PPP_STATE_NCP_UP,               /* PPP NCP's are up                  */
    PPP_STATE_MAX                   /* Maximum state value            */
} PPP_states_t;
/****************************************************************************
*                         LINK CONTROL BLOCK
*
*****************************************************************************/
#define   MAX_DIGITS                    80
typedef
struct
```

-continued

```
{
    u16     number_type;            /* Address Number type              */
#define UNKN_NUM_TYPE    0          /* Unknown Number type              */
#define INTL_NUM_TYPE    1          /* International Number type    */
#define NATL_NUM_TYPE    2          /* National Number type         */
#define NETS_NUM_TYPE    3          /* Network Specific Number type */
#define SUBS_NUM_TYPE    4          /* Subscriber Number type           */
#define ABBR_NUM_TYPE    6          /* Abbreviated Number type          */
    u16     number_plan;            /* Numbering plan
*/
#define UNKN_NUM_PLAN    0          /* Unknown Number Plan              */
#define ISDN_NUM_PLAN    1          /* ISDN Numbering Plan              */
#define DATA_NUM_PLAN    2          /* Data (X.121) Numbering Plan  */
#define TELX_NUM_PLAN    4          /* Telex (F.9) Numbering Plan   */
#define NATL_NUM_PLAN    8          /* National Standard Numbering Plan */
#define PRIV_NUM_PLAN    9          /* Private Numbering Plan           */
    u8      addr_digits[MAX_DIGITS];    /* Telephone number
        */
} dir_num_t;
/****
*   PPP Definitions
****/
#define MAXCHAPCHALLENGESIZE   255 // Max length for CHAP challenge data
typedef enum PPP_dirflag_e
{
    PPP_FROM_APP = 0,
    PPP_FROM_NET,
    PPP_FROM_PPP,
} PPP_dirflag_t;
typedef enum PPP_layer_e
{
    LCP_LAYER = 0,
    PAP_LAYER,
    CHAP_LAYER,
    BRCP_LAYER,
    IPCP_LAYER,
    IPXCP_LAYER,
    NBFCP_LAYER,
    CCP_LAYER,
    BACP_LAYER,
                // BAP
    BAP_LAYER,
                // BAP
    NUM_PPP_LAYERS
} PPP_layer_t;
typedef enum CP_states_e
{
    CP_INITIAL = 0,
    CP_STARTING,
    CP_CLOSED,
    CP_STOPPED,
    CP_CLOSING,
    CP_STOPPING,
    CP_REQ_SENT,
    CP_ACK_RCVD,
    CP_ACK_SENT,
    CP_OPEN
} CP_states_t;
typedef enum EM_states_e
{
    EM_INITIAL = 0,
    EM_LISTENING,
    EM_NETCP_STARTED,
    EM_NETCP_OPEN,
    EM_APPCP_OPEN
} EM_states_t;
/* Timer record */
typedef struct s_cpctl
{
    CP_states_t cpstate;    /* Control Protocol state */
    u8  lastid;             /* ID of last REQ we sent */
    u8  lastbapid;          /* ID of last BAP REQ we sent */  //BAP
    u16 ack_retry;          /* send_req ACK retry counter */
} S_CPCTL;
#define MPP_WINDOW_SIZE             16
#define NUM_PPP_INTERNAL_BUFS       8
#define MAX_QUEUED_PPP_DATA_PKTS    4
#define MAX_CALL_RETRIES            5
#define PPP_MAX_TERM_COUNTER        2
```

-continued

```
#define  PPP_MAX_CFG_COUNTER          10
#define  PPP_MAX_FAIL_COUNTER         10
#define  M_PPP_NCP_PROTS              (PPP_PROT_CCP | PPP_PROT_NBF | \
                                       PPP_PROT_IPX | PPP_PROT_IP | \
                                       PPP_PROT_BR | PPP_PROT_CHAP | \
                                       PPP_PROT_PAP | PPP_PROT_BAP)
typedef enum PPP_get_id_code_e
{
    PPP_GET_PID_NULL = 0,
    PPP_GET_PID_QUEUE,
    PPP_GET_PID_SEND,
    NUM_PPP_GET_PID_CODES
} PPP_get_pid_code_t;
/****************************************************************************
// PPP Control block for maintaining the PPP connection.
****************************************************************************/
typedef struct S_PPP
{
    u16         protocols;              /* Protos supported (BRIDGE, IP)  */
    u16         pad1;
    PPP_states_t ckt_state;             /* Circuit Connection State       */
    PPP_events_t last_event;            /* Last event processed           */
    /***********************************************************************
    // LCP parameters we negotiate.
    ***********************************************************************/
    BOOL        send_endpt;             //  Send Endpt ID
    BOOL        neg_mru;                //  1=Attempt MRU negotiation
    BOOL        neg_mmru;               //  1=Attempt Multi-Link neg
    BOOL        neg_ac_comp;            //  1=Attempt address/control field compression
    BOOL        neg_proto_comp;         //  1=Attempt protocol field compression
    u16         lcl_mru;                //  Max RX Unit value (Outgoing)
    u16         rem_mru;                //  Max RX Unit value (Incoming)
    u16         rx_ac_comp;             //  RX Addr/Ctrl compression
    u16         rx_proto_comp;          //  RX Protocol compression
    u16         tx_ac_comp;             //  TX Addr/Ctrl compression
    u16         tx_proto_comp;          //  TX Protocol compression
    u16         auth_flags;             //  Authentication Flags
#define  AF_CHAP_AUTHENTICATOR          0x1
#define  AF_CHAP_PEER                   0x2
#define  AF_PAP_AUTHENTICATOR           0x4
#define  AF_PAP_PEER                    0x8
#define  AF_COMPLETED                   0x10
    u16         auth_compl_flags;       //  Auth Complete Flags
#define  AF_CHAP_AUTH_APPROVED          0x1
#define  AF_CHAP_PEER_APPROVED          0x2
#define  AF_PAP_AUTH_APPROVED           0x4
#define  AF_PAP_PEER_APPROVED           0x8
    u32         challenge_val;          //  Current Challenge Value
    /***********************************************************************
    // IPCP parameters we negotiate.
    ***********************************************************************/
    // Flags to let us know if we negotiated options
    u8          peer_vj_max_slot_id;    // VJ compression max num slot ids
    u8          peer_vj_comp_slot_id;   // VJ compression slot id
    u16         ipcp_pad1;
    u32         neg_ip_addrs;           // 1=send a CfgReq w/IP addrs
    u32         neg_1st_dns_addr;       // 1=send CfgReq w/1st DNS addr
    u32         neg_2nd_dns_addr;       // 1=send CfgReq w/2nd DNS addr
    u32         neg_1st_nbns_addr;      // 1=Tx CfgReq w/1st NBNS addr
    u32         neg_2nd_nbns_addr;      // 1=Tx CfgReq w/2nd NBNS addr
    u32         my_ip_addr;             // My IP address
    u32         peer_ip_addr;           // IP address of remote peer
    u32         my_1st_dns_addr;        // My 1st DNS address
    u32         peer_1st_dns_addr;      // 1st DNS addr of remote peer
    u32         my_2nd_dns_addr;        // My 2nd DNS address
    u32         peer_2nd_dns_addr;      // 2nd DNS addr of remote peer
    u32         my_1st_nbns_addr;       // My 1st NBNS address
    u32         peer_1st_nbns_addr;     // 1st NBNS addr of remote peer
    u32         my_2nd_nbns_addr;       // My 2nd NBNS address
    u32         peer_2nd_nbns_addr;     // 2nd NBNS addr of remote peer
    /***********************************************************************
    IPX parameters we negotiate.
    ***********************************************************************/
    BOOL neg_ipx_network;
    BOOL neg_ipx_node;
    u16         ipx_framing;            // IPX frame type (as it goes up)
#define  PPP_IPX_FRAME_ETHER_II         0
#define  PPP_IPX_FRAME_ETHER_802_2      1
#define  PPP_IPX_FRAME_ETHER_802_3      2
```

-continued

```
#define  PPP_IPX_FRAME_ETHER_SNAP        3
#define  SZ_ROUTE_PROTOCOL 2
        u8      ipx_route_protocol[SZ_ROUTE_PROTOCOL];
        u32     ipx_route_len;                // Length routing protocol
        u32     my_ipx_network;               // my IPX network address
#define  SZ_IPX_NODENUM 6
        u8      my_ipx_node[SZ_IPX_NODENUM];
/******************************************************************
        Netbeui parameters we negotiate.
********************************************************************/
        BOOL    nb_mac_req;
        BOOL    neg_name_proj;
        BOOL    neg_peer_info;
        u16     nb_multicast_period;
        u8      nb_multicast_priority;
        u8      nb_pad1;
#define  SZ_NBF_CLUTTER         6
        u8      nb_peer_clutter[SZ_NBF_CLUTTER];      // Peer Class, Vers info
#define  SZ_NBF_PEERNAME        33
        u8      nb_peer_name[SZ_NBF_PEERNAME];        // Netbeui name
#define  SZ_NBF_NAMEPROJECT  256
        u8      nb_peer_projection[SZ_NBF_NAMEPROJECT];
        /** Data Control Block variables. **/
        u16              last_tx_link;           /* Last link data was sent out  */
        u16              activity_flag;          /* Data activity flag           */
        u16              num_tx_pkts_on_q;       /* Number of Tx pkts on the queue */
        u16              pad9;
        u32              tx_packets;             /* # of application packets tx  */
        u32              tx_frames;              /* # of IPE packets tx          */
        u32              tx_bytes;               /* Number of bytes tx           */
        u32              tx_delta_bytes;         /* Number of bytes tx per poll  */
        u32              rx_packets;             /* # of application packets rx  */
        u32              rx_frames;              /* # of IPE packets rx          */
        u32              rx_bytes;               /* # of bytes rx                */
        u32              rx_delta_bytes;         /* # of bytes rx per poll       */
        u32              frame_expected;         /* Lower edge of rx window      */
        u32              too_far;                /* Upper edge of rx window + 1  */
        u32              call_retry_cnt;         /* Call retry counter           */
        /*********************************************************************
        // The following values are used to keep track of the end-point id
        // of the peer. If we bring up a second channel to a different
        // endpoint we assume we are straddling two physical devices in
        // which case we bring the call down.
        **********************************************************************/
        u8      peer_endpoint_id[MAX_DISCRIMINATOR_LEN];   //BUGMPSTR
        u8      peer_endpoint_id_len;                       //BUGMPSTR
        u8      peer_endpoint_id_class;                     //BUGMPSTR
        u16     peer_pad1;
} PPP_CB_t;
/******************************************************************
// Applications PPP channel control block. This is used to keep
//   track of the PPP options negotiated by the app above us.
********************************************************************/
typedef struct S_APPP
{
        u16              protocols;              // Protos supported (BRIDGE, IP)
        u16              pad1;
        u8               pppid;                  // Counter for PPP id field
        u8               pad2;
        u16              pad3;
        PPP_states_t ckt_state;                  // Circuit Connection State
        PPP_events_t last_event;                 // Last event processed
/******************************************************************
// LCP parameters we negotiate.
********************************************************************/
        BOOL             send_endpt;             // Send Endpt ID
        BOOL             neg_mru;                // 1=Attempt MRU negotiation
        BOOL             neg_ac_comp;            // 1=Attempt addr/cntl field compression
        BOOL             neg_proto_comp;         // 1=Attempt protocol field compression
        u16              lcl_mru;                // Max RX Unit value (Outgoing)
        u16              rem_mru;                // Max RX Unit value (Incoming)
        u16              rx_ac_comp;             // RX Addr/Ctrl compression
        u16              rx_proto_comp;          // RX Protocol compression
        u16              tx_ac_comp;             // TX Addr/Ctrl compression
        u16              tx_proto_comp;          // TX Protocol compression
        u16              auth_flags;             // Authentication Flags
#define  AF_CHAP_AUTHENTICATOR           0x1
#define  AF_CHAP_PEER                    0x2
#define  AF_PAP_AUTHENTICATOR            0x4
```

-continued

```
#define    AF_PAP_PEER                              0x8
#define    AF_COMPLETED                             0x10
    u16            auth_compl_flags;                // Auth Complete Flags
#define    AF_CHAP_AUTH_APPROVED                    0x1
#define    AF_CHAP_PEER_APPROVED                    0x2
#define    AF_PAP_AUTH_APPROVED                     0x4
#define    AF_PAP_PEER_APPROVED                     0x8
    u32            challenge_val;                   // CHAP: Current Challenge Value
/*****************************************************************
// IPCP parameters negotiated by application.
*****************************************************************/
    u8             peer_vj_max_slot_id;
    u8             peer_vj_comp_slot_id;
    BOOL           peer_negotiated_vj_comp;
    BOOL           peer_negotiated_1st_dns_addr;
    BOOL           peer_negotiated_1st_nbns_addr;
    BOOL           peer_negotiated_2nd_dns_addr;
    BOOL           peer_negotiated_2nd_nbns_addr;
    u16            ipcp_pad1;
    u32            neg_ip_addrs;                    // 1=send a CfgReq w/IP addrs
    u32            neg_1st_dns_addr;                // 1=send CfgReq w/1st DNS addr
    u32            neg_2nd_dns_addr;                // 1=send CfgReq w/2nd DNS addr
    u32            neg_1st_nbns_addr;               // 1=Tx CfgReq w/1st NBNS addr
    u32            neg_2nd_nbns_addr;               // 1=Tx CfgReq w/2nd NBNS addr
    u32            my_ip_addr;                      // My IP address
    u32            peer_ip_addr;                    // IP address of remote peer
    u32            my_1st_dns_addr;                 // My 1st DNS address
    u32            peer_1st_dns_addr;               // 1st DNS addr of remote peer
    u32            my_2nd_dns_addr;                 // My 2nd DNS address
    u32            peer_2nd_dns_addr;               // 2nd DNS addr of remote peer
    u32            my_1st_nbns_addr;                // My 1st NBNS address
    u32            peer_1st_nbns_addr;              // 1st NBNS addr of remote peer
    u32            my_2nd_nbns_addr;                // My 2nd NBNS address
    u32            peer_2nd_nbns_addr;              // 2nd NBNS addr of remote peer
/*****************************************************************
// IPXCP parameters negotiated by application.
*****************************************************************/
    u32            ipx_framing;                     // IPX frame type (as it goes up)
#define    PPP_IPX_FRAME_ETHER_II                   0
#define    PPP_IPX_FRAME_ETHER_802_2                1
#define    PPP_IPX_FRAME_ETHER_802_3                2
#define    PPP_IPX_FRAME_ETHER_SNAP                 3
    u32            ipx_network;                     // my IPX network address
    u8             ipx_node[SZ_IPX_NODENUM];
#define    SZ_ROUTE_PROTOCOL 2
    u8             ipx_route_protocol[SZ_ROUTE_PROTOCOL];
    u32            ipx_route_len;                   // Length routing protocol
/*****************************************************************
// NBFCP parameters negotiated by application.
*****************************************************************/
    u8             nb_clutter[SZ_NBF_CLUTTER];      // Peer Class, Ver
    u8             nb_name[SZ_NBF_PEERNAME];        // Peer Name
    u32            nb_projection_len;
    u8             nb_projection[SZ_NBF_NAMEPROJECT];
    u16            nb_multicast_period;
    u8             nb_multicast_priority;
    u8             nb_pad1;
/*****************************************************************
// Data Control Block variables
*****************************************************************/
    u32            tx_packets;                      // # of application packets tx
    u32            tx_bytes;                        // Number of bytes tx
    u32            rx_packets;                      // # of application packets rx
    u32            rx_bytes;                        // # of bytes rx
    S_CPCTL        a_cpctl[NUM_PPP_LAYERS];
} APPP_CB_t;
/*****************************************************************
*              MISCELLANEOUS STRUCTURES
*                        *
*****************************************************************/
// Various string formats we can return within a VARSTRING.
#define    SLSTRINGFORMAT         STRINGFORMAT_ASCII
/*****
This structure represents Data specfic for each session.
****/
typedef struct _sessionInfo
{
    UINT next_session_idx;
    NDIS_HANDLE miniport_adapter_handle;
```

-continued

```
    PVOID ndis_vc_handle;
    NDIS_HANDLE ndis_vc_context;
    NDIS_MINIPORT_TIMER SessionTimer;
    PPP_layer_t    layer;
    PNDIS_WAN_PACKET p_XmitPktStor; // Temp storage while timing is running (during down call)
    struct S_APPP   appp;
    struct S_PPP    ppp;
    dir_num_t destination;
    BOOL   bTimerProcRunning;
    BOOL   bFreeBlock;
} SESSIONINFO, *PSESSIONINFO;
#define   ClearSessBlock(p) \
    memset(p, sizeof(SESSIONINFO), 0);
/****
This structure represents statistics not related to the B channels
for the call.
****/
typedef struct _sessionStats
{
    /****
    The following two variables are used for sampling the tx and
    rx bytes so we can determine if we need to bring up or down
    a second channel when running multi-link. These counters are
    delta between the number bytes sent or received the last time
    we checked. These variables take into account multiple links.
    ****/
    DWORD          tx_delta_bytes;
    DWORD          rx_delta_bytes;
} SESSIONSTATS, *PSESSIONSTATS;
#define   MAX_ACTIVE_CALLS 4               // Max number of active calls per Adapter.
#endif    _pppdefs_h_included
/******************************************************************
*
*  +  ---------------------------------------------------------------- +
*  |  Copyright © 1995–1998 3Com Corporation                            |
*  |                                                                    |
*  |  The information in this software is subject to change without notice |
*  |  and should not be construed as a commitment by 3Com Broadband Access |
*  |  Group - Vienna.                                                   |
*  |                                                                    |
*  |  3Com Corporation assumes no responsibility for the use or         |
*  |  reliability of its software on equipment which is not supplied by |
*  |  3Com Corporation.                                                 |
*  |                                                                    |
*  |  This software is furnished under a license and may be copied only |
*  |  with the inclusion of the above copyright notice. This software, or |
*  |  any other copies thereof, may not be provided or otherwise made   |
*  |  available to any other person except to one who agrees to these   |
*  |  license terms. Title to and ownership of the software shall at all |
*  |  times remain in 3Com Corporation                                  |
*  +  ---------------------------------------------------------------- +
*
*
*
*     FILENAME:
*
*     $Workfile:   appp.c  $
*
*     ARCHIVE INFORMATION:
*
*     $Archive:    //ISC/DATA/SCMPROJS/NEWCOBRA/MINIPORT/NDIS40/PPP/APPP.C_V  $
*     $Revision:   1.14  $
*     $Date:       Oct 03 1997 16:07:32  $
*     $Author:     David  $
*     $Modtime:    Oct 03 1997 15:33:26  $
*
*
*         Filename:              appp.c
*
*         Description:  This module contains the Application side for the
*                                PPP Emulation state machine processes.
*
*         Modification Log:
*
*     Date      Authors     Notes/Description of Change
*     02-10-93  Jomama      Genesis
*     05-05-96  SKM         Fixes for fixed IP. If APP gives fixed ip option
*                           and PEER nak's it, convey the NAK to APP.
```

-continued

```
*                       Marked as BUGFIXEDIP. Ported by JLM.
*      05-18-96 JLM     Added BACP support. Ifdefed in as BAP.
*                       Added support for Feature Update 2. Marked as FEAT2.
*      09-17-96 JLM     Correct name projection negotiation.
*                       Marked as BUGNBFPROJ.
*      09-23-96 JLM     Fixed IPX negotiation problem with Ascend MAX.
*                       Marked as BUGIPX2.
*      10-21-96 JLM     Fixes per 10/21/96 CIUG Interopeability.
*                       Marked as CIUG102196
*      12-02-96 JLM     Modified TurboPPP to pass thru negotiations of the
*                       protocol NCPs (IPX, NBF, BRCP). We are unable to
*                       currently pass thru IPCP negotiations. See
*                       appp_chkreq( ) for why.
*      03-23-97 DCC     Modified APPP to support PPP spoofing to allow
*                       RFC 1483 support in a NDISWAN MINIPORT driver for
*                       COBRA-DSL.
*      07-22-97 DCC     Added function to "actually" transmitt data
*                       after RFC 1483 processing. Added extra debug/trace
*                       messages. Added support for Primary and Secondary
*                       DNS.
***************************************************************************/
#include "pppdefs.h"
#ifdef SPECIAL_UDP_DUMP
extern ULONG LldPollCount;
static LONGLONG lastXmitTime = 0;
static LONGLONG lastRcvTime = 0;
#endif
/**************************************************************************
*
*       Function:   CobraPPPUndefinedProc - Process UNDEFINED events
*
*       Call:
*           CobraPPPUndefinedProc(PPP_events_t event, PSESSIONINFO lpSession,
*                       void *p_aux1, void *p_aux2, void *p_aux3)
*
*       Arguments:
*           event           -   PPP event to execute
*           lpSession       -   Connection Call Record.
*           p_aux1          -   Ptr to start of data pkt.
*           p_aux2          -   Unused.
*           p_aux3          -   Unused.
*
*
*       Return Value:
*           NDIS_STATUS:    Value returned is either NDIS_STATUS_SUCCESS or
*                           NDIS_STATUS_PENDING.
*
*       Description:
*           This function is invoked to process an event when a PPP channel
*           is in the UNDEFINED state. Switch on the event, process the
*           event and modify the state if required. Note: This function interprets
*           the p_aux1 and p_aux2 generic pointers based on the event type.
*
+***************************************************************************/
NDIS_STATUS
CobraPPPUndefinedProc(PPP_events_t event, PSESSIONINFO lpSession,
                void *p_aux1, void *p_aux2, void *p_aux3)
{
    APPP_CB_t*  p_acb = &lpSession->appp;
    S_CPCTL*    p_acp = &lpSession->appp.a_cpctl[LCP_LAYER];
    NDIS_STATUS ndisStatus;
    TRACE(TR_PPP, TR_LVL2, "[EM_PPP_UNDEF_PROC]: p_aux1 %lx, p_aux2 %lx\n",
          (DWORD)p_aux1, (DWORD)p_aux2, 0, 0);
    // Record the event.
    p_acb->last_event = event;
    // Process the event.
    switch(event)
    {
        case PPP_EVENT_LINK_UP:
            // ***       PPP_EVENT_LINK_UP means the user initiated a
            //           session via dialup networking -- and our driver
            //           confirmed the user's request.
            // Initialize our APPP control block and its state for a new PPP spoofing session.
            appp_initcb(lpSession);
            p_acb->ckt_state = PPP_STATE_CONN_UP;
            SPYLOG("Establishing PPP connection to %s.\n",
                (DWORD) ((PCOBRA_VC) (lpSession->ndis_vc_handle))->VcName,
                0, 0, 0);
```

```
                    // ************************
                    // Now we wait for the application side (Microsoft PPP) to start
                    // negotiations through sending a LCP request.
                    ndisStatus = NDIS_STATUS_SUCCESS;
                    break;
              case PPP_EVENT_LINK_DN:
                    // Ignore, cause we're already down.
                    ndisStatus = NDIS_STATUS_SUCCESS;
                    break;
              case PPP_EVENT_FRAME_RX:
                    // We're down, but received a buffer from the network. This event
                    // gets generated by the NDISWAN Miniport driver and uses its own
                    // buffers. The buffer is of type PCOBRA_WAN_BUFFER and must be released
                    // with a function compatible with the Miniport's buffer allocation scheme.
                    free_fixed_memory((PCOBRA_WAN_BUFFER) p_aux1);
                    ndisStatus = NDIS_STATUS_SUCCESS;
                    break;
              case PPP_EVENT_PACKET_TX:
                    // Buffer's ownership reverts back to NDIS. No action is taken, cause
                    // we're down.
                    ndisStatus = NDIS_STATUS_SUCCESS;
                    break;
              case APPP_EVENT_TIMER:
                    // Probably a spurious timeout -- say buy buy
                    clear_timer(lpSession);
                    ndisStatus = NDIS_STATUS_SUCCESS;
                    break;
              /* Event is unrecognized */
              default:
                    ndisStatus = NDIS_STATUS_SUCCESS;
                    break;
        }
        return ndisStatus;
}
/*******************************************************************************
*
*       Function:    CobraTransComplete - This is the function to use on that
*                    rare occasion where we must explicitly tell NDIS one of its
*                    buffers is free.
*
*       Call:
*              CobraTransComplete(PSESSIONINFO lpSession, PNDIS_WAN_PACKET p_pkt)
*
*       Arguments:
*              lpSession    -    Connection Call Record.
*              p_pkt        -    Ptr to start of data pkt.
*
*       Return Value:
*              void
*
*       Description:
*              This function calls NDIS function NdisMWanSendComplete to return a
*              buffer descriptor used for transmission of data (or in this case a
*              PPP control packet probably lived in the buffer being freed here.)
*
+******************************************************************************/
void
CobraTransComplete(PSESSIONINFO lpSession, PNDIS_WAN_PACKET p_pkt)
{
       NdisMWanSendComplete(lpSession->miniport_adapter_handle,
                            p_pkt,
                            NDIS_STATUS_SUCCESS);
{
/*******************************************************************************
*
*       Function:    CobraPPPCktConnUpProc - Process CONN_UP events
*
*       Call:
*              CobraPPPCktConnUpProc (PPP_events_t event, PSESSIONINFO lpSession,
*                                    void *p_aux1, void *p_aux2)
*
*       Arguments:
*              event        -    PPP event to execute
*              lpSession    -    Connection Call Record.
*              p_aux1       -    Ptr to Link CB.
*              p_aux2       -    Ptr to start of data pkt.
*              p_aux3       -    PPP Layer.
*
*       Return Value:
```

-continued

```
*                 NDIS_STATUS: Either NDIS_STATUS_SUCCESS or NDIS_STATUS_PENDING. This is based
*                           on the PPP spoofing state engine's processing.
*
*       Description:
*                 This function is invoked to process an event when a PPP channel
*                 is in the CONN_UP state. Switch on the event, process the
*                 event modify the state if required. Note: the p_aux1 and p_aux2
*                 generic pointers are interpreted as a function of the event
*                 type.
*
+***************************************************************************/
NDIS_STATUS
CobraPPPCktConnUpProc(PPP_events_t event,
                                PSESSIONINFO lpSession,
                                void *p_aux1, void *p_aux2, void *p_aux3)
{
    NDIS_STATUS ndisStatus;
    APPP_CB_t* p_acb = &(lpSession->appp);       /*      APPP CB */
    //PNDIS_WAN_PACKET p_pkt = (PNDIS_WAN_PACKET) p_aux1;
    /* p_aux1 is the address of the user data (where applicable) */
    /* p_aux2 the Timer Index (where applicable) */
    /* p_aux3 is the PPP_layer (for Timer Events) */
    TRACE(TR_PPP, TR_LVL2,
         "[CobraPPPCktConnUpProc]: p_aux1 %lx, p_aux2 %lx, p_aux3 %lx\n",
         (DWORD)p_aux1, (DWORD)p_aux2, (DWORD)p_aux3, 0);
    p_acb->last_event = event;
    switch(event)
    {
        case PPP_EVENT_LINK_DN: /* Connection is down */
            // Reset state.
            p_acb->ckt_state = PPP_STATE_UNDEFINED;
            // Clear the control block
            appp_initcb(lpSession);
            SPYLOG("PPP connection down to %s.\n",
                 (DWORD) ((PCOBRA_VC) (lpSession->ndis_vc_handle))->VcName,
                 0, 0, 0);
            // Free the session
            FreeSess(lpSession);
            ndisStatus = NDIS_STATUS_SUCCESS;
            break;
        case PPP_EVENT_PACKET_TX:   /* pkt from Application level */
            // If we're processing a timeout -- Queue this packet
            if (lpSession->bTimerProcRunning)
            {
                if (lpSession->p_XmitPktStor != (PNDIS_WAN_PACKET) NULL)
                {
                    lpSession->p_XmitPktStor = (PNDIS_WAN_PACKET) p_aux1;
                    ndisStatus = NDIS_STATUS_PENDING;
                }
                else
                {
                    // We're letting this packet go. I don't want to know if this
                    // happens, so I'll trace it.
                    ndisStatus = NDIS_STATUS_SUCCESS;
                    TRACE(TR_PPP, TR_LVL2,
                         "[CobraPPPPCktConnUpProc]: Dropping XMIT packet, timer process is concurrently running\n",
                         0, 0, 0, 0);
                }
            }
            else
            {
                // Process PPP packet (p_aux1 is the buffer pointer)
                ndisStatus = CobraRxFrame(lpSession, p_aux1);
            }
            break;
        case PPP_EVENT_FRAME_RX: /* pkt from Net level */
            // ************   This is an IP, IPX, etc. packet
            //                received from the NET. It's header
            //                is RFC 1483 (else this doesn't get
            //                called.
            ndisStatus = CobraRxNetFrame(lpSession, p_aux1);
            break;
        case APPP_EVENT_TIMER:
            // Clear the timer.
            clear_timer(lpSession);
            // Set flag to STOP flow from "NDIS Down Call."
            lpSession->bTimerProRunning = TRUE;
```

-continued

```
            // Process the timeout.
            appp_timeout(lpSession);
            // Process any queued packet.
            if (lpSession->p_XmitPktStor != (PNDIS_WAN_PACKET) NULL)
            {
                // We Found something. Process it!
                ndisStatus = CobraRxFrame(lpSession, lpSession->p_XmitPktStor);
                // ndisStatus is NDIS_STATUS_SUCCESS if the saved packet
                // was a PPP Control Packet. Otherwise, we handed of a
                // data packet to the hardware. If NDIS_STATUS_SUCCESS is returned
                // we must indicate the xmit completion status to NDIS -- cause the
                // packet is still pending (as far as NDIS is concerned.) This is
                // because we returned NDIS_STATUS_PENDING when we stored the packet
                // pointer into lpSession->p_XmitPktStor.
                if (ndisStatus == NDIS_STATUS_SUCCESS)
                {
                    // We must tell NDIS we're done with its NDIS_WAN_PACKET
                    CobraTransComplete(lpSession, lpSession->p_XmitPktStor);
                }
                lpSession->p_XmitPktStor = (PNDIS_WAN_PACKET) NULL;
            }
            else
                ndisStatus = NDIS_STATUS_SUCCESS;
            lpSession->bTimerProcRunning = FALSE;
            break;
        case PPP_EVENT_LINK_UP:
            // ******** NO-OP
            ndisStatus = NDIS_STATUS_SUCCESS;
            break;
        /* Unrecognized Event */
        default:
            TRACE(TR_PPP, TR_LVL2,
                "[CobraPPPCktConnUpProc]: Unknown Event\n", event, 0, 0, 0);
            ndisStatus = NDIS_STATUS_SUCCESS;
            break;
    }
    return ndisStatus;
}
/**************************************************************************
*
*       Function:       em_ppp_release_conn - Stop all links for this connection
*
*       Call:
*                       em_ppp_release_conn(PSESSIONINFO lpSession);
*
*       Arguments:
*                       lpSession       -   Connection Call Record.
*
*       Return Value:
*                       None
*
*       Description:
**************************************************************************/
void
em_ppp_release_conn(PSESSIONINFO lpSession)
{
    APPP_CB_t* p_acb = &(lpSession->appp);        /*  APPP CB  */
    p_acb->ckt_state = PPP_STATE_UNDEFINED;
    appp_init_all_layers(lpSession, CP_STOPPED);
    // Let our NDISWAN Miniport know about this condition.
    // CobraTerminateSession(lpSession->ndis_link_handle);
}
/**************************************************************************
*
*       Function:   CobraDeliverToNDIS - Processses an incoming (from the net)
*                   IP packet that has a RFC 1483 header.
*
*       Call:
*           CobraDeliverToNDIS(PSESSIONINFO lpSession, PCOBRA_WAN_BUFFER p_pkt);
*
*       Arguments:
*                   lpSession   -   Connection Call Record.
*                   p_pkt       -   A pointer to the received packet descriptor.
*
*       Return Value:
*                   None
*
*       Description:
*                   This function delivers a received packet (from the NET) to NDIS.
```

-continued

```
+****************************************************************/
VOID
DbgPrintData(
    IN PUCHAR Data,
    IN UINT NumBytes,
    IN ULONG Offset
    )
{
    UINT        i,j;
    for (i = 0; i < NumBytes; i += 16)
    {
        DbgPrint("%04lx: ", i + Offset);
        */
        // Output the hex bytes
        /*
        for (j = i; j < (i+16); j++)
        {
            if (j < NumBytes)
            {
                DbgPrint("%02x ", (UINT)((UCHAR)*(Data+j)));
            }
            else
            {
                DbgPrint("   ");
            }
        }
        DbgPrint (" ");
        /*
        // Output the ASCII bytes
        */
        for (j = i; j < (i+16); j++)
        {
            if (j < NumBytes)
            {
                char c = *(Data+j);
                if (c < ' ' || c > 'z')
                {
                    c = '.';
                }
                DbgPrint("%c", (UINT)c);
            }
            else
            {
                DbgPrint(" ");
            }
        }
        DbgPrint("\n");
    }
}
void
CobraDeliverToNDIS(PSESSIONINFO lpSession, PCOBRA_WAN_BUFFER p_pkt)
{
        NDIS_STATUS    ndisStatus = NDIS_STATUS_FAILURE;
        TRACE(TR_PPP, TR_LVL2,
            "[CobraDeliverToNDIS] AdapterHandle:%x VcContext:%x buf=%x len=%x\n",
            (ULONG) lpSession->miniport_adapter_handle,
            (ULONG) lpSession->ndis_vc_context,
            (ULONG) p_pkt, p_pkt->CurrentLength);
        /* DbgPrintData(p_pkt->CurrentBuffer, p_pkt->CurrentLength, 0); */
        NdisMWanIndicateReceive(&ndisStatus,
                                lpSession->miniport_adapter_handle,
                                lpSession->ndis_vc_context,
                                p_pkt->CurrentBuffer,
                                p_pkt->CurrentLength);
        TRACE(TR_PPP, TR_LVL2,
            "   NdisIndicateReceive returned status of %x\n", ndisStatus, 0, 0, 0);
        if (ndisStatus == NDIS_STATUS_SUCCESS)
        {
            NdisMWanIndicateReceiveComplete(lpSession->miniport_adapter_handle,
                                            lpSession->ndis_vc_context);
        }
        else
        {
            TRACE(TR_PPP, TR_LVL2,
                "[CobraDeliverToNDIS]: NdisMWanIndicateReceive returned status of %d\n",
                    ndisStatus, 0, 0, 0);
        }
}
/****************************************************************
```

-continued

```
*       Function:           CobraRxNetFrame - Processses an incoming (from the net)
*                           IP packet that has a RFC 1483 header.
*
*       Call:
*                           CobraRxNetFrame(PSESSIONINFO lpSession, PCOBRA_WAN_BUFFER p_pkt);
*
*       Arguments:
*                           lpSession   - Connection Call Record.
*                           p_pkt       - A pointer to the received packet descriptor
*
*       Return Value:
*                           NDIS_STATUS: NDIS_STATUS_SUCCESS or NDIS_STATUS_PENDING
*
*       Description:
*           This function strips off the RFC 1483 header and replaces it with a
*           PPP header.
+************************************************************************/
NDIS_STATUS
CobraRxNetFrame(PSESSIONINFO lpSession, PCOBRA_WAN_BUFFER p_pkt)
{
        S_PPPHDR        *p_ppphdr;      // Points to PPP Header.
        u8              *pbuf;          // Generic character (BYTE) pointer.
#ifdef SPECIAL_UDP_DUMP
        DWORD       temp_num1;
        DWORD       temp_num2;
        DWORD       seq_num;
        DWORD       ack_num;
        u8          *pp;
        u8          b1, b2, b3, b4;
        LONGLONG    rxCurrentTime;
        LONGLONG    tempTime;
        DWORD       dispTime;
        NdisGetCurrentSystemTime((PLARGE_INTEGER) &rxCurrentTime);
        // Get Displacement
        if (lastRcvTime == (LONGLONG) 0)
        {
            lastRcvTime = rxCurrentTime;
            rxCurrentTime = (LONGLONG) 0;
        }
        else
        {
            tempTime = rxCurrentTime;
            rxCurrentTime = rxCurrentTime - lastRcvTime;
            lastRcvTime = tempTime;
        }
        dispTime = (DWORD) rxCurrentTime / 1000;
#endif
        TRACE(TR_PPP, TR_LVL2, "[CobraRxNetFrame]: p_pkt %lx len=%x\n",
                    (ULONG) p_pkt, p_pkt->CurrentLength, 0, 0);
        // Position pointer to where the PPP header should go. We
        // first skip over the RFC 1483 header, then step back to the
        // beginning of the PPP header.
        // Skip over RFC 1483 header to beginning of IP data
        pbuf = (u8 *) (p_pkt->CurrentBuffer) + RFC1483_HDRLEN;
#ifdef SPECIAL_UDP_DUMP
        // check the packet type
        pp = (u8 *) (pbuf + 0x09);
        if (*pp == 0x06)
        {
            pp = (u8 *) (pbuf + 24 + 3);
            b4 = *pp--;
            b3 = *pp--;
            b2 = *pp--;
            b1 = *pp;
            seq_num = (b1 << 24) + (b2 << 16) + (b3 << 8) + b4;
            pp = (u8 *) (pbuf + 28 + 3);
            b4 = *pp--;
            b3 = *pp--;
            b2 = *pp--;
            b1 = *pp;
            ack_num = (b1 << 24) + (b2 << 16) + (b3 << 8) + b4;
            TRACE(TR_UDP, TR_LVL1,
                "Rcv: FTP SEQ# = %lx ACK# = %lx | Delta - %d",
                seq_num, ack_num, dispTime, 0);
        }
        else
        {
            // Index 0x2a and pull long word
```

-continued

```
                pp = (u8 *) (pbuf + 28);
                seq_num = (DWORD) *((DWORD *) pp);
                seq_num = swap32((u32) seq_num);
                TRACE(TR_UDP, TR_LVL1, "UDP SEQ# = %d | Delta - %d",
                        seq_num, dispTime, 0, 0);
        }
#endif
        // Go back "a few" to the beginning of the PPP header.
        p_ppphdr = (S_PPPHDR *) (((u8 *) pbuf) - PPP_HDRLEN);
        p_ppphdr->addr = HDLC_ALL_ADDR;
        p_ppphdr->control = HDLC_UI;
        p_ppphdr->pid = swap16(PPP_IP_PID);
        // Update the buffer descriptor data pointer and length.
        p_pkt->CurrentBuffer = (u8 *) p_ppphdr;
        p_pkt->CurrentLength = p_pkt->CurrentLength - RFC1483_HDRLEN + PPP_HDRLEN;
        TRACE(TR_PPP, TR_LVL2,"[cobraRxNetFrame]: Buffer data=%x Length=%x\n",
                        (ULONG) p_pkt->CurrentBuffer, p_pkt->CurrentLength, 0, 0);
        // IP packet now carries a PPP header. Deliver it to NDIS.
        CobraDeliverToNDIS(lpSession, p_pkt);
        // Release the buffer we got from miniport
    free_fixed_memory((PCOBRA_WAN_BUFFER) p_pkt);
    return NDIS_STATUS_SUCCESS,
}
/*****************************************************************************
*
*       Function:   CobraSendPkt - Transmit a frame.
*
*       Call:
*           CobraSendPkt(PSESSIONINFO lpSession, PCOBRA_WAN_BUFFER p_pkt, u16 pid)
*
*       Arguments:
*           lpSession       -       Connection Call Record.
*           p_pkt           -       Pointer to user data pkt to send
*           pid             -           protocol ID of packet to send (goes in PPP
*                                       "protocol type" field)
*
*       Return Value:
*           0               -       Always
*
*       Description:
*           Execute the tx processing of the protocol. The transmit direction
*           is from our spoofing code up towards Microsoft's PPP code.
*
+****************************************************************************/
int
CobraSendPkt(PSESSIONINFO lpSession, PCOBRA_WAN_BUFFER p_pkt, u16 pid)
{
    APPP_CB_t                   *p_acb = &(lpSession->appp);     /* APPP CB
*/
    int                         adjust_fwd;
    u8                          *p_byte;
    S_PPPHDR                    *p_ppphdr;
    TRACE(TR_PPP, TR_LVL1, "[CobraSendPkt]", 0, 0, 0, 0);
    // adjust the prim buffer pkt offset to point to the PPP Header.
    p_pkt->CurrentBuffer = ((u8 *) p_pkt->CurrentBuffer) - PPP_HDRLEN;
    // Build the PPP Header.
    p_ppphdr = (S_PPPHDR *) p_pkt->CurrentBuffer;
    p_ppphdr->addr = HDLC_ALL_ADDR;
    p_ppphdr->control = HDLC_UI;
    p_ppphdr->pid = swap16(pid);
    p_pkt->CurrentLength += PPP_HDRLEN;
    /* now handle AC and/or Proto Compress */
    if (pid != PPP_LCP_PID)
    {
        adjust_fwd = 0;
        /* if AC comp, bump up the ptrs and decrement the ctrs */
            if (p_acb->tx_ac_comp)
            adjust_fwd += 2;
        /* if PROTO comp, bump up the ptrs and decrement the ctrs */
        if ((p_acb->tx_proto_comp) && ((pid & 0xff00) == 0))
            adjust_fwd++;
        switch (adjust_fwd)
        {
        case 1:             /* Protocol Compression */
            /* adjust the prim buffer pkt offset */
            /* (take out the AC fields) */
            p_pkt->CurrentBuffer-= 1;
            p_pkt->CurrentLength -= 1;
            /* move Addr/Ctrl up */
```

```
                    p_byte = (u8 *) p_pkt->CurrentBuffer;
                    *p_byte = HDLC_ALL_ADDR;
                    p_byte++;
                    *p_byte = HDLC_UI;
                    break;
            case 2:             /* AC Compression */
                    /* adjust the prim buffer pkt offset */
                    /* (take out the AC fields) */
                    p_pkt->CurrentBuffer-= 2;
                    p_pkt->CurrentLength -= 2;
                    break;
            case 3:             /* AC and Protocol Compression */
                    /* adjust the prim buffer pkt offset */
                    /* (take out the AC fields) */
                    p_pkt->CurrentBuffer-= 3;
                    p_pkt->CurrentLength -= 3;
                    break;
            }
    }
    /*
    ** Now we have the pkt fully encapsulated, ship it
    */
    /* bump stats */
    p_acb->tx_packets++;
    p_acb->tx_bytes += p_pkt->CurrentLength;
    /* Enqueue the frame to the rx (App) data queue */
    CobraDeliverToNDIS(lpSession, p_pkt);
    ppp_rls_pkt(p_pkt, PPP_FROM_NET, 20);
    return 0;
}
/******************************************************************************
*
*       Function:   CobraRxFrame - Receive a frame from Microsoft PPP
*
*       Call:
*           CobraRxFrame(PSESSIONINFO lpSession, PNDIS_WAN_PACKET p_frame)
*
*       Arguments:
*           lpSession       -       Connection Call Record.
*           p_frame         -       Pointer to the received frame.
*
*       Return Value:
*           None
*
*       Description:
*           Execute the rx processing of the protocol.
*
******************************************************************************/
NDIS_STATUS
CobraRxFrame(PSESSIONINFO lpSession, PNDIS_WAN_PACKET p_frame)
{
    APPP_CB_t   *p_acb = &(lpSession->appp);    // APPP Control Block.
    S_PPPHDR    *p_ppphdr;                      // Points to PPP Header.
    u8          *p_byte;                        // Individual byte pointer.
    int         adjust_back;                    // Counter to adjust for AC or Prot
                                                // compression.
    TRACE(TR_PPP, TR_LVL1, "[CobraRxFrame]", 0, 0, 0, 0);
    // We always receive a PPP framed buffer. Our goals is
    // to replace the PPP header with a RFC 1483 header, then
    // ship the packet out.
    // Get pointer to the PPP section
    p_ppphdr = (S_PPPHDR *) p_frame->CurrentBuffer;
    // Bump stats (receive from above -- Microsoft PPP STAC)
    p_acb->rx_bytes += p_frame->CurrentLength;
    p_acb->rx_packets++;
    // If necessary, rebuild the received pkt PPP header.
    // Influencing parameters can be AC_Compression and Protocol_Compression.
    // Get the 1st byte of the packet & initialize adjustment indicator.
    p_byte = (u8 *)p_ppphdr;
    adjust_back = 0;
    /*
    * I'm leaving this code here; however, I don't
    * negotiate AC Compression or Proto Compression with
    * Microsoft's PPP.
    */
    // Adjust for AC Compression
    if ((*p_byte == HDLC_ALL_ADDR) && (*(p_byte+1) == HDLC_UI))
            p_byte += 2;    /* bump past the addr/ctrl fields */
    else
```

-continued

```
            adjust_back += 2;
    // Adjust for Protocol Compression.
    if (*p_byte & 1)
            adjust_back++;
    // Adjust CurrentBuffer pointer to accomodate compression expansion.
    // How's that for a phrase?
    //              (adjust_back could be zero (0))
    p_frame->CurrentBuffer -= adjust_back;
    p_frame->CurrentLength += adjust_back;
    // It's possible the beginning of the PPP buffer moved.
    p_byte = (u8 *)p_ppphdr
    p_ppphdr = (S_PPPHDR *) (p_byte - adjust_back);
    // At this point, we know how far back to go, so do it.
    switch (adjust_back)
    {
        case 2:             /* AC Compression */
            p_ppphdr->addr = HDLC_ALL_ADDR;
            p_ppphdr->control = HDLC_UI;
            break;
        case 1:             /* Protocol Compression */
        case 3:             /* AC and Protocol Compression */
            p_ppphdr->addr = HDLC_ALL_ADDR;
            p_ppphdr->control = HDLC_UI;
            p_byte = (u8 *)&p_ppphdr->pid;
            *p_byte = 0;
            break;
    }
    /* Now we have a PPP packet. Make sure: */
    /*          1) packet is not too short           */
    /*          2) make sure that ADDR=0xff          */
    /*          3) make sure that CTRL=3             */
    /*          4) make sure that PROT is odd        */
    if ((p_frame->CurrentLength <= PPP_HDRLEN) ||
        (p_ppphdr->addr != HDLC_ALL_ADDR) ||
        (p_ppphdr->control != HDLC_UI) ||
        ((swap16(p_ppphdr->pid) & 1) == 0))
        {
            TRACE(TR_PPP, TR_LVL4,
            "[appp_rx_pkt]: Packet is either too short (%d), ADDR(%d) != 0xff, CTRL(%d) !=
0x03 or PROT(%d) is not odd\n",
            p_frame->CurrentLength, p_ppphdr->addr, p_ppphdr->control, swap16(p_ppphdr->pid
));
            TRACE(TR_PPP, TR_LVL4,
            "   Packet is either too short (%d), ADDR(%d) != 0xff, CTRL(%d) != 0x03 or PROT(
%d) is not odd\n",
                p_frame->CurrentLength,
                p_ppphdr->addr,
                p_ppphdr->control,
                swap16(p_ppphdr->pid));
            return NDIS_STATUS_SUCCESS;
        }
    return appp_rx_pkt(lpSession, p_frame);
}
/*****************************************************************************
*
*   Function:   appp_send_reject_msg - sends a reject to host
*               This routine exists to avoid repeating the code
*               block below in two different places. Makes
*               maintenance a tad bit easier.
*
*   Call:
*       appp_send_reject_msg(PSESSIONINFO lpSession, S_PPPHDR*p_pphdr,);
*                       S_CPCTL *p_lacp, PNDIS_WAN_PACKET p_pkt)
*
*   Arguments:
*               lpSession       -       Connection Session Record.
*
*   Return Value:
*       None
*
*   Description:
*       Builds and sends a reject to the host.
*
+*****************************************************************************/
void
appp_send_reject_msg (PSESSIONINFO lpSession, PNDIS_WAN_PACKET p_pkt)
{
    S_PPPHDR                *p_ppphdr;
    S_CPCTL                 *p_lacp = &lpSession->appp.a_cpctl[LCP_LAYER];
```

```
        APPP_CB_t              *p_acb = &(lpSession->appp);   /* APPP CB */
        PCOBRA_WAN_BUFFER      p_PR_pkt;
        u8                     *p_from;
        u8                     *p_to;
        u16                    i;
        s16                    numbytes;
        p_ppphdr = (S_PPPHDR *) (p_pkt->CurrentBuffer);
        /* only send back a PROTO_REJ if LCP is open */
        if (p_lacp->cpstate == CP_OPEN)
        {
            /* subtract PPP Header from packet length (total bytes in pkt) */
            p_pkt->CurrentLength -= PPP_HDRLEN;
            /* Get packet for the sending of a PROTOCOL REJECT to peer */
            if ((p_PR_pkt = ppp_get_pkt(20)) == NULL)
            {
                TRACE(TR_PPP, TR_LVL2,
                    "[appp_rx_pkt]: get_pkt error, unable to send REJECT\n",
                    0, 0, 0, 0);
                return;
            }
            /* need to copy info field from RX pkt into PROTO_REJ pkt */
            /* make sure it doesn't exceed max negotiated length */
            p_from = ((u8 *)p_ppphdr) + PPP_HDRLEN;
            p_to = (((u8 *) p_PR_pkt->CurrentBuffer) + PPP_HDRLEN + CNF_HDRLEN);
            if (p_pkt->CurrentLength < p_acb->rem_mru)
                numbytes = (short) p_pkt->CurrentLength;
            else
                numbytes = p_acb->rem_mru;
            /* insert rejected-protocol after CNF_HDR */
            *p_to++ = (swap16(p_ppphdr->pid)) >> 8;
            *p_to++ = (unsigned char) swap16(p_ppphdr->pid);
            p_PR_pkt->CurrentLength += 2;
            /* copy info field */
            for (i = 0; i < numbytes; i++)
                *p_to++ = *p_from++;
            p_PR_pkt->CurrentLength += numbytes;
            appp_sendreply(lpSession, LCP_LAYER, p_PR_pkt, PROTO_REJ, 0);
        }
        return;
}
/********************************************************************
*
*       Function:       appp_rx_pkt - Process a received packet
*
*       Call:
*               appp_rx_pkt(PSESSIONINFO lpSession, PNDIS_WAN_PACKET p_pkt)
*
*       Arguments:
*               lpSession       -       Connection Call Record.
*               p_pkt           -       Pointer to the received pkt.
*
*       Return Value:
*               None
*
*       Description:
*               Execute the rx processing of the protocol.
*
********************************************************************/
NDIS_STATUS
appp_rx_pkt(PSESSIONINFO lpSession, PNDIS_WAN_PACKET p_pkt)
#ifdef SPECIAL_UDP_DUMP
        DWORD           temp_num1;
        DWORD           temp_num2;
        DWORD           seq_num;
        DWORD           ack_num;
        u8              *pp;
        u8              b1, b2, b3, b4;
#endif
        NDIS_STATUS             ndisStatus;
        APPP_CB_t               *p_acb = &(lpSession->appp);   /*   APPP CB */
        S_CPCTL                 *p_lacp = &lpSession->appp.a_cpctl[LCP_LAYER];
        S_PPPHDR                *p_ppphdr;
        S_RFC1483               *p_1483hdr;
        p_ppphdr = (S_PPPHDR *) (p_pkt->CurrentBuffer);
        TRACE(TR_PPP, TR_LVL1, "[appp_rx_pkt]", 0, 0, 0, 0);
        /****
        Here we have a contiguous PPP pkt, process it as such.
        ****/
        switch (swap16(p_ppphdr->pid))
```

-continued

```
    {
        case PPP_BR_PID:                /* Bridge Data Packet    */
        case PPP_BPDU_PID:              /* BPDU
*/
        case PPP_IPX_PID:               /* IPX Data Packet        */
        case PPP_NBF_PID:               /* Netbios Data Packet    */
            // Me thinks we can discard these babies.
            ndisStatus =NDIS_STATUS_SUCCESS;
            break;
        case PPP_IP_PID:                /* IP
*/
        case PPP_COMP_TCP_PID:          /*  Compres TCP (VJ)   */
        case PPP_UNCOMP_TCP_PID:        /*  Uncomp TCP (VJ)    */
            /* Strip off the PPP header & shorten length. */
            p_pkt->CurrentBuffer += PPP_HDRLEN;
            p_pkt->CurrentLength -= PPP_HDRLEN;
#ifdef SPECIAL_UDP_DUMP
    // check the packet type
    pp = (u8 *) (p_pkt->CurrentBuffer + 0x09);
    if (*pp == 0x06)
    {
        pp = (u8 *) (p_pkt->CurrentBuffer + 24 + 3);
        b4 = *pp--;
        b3 = *pp--;
        b2 = *pp--;
        b1 = *pp;
        seq_num = (b1 << 24) + (b2 << 16) + (b3 << 8) + b4;
        pp = (u8 *) (p_pkt->CurrentBuffer + 28 + 3);
        b4 = *pp--;
        b3 = *pp--;
        b2 = *pp--;
        b1 = *pp;
        ack_num = (b1 << 24) + (b2 << 16) + (b3 << 8) + b4;
        TRACE(TR_UDP, TR_LVL1,
            "Xmit: FTP SEQ# = %lx ACK# = %lx | 10 milli-sec poll = %d",
            seq_num, ack_num, LldPollCount, 0);
    }
#endif
            // ********* Add RFC 1483 Header
            // Adjust our buffer pointers
            p_pkt->CurrentBuffer -= RFC1483_HDRLEN;
            p_1483hdr = (S_RFC1483 *) p_pkt->CurrentBuffer;
            p_1483hdr->dsap = 0xaa;
            p_1483hdr->ssap = 0xaa;
            p_1483hdr->ctrl = 0x03;
            p_1483hdr->oui[0] = 0x00;
            p_1483hdr->oui[1] = 0x00;
            p_1483hdr->oui[2] = 0x00;
            p_1483hdr->pid[0] = 0x08;
            p_1483hdr->pid[1] = 0x00;
            // Adjust the length
            p_pkt->CurrentLength += RFC1483_HDRLEN;
            ndisStatus = CobraSarTxHandler(lpSession->ndis_vc_handle,
                        ((PCOBRA_VC) (lpSession->ndis_vc_handle))->Adapter,
                        (PCOBRA_WAN_BUFFER) p_pkt);
            break;
        case PPP_LCP_PID:                                       /* Link Con
trol Protocol */
            p_pkt->CurrentLength -= PPP_HDRLEN;
            lpSession->layer = LCP_LAYER;
            appp_proc(lpSession, LCP_LAYER, p_pkt);
            ndisStatus = NDIS_STATUS_SUCCESS;
            break;
        case PPP_PAP_PID:                       /* Password Authentication Protocol
*/
            ndisStatus = NDIS_STATUS_SUCCESS;
            break;
        case PPP_BRCP_PID:                                           /* Bridge Control P
rotocol */
            /****
            We do not support Bridging.
            ****/
            ndisStatus = NDIS_STATUS_SUCCESS;
            break;
        case PPP_IPCP_PID:      /* IP Control Protocol */
            /****
            if we are not configured to support IP, but we get a
            request from the App, set it.
            ****/
```

```
                p_acb->protocols |= PPP_PROT_IP;
                /* subtract PPP Header from packet length (total bytes in pkt) */
                p_pkt->CurrentLength -= PPP_HDRLEN;
                lpSession->layer = IPCP_LAYER;
                appp_proc(lpSession, IPCP_LAYER, p_pkt);
                ndisStatus = NDIS_STATUS_SUCCESS;
                break;
            case PPP_IPXCP_PID:                                          /* IPX Control Protocol */
                /****
                if we are not configured to support IPX, but we get a
                    request from the App, set it.
                ****/
                p_acb->protocols |= PPP_PROT_IPX;
                // Subtract PPP Header from packet length (total bytes in pkt) */
                p_pkt->CurrentLength -= PPP_HDRLEN;
                lpSession->layer = IPXCP_LAYER;
                appp_proc(lpSession, IPXCP_LAYER, p_pkt);
                ndisStatus = NDIS_STATUS_SUCCESS;
                break;
            case PPP_NBFCP_PID:     /* NetBios Control Protocol */
                /****
                if we are not configured to support NetBeui, but we get a
                    request from the App, set it.
                ****/
                p_acb->protocols |= PPP_PROT_NBF;
                /****
                Do not allow NCP negotiations until we have negotiated on the net
                side for authentication.
                ****/
                // Subtract PPP Header from packet length (total bytes in pkt) */
                p_pkt->CurrentLength -= PPP_HDRLEN;
                lpSession->layer = NBFCP_LAYER;
                appp_proc(lpSession, NBFCP_LAYER, p_pkt);
                ndisStatus = NDIS_STATUS_SUCCESS;
                break;
            case PPP_CCP_PID:
                appp_send_reject_msg (lpSession, p_pkt);
                ndisStatus = NDIS_STATUS_SUCCESS;
                TRACE(TR_PPP, TR_LVL2,
                    " PPP pkt tvpe we don't like: %x; sending PROTO REJ pkt",
                    swap16(p_ppphdr->pid), 0, 0, 0);
                break;
            default:
                TRACE(TR_PPP, TR_LVL2,
                    "[appp_rx_pkt]: Unknown PPP pkt type: %x; dropping pkt\n",
                    swap16(p_ppphdr->pid), 0, 0, 0);
                ndisStatus = NDIS_STATUS_SUCCESS;
                break;
        }
        return ndisStatus;
}
/*****************************************************************************
*
*       Function:       appp_initcb - Initialize the APPP control block
*
*       Call:
*                       appp_initcb(PSESSIONINFO lpSession);
*
*       Arguments:
*                       lpSession -        Spoofing session control block.
*
*       Return Value:
*                       None
*
*       Description:
*                       Initialize the fields of the APPP connection control block.
*
******************************************************************************/
void
appp_initcb(PSESSIONINFO lpSession)
{
    APPP_CB_t               *p_acb = &(lpSession->appp);   //APPP CB
    TRACE(TR_PPP, TR_LVL1, "[appp_initcb]\n", 0, 0, 0, 0);
    /* Return port to inited stage (this resets */
    /* ctl blk vars and kills outstanding timers). */
    appp_init_all_layers(lpSession, CP_STOPPED);
    /* init the data control block associated with this PPP_cb */
    p_acb->tx_packets = 0;
```

```
      p_acb->tx_bytes = 0;
      p_acb->rx_packets = 0;
      p_acb->rx_bytes = 0;
      p_acb->pppid = 0;
}
/*********************************************************************/
/**** PPP PROTOCOL INIT FUNCTIONS                                 ****/
/*********************************************************************/
/*
 *    appp_init_all_layers -- Initialize all layers for the specified port
 *
 *         Initialize all layers control structures for the specified port
 *         which are necessary to establish and maintain a link.
 *
 *         Parameters:
 *                  lpSession        - Spoofing session Call Record.
 *                  cpstate          - new CP Layer state
 *
 *         Returns:
 *                  None
 *
 */
void
appp_init_all_layers(PSESSIONINFO lpSession, CP_states_t cpstate)
{
    TRACE(TR_PPP, TR_LVL1, "[appp_init_all_layers]\n", 0, 0, 0, 0);
    /**** Our current version only spoofs LCP and IPCP. Later
    //                  we'll add IPXCP. We never ask for authentication, nor
    //                  do we allows ourselves to be authenticated.
    appp_reset(lpSession, LCP_LAYER, cpstate, TRUE);
    appp_reset(lpSession, PAP_LAYER, cpstate, TRUE);
    appp_reset(lpSession, CHAP_LAYER, cpstate, TRUE);
    appp_reset(lpSession, IPCP_LAYER, cpstate, TRUE);
    appp_reset(lpSession, IPXCP_LAYER, cpstate, TRUE);
}
/*
 *    appp_reset -- Reset the configuration options for initial request
 *                  for the specified port.
 *
 *         Reset the state and configuration options in preparation for
 *         CFG_REQ packet.
 *
 *         Parameters:
 *                  lpSession              - Connection Call Record.
 *                  layer                  - Protocol layer
 *                  CP state               - new CP Layer state
 *                  reset_em_state         - TRUE = set emstate back to INITIAL
 *
 *         Returns:
 *                  0                      - Always
 *
 */
void
appp_reset(PSESSIONINFO lpSession, PPP_layer_t layer,
    CP_states_t cpstate, BOOL reset_emstate)
{
    APPP_CB_t     *p_acb = &(lpSession->appp);   /*    APPP CB */
    S_CPCTL       *p_acp = &lpSession->appp.a_cpctl[layer];
    TRACE(TR_PPP, TR_LVL1, "[appp_reset(%s, %s)]\n",
        (DWORD)Layers[layer], (DWORD)CPStates[cpstate], 0, 0);
    p_acp->cpstate = cpstate;
    p_acp->ack_retry = 0;
    clear_timer(lpSession);
    switch (layer)
    {
    case LCP_LAYER:
        /* Reset our config request params to our preferred values */
        p_acb->neg_mru              = TRUE; /* always try to negotiate MRU */
        p_acb->neg_ac_comp          = FALSE;
        p_acb->tx_ac_comp           = FALSE;
        p_acb->rx_ac_comp           = FALSE;
        p_acb->neg_proto_comp       = FALSE;
        p_acb->tx_proto_comp        = FALSE;
        p_acb->rx_proto_comp        = FALSE;
        p_acb->send_endpt           = FALSE;
        p_acb->rem_mru              = DEF_MRU;
        p_acb->lcl_mru              = DEF_MRU;
        /** DYN_CFG: We will fill this in as we learn it from Net **/
        p_acb->auth_flags           = 0;
```

```
            p_acb->auth_compl_flags = 0;
            /** DYN_CFG: We will fill this in as we learn them from App **/
            p_acb->protocols                    = 0;
            break;
        case CHAP_LAYER:
            break;
        case PAP_LAYER:
            break;
        case BRCP_LAYER:
            break;
        case IPCP_LAYER:
            /* Set up for IP addr exchange */
            p_acb->neg_ip_addrs                     = TRUE;
            p_acb->peer_negotiated_1st_dns_addr  = TRUE,
            /* by default, don't negotiate these unless app wants to */
            p_acb->neg_1st_dns_addr                 = FALSE;
            p_acb->neg_1st_nbns_addr                = FALSE;
            p_acb->neg_2nd_dhs_addr                 = FALSE;
            p_acb->neg_2nd_nbns_addr                = FALSE;
            p_acb->peer_negotiated_vj_comp       = FALSE;
            /*
             * We're spoofing here so the configured remote IP address
             * is "my_ip_addr" with respect to the spoofed remote side
             * It's just the opposite for the configured local IP address.
             */
            p_acb->my_ip_addr           = appp_get_remote_ip( (void *)
                                              lpSession->ndis_vc_handle);
            p_acb->peer_ip_addr         = appp_get_local_ip( (void *)
                                              lpSession->ndis_vc_handle);
            p_acb->my_1st_dns_addr      = appp_get_primary_dns_server( (void *)
                                              lpSession->ndis_vc_handle);
            p_acb->peer_lst_dns_addr    = 0;
            p_acb->my_2nd_dns_addr      = appp_get_secondary_dns_server((void *)
                                              lpSession->ndis_vc_handle);
            p_acb->peer_2nd_dns_addr    = 0;
            p_acb->my_1st_nbns_addr     = 0;
            p_acb->peer_1st_nbns_addr   = 0;
            p_acb->my_1st_nbns_addr     = 0;
            p_acb->peer_1st_nbns_addr   = 0;
            p_acb->peer_vj_max_slot_id  = 0;
            p_acb->peer_vj_comp_slot_id = 0;
            break;
        case IPXCP_LAYER:
            memset(p_acb->ipx_node, 0, SZ_IPX_NODENUM);
            memset(p_acb->ipx_route_protocol, 0, SZ_ROUTE_PROTOCOL);
            p_acb->ipx_route_len = 0;
        p_acb->ipx_network = 0;
            break;
        case NBFCP_LAYER:
            p_acb->nb_name[0] = 0;
            memset(p_acb->nb_clutter, 0, SZ_NBF_CLUTTER);
            p_acb->nb_projection_len = 0;
            memset(pacb->nb_projection, 0, SZ_NBF_NAMEPROJECT);//BUGNBFPROJ
            p_acb->nb_multicast_period = 0;
            p_acb->nb_multicast_priority= 0;
            break;
    }
}
/*
 *  appp_restart -- Reinitialize layer state machine for config exchange for
 *                  the specified port
 *
 *  Reset the layers state and configuration options and any layer above the
 *  specified layer.
 *
 *  Parameters:
 *          lpSession           - Connection Call Record.
 *          layer         - Protocol layer
 *
 *  Returns:
 *          None
 *
 */
void
appp_restart(PSESSIONINFO lpSession, PPP_layer_t layer)
{
    APPP_CB_t   *p_acb = &(lpSession->appp);  /*  APPP CB */
    S_CPCTL     *p_acp = &lpSession->appp.a_cpctl[layer];
    TRACE(TR_PPP, TR_LVL1, "[appp_restart(%s)]\n",
```

```
            (DWORD)Layers[layer], 0, 0, 0);
    /* Something went wrong; restart negotiations */
    switch (layer)
    {
    case LCP_LAYER:
        /* Reset CP state machine for configuration negotiation */
        appp_reset(lpSession, LCP_LAYER, CP_CLOSED, TRUE);
        appp_reset(lpSession, BRCP_LAYER, CP_CLOSED, TRUE);
        appp_reset(lpSession, IPCP_LAYER, CP_CLOSED, TRUE);
        appp_reset(lpSession, IPXCP_LAYER, CP_CLOSED, TRUE);
        appp_reset(lpSession, NBFCP_LAYER, CP_CLOSED, TRUE);
        /* Even though we don't use this NCP at the app side, init it */
        /* to a down state. */
        appp_reset(lpSession, CCP_LAYER, CP_CLOSED, TRUE);
        break;
    case BRCP_LAYER:
        /* Reset CP state machine for configuration negotiation */
        appp_reset(lpSession, BRCP_LAYER, CP_CLOSED, TRUE);
        break;
    case IPCP_LAYER:
        /* Reset CP state machine for configuration negotiation */
        appp_reset(lpSession, IPCP_LAYER, CP_CLOSED, TRUE);
        break;
    case IPXCP_LAYER:
        /* Reset CP state machine for configuration negotiation */
        appp_reset(lpSession, IPXCP_LAYER, CP_CLOSED, TRUE);
        break;
    case NBFCP_LAYER:
        /* Reset CP state machine for configuration negotiation */
        appp_reset(lpSession, NBFCP_LAYER, CP_CLOSED, TRUE);
        break;
    }
    return;
}
/*
*   appp_start -- Initialize layer state machine for config exchange for the
*                 specified port.
*
*   Reset the layers state and configuration options and then send out
*   a CFG_REQ packet to remote end.
*
*   Parameters:
*           lpSession           - Connection Call Record.
*           layer               - Protocol layer
*           CP state            - new CP Layer state
*
*   Returns:
*           0                   - CFG_REQ packet successfully sent.
*           -1                  - Error.
*
*/
int
appp_start(PSESSIONINFO lpSession, PPP_layer_t layer, CP_states_t cpstate)
{
    APPP_CB_t               *p_acb = &(lpSession->appp);      /* APPP CB
*/
    S_CPCTL                 *p_acp = &lpSession->appp.a_cpctl[layer];
    TRACE(TR_PPP, TR_LVL3, "[APPP] appp_start(%s, %s) \n",
        (DWORD)Layers[layer], (DWORD)CPStates[cpstate], 0, 0);
    switch (layer)
    {
    case PAP_LAYER:
        if (p_acb->auth_flags & AF_PAP_AUTHENTICATOR)
        {
            /* Start timer against wait for reception of the PAP REQUEST */
            set_timer(&lpSession->SessionTimer,
                (PPP_RESTART_TIMEOUT * PPP_MAX_CFG_COUNTER));
        }
        break;
    default:
        if (p_acp->cpstate == CP_STOPPED)
        {
            /* Stopped; wait until remote attempts connect */
            /* fall thu to "return 0" */
        }
        else
        {
            if (layer == LCP_LAYER)
            {
```

```
                // Clear auth flags
                p_acb->auth_flags = 0;
            }
            /* set new CP state */
            p_acp->cpstate = CP_REQ_SENT;
            /* state should = CLOSED, begin CP configuration negotiation */
            return(appp_sendreq(lpSession, layer));
        }
        break;
    }
    return 0;
}
/*
 *  appp_open -- Transition to OPEN state.
 *
 *      Configuration negotiations complete, set state to open
 *      (and potentially initiate appropriate _CP link (IP)).
 *
 *      For our spoofing, the only two layer we'll currently open
 *      are LCP and IPCP.
 *
 *      Parameters:
 *              lpSession       - Connection Call Record.
 *              layer           - Protocol layer
 *
 *      Returns:
 *              0               - link establishment procedures initiated.
 *              -1              - Error
 *
 */
void
appp_open(PSESSIONINFO lpSession, PPP_layer_t layer)
{
    APPP_CB_t               *p_acb = &(lpSession->appp);        /*  APPP CB  */
    char                    buf[80];
    TRACE(TR_PPP, TR_LVL1, "[appp_open(%s)]\n", (DWORD)Layers[layer], 0, 0, 0);
    /* indicate layer is open */
    TRACE(TR_PPP, TR_LVL5, "[appp_open(%s)]: APPP Connection Open (0x%x)\n",
        (DWORD)Layers[layer],
        (DWORD)lpSession->appp.a_cpctl[layer].cpstate, 0, 0);
    switch (layer)
    {
    case LCP_LAYER:
        // **** LCP is open, wait for Microsoft PPP to initiate NCP layer.
        //    Initially this will be IPCP. IPXCP gets added later.
        break;
    case PAP_LAYER:
        // **** we're not supporting authentication; therefore, it should neve
        // get opened
        break;
        break;
    case BRCP_LAYER:
        /* Indicate to upper layers that BRCP is up */
        SPYLOG("APPP - Bridging Link UP.\n", 0, 0, 0, 0);
        /****
         * (Step 6 - UP).
         * Now that the App NCP is up, unload all the data queues and go
         * into full service.
         ****/
        p_acb->ckt_state = PPP_STATE_NCP_UP;
        break;
    case IPCP_LAYER:
        TRACE(TR_PPP, TR_LVL5,
            "[appp_open]: Add route to peer (%lx)\n",
            p_acb->my_ip_addr, 0, 0, 0);
        /* Indicate to upper layers that IPCP is up */
        /* set the learned IP address in the CallData structure */
        /* for reporting reasons. */
        /* determine 2nd line of event log */
        if (p_acb->peer_ip_addr)
        {
            isc_sprintf(buf,
                "Application IP Address (%u.%u.%u.%u).",
                (u8) (p_acb->peer_ip_addr >> 24),
                (u8) (p_acb->peer_ip_addr >> 16),
                (u8) (p_acb->peer_ip_addr >> 8),
                (u8) (p_acb->peer_ip_addr & 0xff));
        }
```

```
            else
            {
                isc_strcpy(buf,
                    "No Application IP Address was configured or negotiated.");
            }
            SPYLOG("%s\n", (DWORD)buf, 0, 0, 0);
            p_acb->ckt_state = PPP_STATE_NCP_UP;
            break;
        case IPXCP_LAYER:
            /****
             * (Step 6 - UP).
             * Now that the App NCP is up, unload all the data queues and go
             * into full service.
             ****/
            p_acb->ckt_state = PPP_STATE_NCP_UP;
            break;
        case NBFCP_LAYER:
            /* Indicate to upper layers that NBFCP is up */
            /****
             * (Step 6 - UP).
             * Now that the App NCP is up, unload all the data queues and go
             * into full service.
             ****/
            p_acb->ckt_state = PPP_STATE_NCP_UP;
            break;
    }
}
/*
 *  appp_close -- Close the specified layers interface from the local side
 *                for the specified port.
 *
 *      Close the specified layers interface.
 *
 *      Parameters:
 *          lpSession       - Connection Call Record.
 *          layer           - Protocol layer
 *          CP state        - new CP Layer state
 *          ul_cpstate      - new upper layer CP state (only applicable
 *                                  for LCP_LAYER)
 *
 *      Returns:
 *          0               - Close procedure initiated sucessfully
 *          -1              - layer alreay down or error
 *
 */
int
appp_close(PSESSIONINFO lpSession, PPP_layer_t layer,
    CP_states_t cpstate, CP_states_t ul_cpstate)
{
    APPP_CB_t               *p_acb = &(lpSession->appp);      /*  APPP CB */
    S_CPCTL                 *p_acp = &lpSession->appp.a_cpctl[layer];
    PCOBRA_WAN_BUFFER       p_pkt;
    int                     retcode = 0;
    TRACE(TR_PPP, TR_LVL1, "[appp_close(%s)]\n", (DWORD)Layers[layer], 0, 0, 0);
    /* if Layer == LCP_LAYER, need to down upper layers */
    if (layer == LCP_LAYER)
    {
        appp_reset(lpSession, BRCP_LAYER, ul_cpstate, TRUE);
        appp_reset(lpSession, IPCP_LAYER, ul_cpstate, TRUE);
        appp_reset(lpSession, IPXCP_LAYER, ul_cpstate, TRUE);
        appp_reset(lpSession, NBFCP_LAYER, ul_cpstate, TRUE);
        appp_reset(lpSession, CCP_LAYER, ul_cpstate, TRUE);
    }
    /* state = INITIAL, STARTING, CLOSED, STOPPED */
    if (p_acp->cpstate <= CP_STOPPING)
    {
        /* in a state which doesn't allow TERM_REQ to be sent, */
        if (cpstate == CP_STOPPING)
            appp_reset(lpSession, layer, CP_STOPPED, TRUE);
        else
            appp_reset(lpSession, layer, CP_CLOSED, TRUE);
        return(-1);
    }
    /* ask remote host to shutdown */
    p_acp->cpstate = cpstate;
    p_acp->ack_retry = 0;
    clear_timer(lpSession);
    /* Set a timer against our request to shutdown */
    set_timer(&lpSession->SessionTimer, PPP_RESTART_TIMEOUT);
```

```
        /* Get packet for TERMINATE_REQ */
        if ((p_pkt = ppp_get_pkt(20)) == NULL)
        {
            if (cpstate == CP_STOPPING)
                    appp_reset(lpSession, layer, CP_STOPPED, TRUE);
            else
                    appp_reset(lpSession, layer, CP_CLOSED, TRUE);
            retcode = -1;
        }
        else
        {
            if (appp_sendreply(lpSession, layer, p_pkt, TERMINATE_REQ, 0) != 0)
            {
                if (cpstate == CP_STOPPING)
                        appp_reset(lpSession, layer, CP_STOPPED, TRUE);
                else
                        appp_reset(lpSession, layer, CP_CLOSED, TRUE);
                retcode = -1;
            }
        }
        return (retcode);
}
/**************************************************************************/
/****  PPP PROTOCOL TRANSMIT FUNCTIONS                           ****/
/**************************************************************************/
/*
*    appp_sendreq -- Build and send CFG_REQ packet.
*          Get CFG_REQ packet, build options, and send to peer.
*
*          Parameters:
*                  lpSession               - Connection Call Record.
*                  layer                   - Protocol layer
*
*          Returns:
*                  0                       - CFG_REQ packet successfully sent.
*                  -1                      - Error.
*
*/
int
appp_sendreq(PSESSIONINFO lpSession, PPP_layer_t layer)
{
        APPP_CB_t                       *p_acb = &(lpSession->appp);   /*  APPP CB
*/
        S_CPCTL                         *p_acp = &lpSession->appp.acpctl[layer];
        PCOBRA_WAN_BUFFER      p_pkt;
        u8                              *p_cfgopts;
        TRACE(TR_PPP, TR_LVL3, "[APPP] appp_sendreq(% s))\n",
            (DWORD)Layers[layer], 0, 0, 0);
        // Get packet for configuration request.
            if ((p_pkt = ppp_get_pkt(20)) == NULL)
                {
                return(-1);
                }
            // Assign pointer to the beginning of options. To do this we must
            // go past the PPP Header (A/C & PID) and Configuration header
            // (code, id & len).
            p_pkt->CurrentBuffer = p_pkt->StartBuffer;
            p_cfgopts = ((u8 *) p_pkt->CurrentBuffer) + PPP_HDRLEN + CNF_HDRLEN;
            /* load config params into buf (return size of options */
            /* field) PPP_HDRLEN and CNF_HDRLEN will be added to */
            /* data_length as it as it gets closer to being shipped. */
            p_pkt->CurrentLength = appp_makereq(lpSession, layer, p_cfgopts);
            /* Start timer against wait for reply to our config request */
            set_timer(&lpSession->SessionTimer, PPP_RESTART_TIMEOUT);
            /* Send CP configuration request to remote host */
            return(appp_sendreply(lpSession, layer, p_pkt, CONFIG_REQ, 0));
}
/*
*          appp_makereq -- Do actual build of CFG_REQ options field.
*
*                  Build options field for CFG_REQ.
*
*                  Configuration options currently supported:
*                        - Maximum Receive Unit
*
*                  Parameters:
*                        lpSession                - Connection Call Record.
*                        layer                    - Protocol layer
*                        p_opt_buf                - Ptr to options portion of CFG_REQ packet
```

-continued

```
*                                       which is getting built.
*
*
*           Returns:
*                   opt_cnt         - Size in bytes of options field.
*
*/
int
appp_makereq(PSESSIONINFO lpSession, PPP_layer_t layer, u8 *p_opt_buf)
{
        APPP_CB_t               *p_acb = &(lpSession->appp);   /*   APPP CB
        */
        u8                      *cp = p_opt_buf;
        s16                     opt_cnt = 0;
        TRACE(TR_PPP, TR_LVL3, "[APPP] Make_Request (%s)\n",
            (DWORD)Layers[layer], 0, 0, 0);
        switch (layer)
        {
        case LCP_LAYER:
            /* Maximum Receive Unit */
            if (p_acb->neg_mru)
            {
                TRACE(TR_PPP, TR_LVL3, " Asking for MRU: %d\n",
                    p_acb->lcl_mru, 0, 0, 0);
                *cp++ = MAX_RCV_UNIT;
                *cp++ = 4;
                *cp++ = p_acb->lcl_mru >> 8;
                *cp++ = p_acb->lcl_mru & 0xff;
                opt_cnt += 4;
            }
            /* AC Compression -- We won't ask for this */
            if (p_acb->rx_ac_comp)
            {
                TRACE(TR_PPP, TR_LVL3, " Requesting AC Comp\n", 0, 0, 0, 0);
                *cp++ = AC_COMPRESS;
                *cp++ = 2;
                opt_cnt += 2;
            }
            /* Protocol Compression -- We won't ask for this */
            if (p_acb->rx_proto_comp)
            {
                TRACE(TR_PPP, TR_LVL3, " Requesting Proto Comp\n", 0, 0, 0, 0);
                *cp++ = PROT_COMPRESS;
                *cp++ = 2;
                opt_cnt += 2;
            }
            // We won't be asking for this
            if (p_acb->auth_flags & AF_PAP_AUTHENTICATOR)
            {
                TRACE(TR_PPP, TR_LVL3, " PAP Authenticator\n", 0, 0, 0, 0);
                *cp++ = AUTH_TYPE;
                *cp++ = 4;
                *cp++ = PPP_PAP_PID >> 8;
                *cp++ = PPP_PAP_PID & 0xff;
                opt_cnt += 4;
            }
            break;
        case IPCP_LAYER:
            // We will share our IP information with the peer. We'll also assign
            // the peer its IP address.
            if (p_acb->neg_ip_addrs)
            {
                TRACE(TR_PPP, TR_LVL3,
                    " sending src IP addr: %x, asking for dest addr\n",
                    p_acb->my_ip_addr, 0, 0, 0);
                *cp++ = IP_ADDRS_NEW;
                *cp++ = 6;
                /****
                have to do this in chars or else fields get
                overwritten when they align
                ****/
                *cp++ = (u8) (p_acb->my_ip_addr >> 24);
                *cp++ = (u8) (p_acb->my_ip_addr >> 16);
                *cp++ = (u8) (p_acb->my_ip_addr >> 8);
                *cp++ = (u8) p_acb->my_ip_addr;
                opt_cnt += 6;
            }
            break;
        case BRCP_LAYER:
        case IPXCP_LAYER:
```

-continued

```
        case NBFCP_LAYER:
        default:
            break;
        }
        return(opt_cnt);
}
/*
 *  appp_sendreply -- Send a PPP Control packet to the peer
 *
 *      Prepend PPP Control header to packet and send to PPP output layer
 *      for transmission.
 *
 *      Parameters:
 *              lpSession               - Connection Call Record.
 *              layer                   - Protocol layer
 *              p_pkt                   - Ptr to PPP buffer to be encapsulated
 *                                              and then transmitted.
 *              code                    - CP "code" field value
 *              id                      - CP "id" field value
 *
 *      Returns:
 *              0                       - Packet successfully sent.
 *              -1                      - Error
 *
 */
int
appp_sendreply(PSESSIONINFO lpSession, PPP_layer_t layer,
                PCOBRA_WAN_BUFFER p_pkt, u8 code, u8 id)
{
    APPP_CB_t                   *p_acb = &(lpSession->appp);    /*  APPP CB
*/
    S_CPCTL                     *p_acp = &lpSession->appp.a_cpctl[layer];
    S_CNFHDR                    *p_cnfhdr;
    u32                             *p_magicnum;
    u32                             pid;
    TRACE(TR_PPP, TR_LVL3,
            "[APPP] PPP/CP Send (%s): State: %s, CP code: %s\n",
            (DWORD)Layers[layer], (DWORD)CPStates[p_acp->cpstate],
            (DWORD)CPCodes[code], 0);
    // Assign pointer to configuration header
    p_cnfhdr = (S_CNFHDR *) ((u8 *)p_pkt->CurrentBuffer + PPP_HDRLEN);
    p_magicnum = (u32 *) (((u8 *)p_cnfhdr) + CNF_HDRLEN);
    /* Load CP header values */
    p_cnfhdr->code = code;
    switch(code)
    {
    case CONFIG_REQ:    /* AKA: CHAP_CHALLENGE & PAP_REQUEST */
    case TERMINATE_REQ:
        /* Save ID field for match against replies from remote host */
        p_acp->lastid = p_acb->pppid;
        p_cnfhdr->id = p_acb->pppid++;
        break;
    case ECHO_REQ:
        if (layer != LCP_LAYER)
            goto reply_default;
        /* Save ID field for match against replies from remote host */
        p_acp->lastid = p_acb->pppid;
        p_cnfhdr->id = p_acb->pppid++;
        *p_magicnum = 0;                                /* no need to swap3
2(0) */;
        p_pkt->CurrentLength += sizeof(u32);    /* add magicnum to pktlen */
        break;
    case PROTO_REJ:
        if (layer != LCP_LAYER)
            goto reply_default;
        p_cnfhdr->id = p_acb->pppid++;
        break;
    case DISCARD_REQ:
        p_cnfhdr->id = p_acb->pppid++;
        break;
    case CONFIG_ACK:    /* AKA: CHAP_RESPONSE & PAP_ACK */
    case CONFIG_NAK:    /* AKA: CHAP_SUCCESS & PAP_NAK */
    case CONFIG_REJ:    /* AKA: CHAP_FAILURE */
    case TERMINATE_ACK:
    case CODE_REJ:
        p_cnfhdr->id = id;
        break;
    case ECHO_REPLY:
        if (layer != LCP_LAYER)
```

-continued

```
                goto reply_default;
            p_cnfhdr->id = id;
            *p_magicnum = 0;              /* no need to swap32(0) */;
            p_pkt->CurrentLength += sizeof(u32); /* add magicnum to pktlen */
            break;
        default:
    reply_default:
            /* Shouldn't happen */
            TRACE(TR_PPP, TR_LVL2, "bogus code: %d\n", code, 0, 0, 0);
            ppp_rls_pkt(p_pkt, PPP_FROM_PPP, 20);
            return(-1);
        }
        if (layer == LCP_LAYER)
            pid = PPP_LCP_PID;
        else if (layer == PAP_LAYER)
            pid = PPP_PAP_PID;
        else if (layer == BRCP_LAYER)
            pid = PPP_BRCP_PID;
        else if (layer == IPCP_LAYER)
            pid = PPP_IPCP_PID;
        else if (layer == IPXCP_LAYER)
            pid = PPP_IPXCP_PID;
        else if (layer == NBFCP_LAYER)
            pid = PPP_NBFCP_PID;
        else        /* must be unsupported protocol */
        {
            PPP_rls_pkt(p_pkt, PPP_FROM_PPP, 20);
            return(-1);
        }
        /* framesize = length of options field */
        p_cnfhdr->len = swap16((u16)(CNF_HDRLEN + p_pkt->CurrentLength));
        /* update buffer Frame Size (total bytes in pkt) */
        p_pkt->CurrentLength += CNF_HDRLEN;
        /****
        Adjust the packet offsets so that they are aligned with
        all the other methods of getting a packet to CobraSendPkt.
        Specifically, set the app_data_ptr to start of CNFHDR
        ****/
        p_pkt->CurrentBuffer = ((u8 *) p_pkt->CurrentBuffer) + PPP_HDRLEN;
        return(CobraSendPkt(lpSession, p_pkt, (u16)pid));
}
/*
 *     appp_sendtermreq -- Send a TERMINATE REQ to the peer
 *
 *          Send a TERMINATE REQ to the peer and proceed to the specified state.
 *
 *          Parameters:
 *               lpSession            - Connection Call Record.
 *               layer                - Protocol layer
 *               CP state             - new CP Layer state
 *
 *          Returns:
 *               None
 *
 */
void
appp_sendtermreq(PSESSIONINFO lpSession, PPP_layer_t layer, CP_states_t cpstate)
{
    APPP_CB_t                       *p_acb = &(lpSession->appp);  /*  APPP CB
*/
    S_CPCTL                         *p_acp = &lpSession->appp.a_cpctl[layer];
    PCOBRA_WAN_BUFFER     p_tx_pkt;
    TRACE(TR_PPP, TR_LVL3, "[APPP] send Term-Request for %s. \n",
        (DWORD)Layers[layer], 0, 0, 0);
    /* Get packet for terminate ack */
    if ((p_tx_pkt = PPP_get_pkt(20)) != NULL)
        {
        /* try to send out TERMINATE_REQ pkt */
        appp_sendreply(lpSession, layer, p_tx_pkt, TERMINATE_REQ, 0);
        }
    p_acp->cpstate = cpstate;
    return;
}
/*
 *     appp_sendtermack -- Send a TERMINATE ACK to the peer
 *
 *          Send a TERMINATE ACK to the peer and proceed to the specified state.
 *
 *          Parameters:
```

```
*               lpSession               - Connection Call Record.
*               layer                   - Protocol layer
*               CP state                - new CP Layer state
*               id                      - CP "id" field value
*
*       Returns:
*               None
*
*/
void
appp_sendtermack(PSESSIONINFO lpSession, PPP_layer_t layer,
    CP_states_t cpstate, u8 id)
{
    APPP_CB_t               *p_acb = &(lpSession->appp);    /*    APPP CB
*/
    S_CPCTL                 *p_acp = &lpSession->appp.a_cpctl[layer];
    PCOBPA_WAN_BUFFER p_tx_pkt;
    TRACE(TR_PPP, TR_LVL1, "[appp_sendtermack(%s)]\n",
        (DWORD)Layers[layer], 0, 0, 0);
    /* Get packet for terminate ack */
    if ((p_tx_pkt = PPP_get_pkt(20)) != NULL)
        {
        /* try to send out TERMINATE_ACK pkt */
        appp_sendreply(lpSession, layer, p_tx_pkt, TERMINATE_ACK, id);
        }
    p_acp->cpstate = cpstate;
    return;
}
/*
*   appp_sendcoderej -- Send a CODE REJECT to the peer
*
*       Send a CODE REJECT to the peer and proceed to the specified state.
*
*       Parameters:
*               lpSession               - Connection Call Record.
*               layer                   - Protocol layer
*               p_pkt                   - Ptr to received PPP packet
*               CP state                - new CP Layer state
*
*       Returns:
*               None
*
*/
void
appp_sendcoderej(PSESSIONINFO lpSession, PPP_layer_t layer,
    PNDIS_WAN_PACKET p_pkt, CP_states_t cpstate)
{
    APPP_CB_t               *p_acb = &(lpSession->appp);    /*       APPP CB
*/
    S_CPCTL                 *p_acp = &lpSession->appp.a_cpctl[layer];
    S_PPPHDR                *p_ppphdr;
    PCOBRA_WAN_BUFFER p_CR_pkt;
    u8                      *p_from;
    u8                      *p_to;
    s32                     i;
    s32                     numbytes;
    TRACE(TR_PPP, TR_LVL3, "[APPP] Send Code-Reject (%s).\n",
        (DWORD)Layers[layer], 0, 0, 0);
    p_ppphdr = (S_PPPHDR *) p_pkt->CurrentBuffer;
    /* Get packet for code reject */
    if ((p_CR_pkt = ppp_get_pkt(20)) != NULL)
        {
        /* need to copy info field from RX pkt into PROTO_REJ pkt */
        * make sure it doesn't exceed max negotiated length */
        p_from = (((u8 *)p_ppphdr) + PPP_HDRLEN);
        p_to = (((u8 *)p_CR_pkt->CurrentBuffer) + PPP_HDRLEN + CNF_HDRLEN);
        if (p_pkt->CurrentLength < (UINT) p_acb->rem_mru)
            numbytes = p_pkt->CurrentLength;
        else
            numbytes = p_acb->rem_mru;
        /* insert rejected-protocol after CNF_HDR */
        *p_to++ = p_ppphdr->pid >> 8;
        *p_to++ = p_ppphdr->pid & 0xff;
        p_CR_pkt->CurrentLength += 2;
        /* copy info field */
        for (i = 0; i < numbytes; i++)
            *p_to++ = *p_from;
        p_CR_pkt->CurrentLength += numbytes;
        appp_sendreply(lpSession, layer, p_CR_pkt, CODE_REJ, 0);
```

-continued

```
        }
        p_acp->cpstate = cpstate;
        return;
}
/************************************************************************/
/****    PPP PROTOCOL TIMER FUNCTIONS                                ****/
/************************************************************************/
/*
*   appp_timeout -- Timeout while waiting for reply from peer.
*
*       Depending upon CP state, process the timeout event. Actions
*       range from retransmitting the unacknowledged packet to shutting
*       down the CP connection.
*
*       Parameters:
*               lpSession       - Connection Call Record.
*
*       Returns:
*               None
*
*/
void
appp_timeout(PSESSIONINFO lpSession)
{
    APPP_CB_t             *p_acb = &(lpSession->appp);       /* APPP CB */
    S_CPCTL               *p_acp = &lpSession->appp.a_cpctl[lpSession->layer];
    PCOBRA_WAN_BUFFER     p_tx_pkt;
    TRACE(TR_PPP, TR_LVL3, "[APPP] Timeout (%s), state = %d\n",
        (DWORD)Layers[lpSession->layer], p_acp->cpstate, 0, 0);
    /* Attempt to get things going again */
    switch(p_acp->cpstate)
    {
    case CP_INITIAL:    /* Unexpected event */
    case CP_STARTING:
    case CP_CLOSED:
    case CP_STOPPED:
    case CP_OPEN:
        TRACE(TR_PPP, TR_LVL2,
            "[appp_timeout]: RX'd UNEXP PKT(%s): State: %s, CP code: %s\n",
            (DWORD)Layers[lpSession->layer], (DWORD)CPStates[p_acp->cpstate],
            (DWORD)CPCodes[CONFIG_REQ], 0);
        break;
    case CP_CLOSING:
        /* Timeout waiting for terminate ACK; send another request */
        if (++p_acp->ack_retry > PPP_MAX_TERM_COUNTER)
        {
            /* No response to our request; give it up */
            TRACE(TR_PPP, TR_LVL3,
                "[APPP]: Connection Closed w/out reply from peer\n",
                0, 0, 0, 0);
            appp_reset(lpSession, lpSession->layer, CP_CLOSED, TRUE);
        }
        else
        {
            /* Request remote host to close data link */
            TRACE(TR_PPP, TR_LVL2,
                "[APPP]: Timeout waiting for response to TERM_REQ\n",
                0, 0, 0, 0)
            /* Start timer against wait TERMINATE_REQ reply */
            set_timer(&lpSession->SessionTimer, PPP_RESTART_TIMEOUT);
            /* Get packet for Terminate Request */
            if ((p_tx_pkt = ppp_get_pkt(20)) == NULL)
            {
                appp_reset(lpSession, lpSession->layer, CP_CLOSED, TRUE);
            }
            else
            {
                /* try to send out another TERMINATE_REQ pkt */
                appp_sendreply(lpSession, lpSession->layer, p_tx_pkt,
                    TERMINATE_REQ, 0);
            }
        }
        break;
    case CP_STOPPING:
        /* Timeout waiting for terminate ACK; send another request */
        if (++p_acp->ack_retry > PPP_MAX_TERM_COUNTER)
        {
            /* No response to our request; give it up */
            TRACE(TR_PPP, TR_LVL3,
```

-continued

```
            "[APPP]: Connection Stopped w/out reply from peer\n",
            0, 0, 0, 0);
        appp_reset(lpSession, lpSession->layer, CP_STOPPED, TRUE);
    }
    else
    {
        /* Request remote host to stop data link */
        TRACE(TR_PPP, TR_LVL2,
            "[APPP]: Timeout waiting for response to TERM_REQ\n",
            0, 0, 0, 0);
        /* Start timer against wait TERMINATE_REQ reply */
        set_timer(&lpSession->SessionTimer, PPP_RESTART_TIMEOUT);
        /* Get packet for Terminate Request */
        if ((p_tx_pkt = ppp_get_pkt(20)) == NULL)
        {
            appp_reset(lpSession, lpSession->layer, CP_STOPPED, TRUE);
        }
        else
        {
            /* try to send out another TERMINATE_REQ pkt */
            appp_sendreply(lpSession, lpSession->layer, p_tx_pkt,
                TERMINATE_REQ, 0);
        }
    }
    break;
case CP_REQ_SENT:
case CP_ACK_RCVD:
case CP_ACK_SENT:
    /* Timeout waiting for ACK to our request, */
    /* or timeout waiting for request from remote host */
    if (++p_acp->ack_retry >PPP_MAX_CFG_COUNTER)
    {
        /* Remote host doesn't seem to be listening */
        SPYLOG(
            "Connection Establish Timeout (%s), PPP Connection down.\n",
            (DWORD)Layers[lpSession->layer], 0, 0, 0);
        /* terminate connection */
        em_ppp_release_conn(lpSession);
    }
    else
    {
        /* Try to get things going by sending new request */
        appp_sendreq(lpSession, lpSession->layer);
        if (p_acp->cpstate != CP_ACK_SENT)
            p_acp->cpstate = CP_REQ_SENT;
        TRACE(TR_PPP, TR_LVL2,
            "[appp_timeout(%s)]: Resent CFG_REQ pkt upstairs\n",
            (DWORD)Layers[lpSession->layer], 0, 0, 0);
    }
    break;
default:
    /* ignore */
    break;
    }
    return;
}
/************************************************************************/
/****  PPP PROTOCOL RECEIVE FUNCTIONS                                ****/
/************************************************************************/
/*
*   appp_proc -- Process the incoming CP packet
*
*       This function is called from CobraRxFrame( ).
*
*       Handle processing of incoming CP control packet to subfunctions
*       based on CP code field.
*
*       Parameters:
*               lpSession           - Connection Call Record.
*               layer               - Protocol layer
*               p_pkt               - Ptr to received PPP packet.
*
*       Returns:
*               None
*
*/
void
appp_proc(PSESSIONINFO lpSession, PPP_layer_t layer,
            PNDIS_WAN_PACKET p_pkt)
```

```
{
    APPP_CB_t        *p_acb = &(lpSession->appp);        /*    APPP CB
*/
    S_CNFHDR                    *p_cnfhdr;
    PCOBRA_WAN_BUFFER p_tx_pkt;
    // Assign pointer beyond the PPP Header portion of the packet.
    // This means we're pointing to the code, id & length.
    p_cnfhdr = (S_CNFHDR *) (((u8 *)p_pkt->CurrentBuffer) + PPP_HDRLEN);
    TRACE(TR_PPP, TR_LVL3,
            "[APPP]: App_Proc layer: %s, Code: %x\n",
            (DWORD)Layers[layer],
            p_cnfhdr->code, 0, 0);
    /* Process CP packet data */
    switch(p_cnfhdr->code)
    {
    case CONFIG_REQ:                /* Request of remote host */
        appp_rcvreq(lpSession, layer, p_pkt);
        break;
    case CONFIG_ACK:                /* Remote accepted our req */
        appp_rcvack(lpSession, layer, p_pkt);
        break;
    case CONFIG_NAK:                /* Remote adjusted our req */
        appp_rcvnak(lpSession, layer, p_pkt);
        break;
    case CONFIG_REJ:                /* Remote rejected our req */
        appp_rcvrej(lpSession, layer, p_pkt);
        break;
    case TERMINATE_REQ:             /* Remote request to close */
        appp_rcvtermreq(lpSession, layer, p_pkt);
        break;
    case TERMINATE_ACK:             /* Remote closed on request */
        appp_rcvtermack(lpSession, layer);
        break;
    case CODE_REJ:
        appp_rcvcoderej(lpSession, layer, p_pkt);
        break;
    case PROTO_REJ:
        appp_rcvprotorej(lpSession, layer, p_pkt);
        break;
    case ECHO_REQ:
        if (layer == LCP_LAYER)
        {
            /* Get packet for configuration request */
            if ((p_tx_pkt = ppp_get_pkt(20)) != NULL)
            {
                /* try to send out ECHO_REPLY pkt */
                appp_sendreply(lpSession, LCP_LAYER, p_tx_pkt, ECHO_REPLY,
                    p_cnfhdr->id);
            }
        }
        else
        {
            TRACE(TR_PPP, TR_LVL2,
            "[appp_proc]: Unimplemented CP packet type: %x; dropping pkt\n",
            p_cnfhdr->code, 0, 0, 0);
        }
        break;
    case ECHO_REPLY:
        TRACE(TR_PPP, TR_LVL2,
            "[appp_proc]: Unimplemented CP packet type: %x; dropping pkt\n",
            p_cnfhdr->code, 0, 0, 0);
        break;
    case DISCARD_REQ:
        /* As per the RFC, Simply drop this pkt */
        break;
    default:
        appp_rcvunknown(lpSession, layer, p_pkt);
        break;
    }
    return;
}
/*
 *    appp_rcvreq -- Process the received CFG_REQ from the peer.
 *
 *    Process the received CFG_REQ packet depending upon our current
 *    CP state.
 *
 *    Parameters:
 *            lpSession       - Connection Call Record.
```

```
                    layer           - Protocol layer
                    p_pkt           - Ptr to PPP buffer to be encapsulated
                                      and then transmitted.
*
*         Returns:
*                   None
*
*/
void
appp_rcvreq(PSESSIONINFO lpSession, PPP_layer_t layer, PNDIS_WAN_PACKET p_pkt)
{
    APPP_CB_t                       *p_acb = &(lpSession->appp);   /*   APPP CB
*/
    S_CPCTL                         *p_acp = &lpSession->appp.a_cpct1[layer];
    S_CNFHDR                        *p_cnfhdr;
    TRACE(TR_PPP, TR_LVL2,
            "[appp_rcvreq(%s)]\n", (DWORD)Layers[layer], 0, 0, 0);
    switch (p_acp->cpstate)
    {
        case CP_INITIAL:        // Unexpected event
        case CP_STARTING:       // Unexpected event
            TRACE(TR_PPP, TR_LVL2,
                    "[appp_rcvreq]: RX'd UNEXPECTED PKT(%s): State: %s, CP code: %s\n",
                    (DWORD)Layers[layer],
                    (DWORD)CPStates[p_acp->cpstate],
                    (DWORD)CPCodes[CONFIG_REQ], 0);
            break;
        case CP_CLOSED:
            // Position pointer to options (skip over PPP Header -- AC field and PID)
            p_cnfhdr = (S_CNFHDR *) ((u8 *) p_pkt->CurrentBuffer) + PPP_HDRLEN;
            appp_sendtermack(lpSession, layer, CP_CLOSED, p_cnfhdr->id);
            break;
        case CP_STOPPED:
            // Send our configuration request
            appp_sendreq(lpSession, layer);
            // Evaluate configuration request from remote host
            appp_chkreq(lpSession, layer, p_pkt, CP_ACK_SENT, CP_REQ_SENT);
            break;
        case CP_CLOSING:
            /* We are attempting to close connection; wait   */
            /* for timeout to resend a Terminate Request     */
            break;
        case CP_STOPPING:
            /* We are attempting to stop connection; wait    */
            /* for timeout to resend a Terminate Request     */
            break;
        case CP_REQ_SENT:
        case CP_ACK_SENT:
            /* Evaluate configuration request from remote host */
            appp_chkreq(lpSession, layer, p_pkt, CP_ACK_SENT, CP_REQ_SENT);
            break;
        case CP_ACK_RCVD:
            /* Stop timer against wait for config request */
            clear_timer(lpSession);
            /* Evaluate configuration request from remote host */
            appp_chkreq(lpSession, layer, p_pkt, CP_OPEN, CP_ACK_RCVD);
            break;
        case CP_OPEN:   /* Unexpected event */
            /* Something went wrong; restart negotiations */
            appp_restart(lpSession, layer);
            /* Send our configuration request */
            appp_sendreq(lpSession, layer);
            /* Evaluate configuration request from remote host */
            appp_chkreq(lpSession, layer, p_pkt, CP_ACK_SENT, CP_REQ_SENT);
            break;
        default:
            * ignore */
            break;
    }
    return;
}
/*
*    appp_chkreq -- Check link control options requested by the peer.
*
*         Check the link control options received in the peers CFG_REQ
*         packet. Build and send response to peers option request (either
*         ACK if all options OK, NAK which includes naked options, or REJECT
*         which includes rejected options).
*
```

```
*       LCP Configuration options check:
*               - Maximum Receive Unit
*                       MIN_MRU <= cfgreq->mru <= DEF_MRU
*
*               - Async Ctrl Map
*                       ALWAYS accept, but never process (as per RFC1172).
*
*               - Magic Number
*
*               - Authorization Type
*                       CHAP first, then PAP
*
*               - Protocol Field Compression
*               - Address/Control Field Compression
*               - Encryption Type
*               - Link Quality Monitoring
*                       REJECT (not supported)
*
*       IPCP Configuration options check:
*               - IP address
*                       Remote peers address ONLY
*
*               - IP Header Compression
*
*       CCP Configuration options check:
*               - Compression Type
*               - History Buffer
*               - Check Type
*
*       Parameters:
*               lpSession               - Connection Call Record.
*               layer                   - Protocol layer
*               p_pkt                   - Ptr to PPP buffer to be encapsulated
*                                         and then transmitted.
*               ack_cpstate             - ACK
*
*       Returns:
*               None
*
*/
void
appp_chkreq(PSESSIONINFO lpSession, PPP_layer_t layer,
    PNDIS_WAN_PACKET p_pkt, u16 ack_cpstate, u16 nak_cpstate)
{
    APPP_CB_t               *p_acb = &(lpSession->appp);         /*    APPP CB
*/
    S_CPCTL                 *p_acp = &lpSession->appp.a_cpctl[layer];
    S_CNFHDR                *p_cnfhdr;
    S_OPTHDR                *p_opthdr;
    u8                              *p_optdata;
    PCOBRA_WAN_BUFFER       p_ACK_pkt;
    u8                              *p_ACK_buf;
    s16                             i, ilen;
    s16                             alloptslen;
    s16                             optdatalen;
    s8                              opt_accept;
/* Per option reply */
    s8                              cnf_accept = CONFIG_ACK;   /* Overall repl
y to req */
    s16                             minoptlen;
    BOOL                            req_contains_1st_dns_option = FALSE;
    BOOL                            req_contains_1st_nbns_option = FALSE;
    BOOL                            req_contains_2nd_dns_option = FALSE;
    BOOL                            req_contains_2nd_nbns_opt    = FALSE;
    TRACE(TR_PPP, TR_LVL3, "[APPP] Check_Request (%s)\n",
        (DWORD)Layers[layer], 0, 0, 0);
    p_cnfhdr = (S_CNFHDR *)(((u8 *)p_pkt->CurrentBuffer) + PPP_HDRLEN);
    p_opthdr = (S_OPTHDR *)(((u8 *)p_cnfhdr) + CNF_HDRLEN);
    /* Get CFG_ACK packet */
    if ((p_ACK_pkt = ppp_get_pkt(20)) == NULL)
    {
        return;
    }
    /* Set ptr to CFG_ACK buffers option field */
    p_ACK_buf = ((u8 *)p_ACK_pkt->CurrentBuffer) + PPP_HDRLEN + CNF_HDRLEN;
    /* Make sure length in CP config header is realistic */
    if (p_pkt->CurrentLength < (DWORD) swap16(p_cnfhdr->len))
    {
        p_cnfhdr->len = swap16((u16)p_pkt->CurrentLength);
```

```
}
alloptslen = swap16(p_cnfhdr->len) - CNF_HDRLEN;
minoptlen = 2;     // Any option has to have type + length
/* Process options requested by remote host */
for (; alloptslen >= minoptlen; alloptslen -= p_opthdr->len,
    p_opthdr = (S_OPTHDR *)((u8 *)p_opthdr + p_opthdr->len))
{
    optdatalen = p_opthdr->len - 2;    /* Get curr opts data len */
                    /* Set ptr to option data */
    p_optdata = ((u8 *)p_opthdr) + 2;
    opt_accept = CONFIG_ACK;   /* Assume will accept option */
    TRACE(TR_PPP, TR_LVL3,
            " Layer(%s) Type(%d)", (ULONG) Layers[layer],
            p_opthdr->type, 0, 0);
    if (layer == LCP_LAYER)
    {
        u16 i16;
        switch(p_opthdr->type)
        {
            case MAX_RCV_UNIT:
                /* Max Receive Unit is a 16bit field */
                ilen = 2;
                if (optdatalen < ilen)
                {
                    /* Short option data; reject packet */
                    opt_accept = CONFIG_REJ;
                    break;
                }
                /* Get proposed value from packet */
                i16 = (*p_optdata << 8) | *(p_optdata+1);
                TRACE (TR_PPP, TR_LVL3, "    MRU = %d \n", i16, 0, 0, 0);
                /* Check if new value is appropriate */
                if (i16 < MIN_MRU)
                {
                    /* Too small, ask for minimum instead */
                    opt_accept = CONFIG_NAK;
                    *p_optdata = MIN_MRU >> 8;
                    *(p_optdata + 1) = MIN_MRU & 0xff;
                    i16 = MIN_MRU;
                }
                else
                {
                    /* Value is acceptable */
                    opt_accept = CONFIG_ACK;
                }
                p_acb->rem_mru = i16;
                break;
            case ASYNC_CTL_MAP:  /* Async Control Map */
                TRACE(TR_PPP, TR_LVL3, " async control map\n",
                    0, 0, 0, 0);
                /* Async control map is a 32bit field */
                ilen = 4;
                if (optdatalen < ilen)
                {
                    /* Short option data; reject packet */
                    opt_accept = CONFIG_REJ;
                    break;
                }
                /* OTHERWISE, BLINDLY ACCEPT BECAUSE WE WILL NOT */
                /* DO ANY MAPPING, BUT WE NEED TO ack THEIR OPTION */
                /* REQUEST */
                opt_accept = CONFIG_ACK;
                break;
            case AUTH_TYPE:
                // ************
                // We don't do AUTH
                /* Get proposed value from packet */
                i16 = (*p_optdata << 8) | *(p_optdata+1);
                /* Check to see if CHAP or PAP is requested */
                if (i16 == PPP_CHAP_PID)
                {
                    TRACE(TR_PPP, TR_LVL3, " CHAP Auth - reject it!\n",
                        0, 0, 0, 0);
                    ilen = 3;
                    /* blindly smack him down, we will not be an Auth Peer */
                    opt_accept = CONFIG_REJ;
                }
                else if (i16 == PPP_PAP_PID)
                {
```

-continued

```
                    TRACE(TR_PPP, TR_LVL3, " PAP Auth - reject it!\n",
                        0, 0, 0, 0);
                    ilen = 2;
                    /* blindly smack him down, we will not be an Auth Peer */
                    opt_accept = CONFIG_REJ;
                }
                else
                {
                    TRACE(TR_PPP, TR_LVL3, " INVALID AUTH (%x) - reject it!\n",
                        i16, 0, 0, 0);
                    /*** THIS OPTION IS NOT NEGOTIABLE, REJECT ***/
                    ilen = 0;
                    opt_accept = CONFIG_REJ;
                }
                break;
            case MAGIC_NUMBER:   /* Magic Number */
                TRACE(TR_PPP, TR_LVL3, " magic number\n",
                    0, 0, 0, 0);
                /* Magic Number is a 32bit field */
                ilen = 4;
                if (optdatalen < ilen)
                {
                    /* Short option data; reject packet */
                    opt_accept = CONFIG_REJ;
                    break;
                }
                /* OTHERWISE, BLINDLY ACCEPT BECAUSE WE WILL NOT */
                /* DO ANY MAPPING, BUT WE NEED TO ack THEIR OPTION */
                /* REQUEST */
                opt_accept = CONFIG_ACK;
                break;
            case PROT_COMPRESS:
                TRACE(TR_PPP, TR_LVL3, " protocol compression\n",
                    0, 0, 0, 0);
                ilen = optdatalen;
                // This feature is turned off by default.
                if (!p_acb->neg_proto_comp)
                {
                    opt_accept = CONFIG_REJ;
                    TRACE(TR_PPP, TR_LVL3,
                        "   Not negotiating - Reject it.\n", 0, 0, 0, 0);
                    break;
                }
                /* should be 0 opt data bytes left */
                if (ilen)
                {
                    opt_accept = CONFIG_REJ;
                }
                else
                {
                    p_acb->tx_proto_comp = TRUE;
                    opt_accept = CONFIG_ACK;
                }
                break;
            case AC_COMPRESS:
                TRACE(TR_PPP, TR_LVL3, " addr/ctl compression\n", 0, 0, 0, 0);
                ilen = optdatalen;
                // This feature is turned off by default.
                if (!p_acb->neg_ac_comp)
                {
                    opt_accept = CONFIG_REJ;
                    TRACE(TR_PPP, TR_LVL3,
                        "   Not negotiating - Reject it.\n", 0, 0, 0, 0);
                    break;
                }
                /* should be 0 opt data bytes left */
                if (ilen)
                {
                    opt_accept = CONFIG_REJ;
                }
                else
                {
                    p_acb->tx_ac_comp = TRUE;
                    opt_accept = CONFIG_ACK;
                }
                break;
#ifdef ACCEPT_CALL_BACK
            case CALL_BACK:
                TRACE(TR_PPP, TR_LVL3, " Call Back\n",
```

-continued

```
                            0, 0, 0, 0);
                        ilen = optdatalen;
                        /* FOR NOW, BLINDLY ACCEPT FOR MINIPORT CHECK */
                        opt_accept = CONFIG_ACK;
                        break;
#endif
                    case FCS_32:      /* 32-bit FCS not implemented */
                        TRACE(TR_PPP, TR_LVL3, " 32-bit FCS - reject it!\n",
                            0, 0, 0, 0);
                        /*** THIS OPTION IS NOT NEGOTIABLE, REJECT ***/
                        ilen = 0;
                        opt_accept = CONFIG_REJ;
                        break;
                    case MPP_MRRU:    /* MPP MRRU */
                        SPYLOG("Application asking for MLPPP. Turbo is on so reject.\n",
                            0, 0, 0, 0);
                        ilen = 2;
                        opt_accept = CONFIG_REJ;
                        break;
                    case MPP_SHORTSEQNUM:   /* MPP Short Sequence Numbers */
                        TRACE(TR_PPP, TR_LVL3, " MPP short seq nums - reject it!\n",
                            0, 0, 0, 0);
                        /*** THIS OPTION IS NOT NEGOTIABLE, REJECT ***/
                        ilen = 0;
                        opt_accept = CONFIG_REJ;
                        break;
                    case MPP_ENDPOINT_ID:     /* MPP Endpoint ID */
                        TRACE(TR_PPP, TR_LVL3, " endpoint ID - reject it!\n",
                            0, 0, 0, 0);
                        /*** Since we don't support MPP, reject it ***/
                        ilen = optdatalen;
                        opt_accept = CONFIG_REJ;
                        break;
                    case QUALITY_PROTOCOL:   /* Link Qual Monitor not implemented */
                    default:                  /* Unknown option */
                        TRACE(TR_PPP, TR_LVL3,
                            " UNIMP option: %x, len: %d - reject it!\n",
                            p_opthdr->type, p_opthdr->len, 0, 0);
                        opt_accept = CONFIG_REJ;
                        /* protect from bogus packet or buffer overrun */
                        if ((p_opthdr->len <= 0) || (alloptslen < p_opthdr->len))
                        {
                            p_opthdr->len = (u8) alloptslen;
                            ilen = alloptslen-2;
                        }
                        else
                        {
                            ilen = optdatalen;
                        }
                        break;
                }
            }
            else if (layer == IPCP_LAYER)
            {
                u32 reqpeer_ip;
                u16 comp_prot;
                switch (p_opthdr->type)
                {
                    case IP_ADDRS_NEW: /* IP address */
                        TRACE(TR_PPP, TR_LVL3, " negotiate IP addrs\n",
                            0, 0, 0, 0);
                        /* IP Addr is a 32bit field */
                        ilen = 4;
                        if (optdatalen < ilen)
                        {
                            /* Short option data; reject packet */
                            opt_accept = CONFIG_REJ;
                            break;
                        }
                        /* Get proposed value from packet */
                        reqpeer_ip = *p_optdata;
                        reqpeer_ip = (reqpeer_ip << 8) | *(p_optdata + 1);
                        reqpeer_ip = (reqpeer_ip << 8) | *(p_optdata + 2);
                        reqpeer_ip = (reqpeer_ip << 8) | *(p_optdata + 3);
                        /* If the App side is requesting an IP Addr and the Net */
                        /* side gave us one, relay it back to the App. */
                        if (reqpeer_ip != p_acb->peer_ip_addr)
                        {
                            TRACE(TR_PPP, TR_LVL3,
```

```
                "   Changing App IP from %x to %x\n",
                reqpeer_ip, p_acb->peer ip_addr, 0, 0);
            opt_accept = CONFIG_NAK;
            *p_optdata       = (u8)  (p_acb->peer_ip_addr >> 24);
            *(p_optdata + 1) = (u8)  (p_acb->peer_ip_addr >> 16);
            *(p_optdata + 2) = (u8)  (p_acb->peer_ip_addr >> 8);
            *(p_optdata + 3) = (u8)  (p_acb->peer_ip_addr & 0xff);
        }
        else
        {
            /* Blindly accept because the Net side didn't */
            /* engage in IP Addr negotiation (for whatever reason). */
            opt_accept = CONFIG_ACK;
        }
        break;
    case IP_1st_DNS_SERVER:    /* 1st DNS address */
        TRACE(TR_PPP, TR_LVL3, " negotiate 1st DNS addrs\n",
            0, 0, 0, 0);
        req_contains_1st_dns_option = TRUE;
        /* IP Addr is a 32bit field */
        ilen = 4;
        if (optdatalen < ilen)
        {
            /* Short option data; reject packet */
            opt_accept = CONFIG_REJ;
            break;
        }
        /* Get proposed value from packet */
        reqpeer_ip = *p_optdata;
        reqpeer_ip = (reqpeer_ip << 8) | *(p_optdata + 1);
        reqpeer_ip = (reqpeer_ip << 8) | *(p_optdata + 2);
        reqpeer_ip = (reqpeer_ip << 8) | *(p_optdata + 3);
        /* If the App side is requesting a Primary DNS Addr and the */
        /* Net side gave us one, relay it back to the App. */
        if (reqpeer_ip != p_acb->my_1st_dns_addr)
        {
            p_acb->neg_1st_dns_addr = TRUE;
            TRACE(TR_PPP, TR_LVL3,
                "   Changing App 1st DNS from %x to %x\n",
                reqpeer_ip, p_acb->my_1st_dns_addr, 0, 0);
            opt_accept = CONFIG_NAK;
            *p_optdata       = (u8) (p_acb->my_1st_dns_addr >> 24);
            *(p_optdata + 1) = (u8) (p_acb->my_1st_dns_addr >> 16);
            *(p_optdata + 2) = (u8) (p_acb->my_1st_dns_addr >> 8);
            *(p_optdata + 3) = (u8) (p_acb->my_1st_dns_addr & 0xff);
        }
        else
        {
            /*
             * If we've actually negotiated something, then
             * ACK it -- else REJect it
             */
            if (reqpeer_ip == 0)
                opt_accept = CONFIG_REJ;
            else
                opt_accept = CONFIG_ACK;
        }
        break;
    case IP_1st_NBNS_SERVER:  /* 1st NBNS address */
        TRACE(TR_PPP, TR_LVL3, " negotiate 1st NBNS addr\n",
            0, 0, 0, 0);
        req_contains_1st_nbns_option = TRUE;
        /* IP Addr is a 32bit field */
        ilen = 4;
        if (optdatalen < ilen)
        {
            /* Short option data; reject packet */
            opt_accept = CONFIG_REJ;
            break;
        }
        /* Get proposed value from packet */
        reqpeer_ip = *p_optdata;
        reqpeer_ip = (reqpeer_ip << 8) | *(p_optdata + 1);
        reqpeer_ip = (reqpeer_ip << 8) | *(p_optdata + 2);
        reqpeer_ip = (reqpeer_ip << 8) | *(p_optdata + 3);
        /* If the App side is requesting a Primary NBNS Addr and */
        /* Net side gave us one, relay it back to the App. */
        if (reqpeer_ip != p_acb->peer_1st_nbns_addr)
        {
```

```
            TRACE(TR_PPP, TR_LVL3,
                "   Changing App 1st NBNS from %x to %x\n",
                reqpeer_ip, p_acb->peer_1st_nbns_addr, 0, 0);
            opt_accept = CONFIG_NAK;
            *p_optdata = (u8) (p_acb->peer_1st_nbns_addr >> 24);
            *(p_optdata + 1) = (u8) (p_acb->peer_1st_nbns_addr >> 16);
            *(p_optdata + 2) = (u8) (p_acb->peer_1st_nbns_addr >> 8);
            *(p_optdata + 3) = (u8) (p_acb->peer_1st_nbns_addr & 0xff);
        }
        else
        {
            /* Blindly accept because the Net side didn't */
            /* engage in 1st NBNS Addr negot (for whatever reason). */
            opt_accept = CONFIG_REJ;
        }
        break;
    case IP_2nd_DNS_SERVER:   /* 2nd DNS address */
        TRACE(TR_PPP, TR_LVL3, " negotiate 2nd DNS addr\n",
            0, 0, 0, 0);
        req_contains_2nd_dns_option = TRUE;
        /* IP Addr is a 32bit field */
        ilen = 4;
        if (optdatalen < ilen)
        {
            /* Short option data; reject packet */
            opt_accept = CONFIG_REJ;
            break;
        }
        /* Get proposed value from packet */
        reqpeer_ip = *p_optdata;
        reqpeer_ip = (reqpeer_ip << 8) | *(p_optdata + 1);
        reqpeer_ip = (reqpeer_ip << 8) | *(p_optdata + 2);
        reqpeer_ip = (reqpeer_ip << 8) | *(p_optdata + 3);
        /* If the App side is requesting a Secondary DNS Addr and */
        /* the Net side gave us one, relay it back to the App. */
        if (reqpeer_ip != p_acb->my_2nd_dns_addr)
        {
            TRACE(TR_PPP, TR_LVL3,
                "   Changing App 2nd DNS from %x to %x\n",
                reqpeer_ip, p_acb->my_2nd_dns_addr, 0, 0);
            opt_accept = CONFIG_NAK;
            *p_optdata = (u8) (p_acb->my_2nd_dhs_addr >> 24);
            *(p_optdata + 1) = (u8) (p_acb->my_2nd_dns_addr >> 16);
            *(p_optdata + 2) = (u8) (p_acb->my_2nd_dns_addr >> 8);
            *(p_optdata + 3) = (u8) (p_acb->my_2nd_dns_addr & 0xff);
        }
        else
        {
            /* Blindly accept because the Net side didn't */
            /* engage in 2nd DNS Addr negot (for whatever reason). */
            opt_accept = CONFIG_REJ;
        }
        break;
    case IP_2nd_NBNS_SERVER: /* 2nd NBNS address */
        TRACE(TR_PPP, TR_LVL3, " negotiate 2nd NBNS addr\n",
            0, 0, 0, 0);
        req_contains_2nd_nbns_option = TRUE;
        /* IP Addr is a 32bit field */
        ilen = 4;
        if (optdatalen < ilen)
        {
            /* Short option data; reject packet */
            opt_accept = CONFIG_REJ;
            break;
        }
        /* Get proposed value from packet */
        reqpeer_ip = *p_optdata;
        reqpeer_ip = (reqpeer_ip << 8) | *(p_optdata + 1);
        reqpeer_ip = (reqpeer_ip << 8) | *(p_optdata + 2);
        reqpeer_ip = (reqpeer_ip << 8) | *(p_optdata + 3);
        /* If the App side is requesting a Secondary NBNS Addr and */
        /* the Net side gave us one, relay it back to the App. */
        if (reqpeer_ip != p_acb->peer_2nd_nbns_addr)
        {
            TRACE(TR_PPP, TR_LVL3,
                "   Changing App 2nd NBNS from %x to %x\n",
                reqpeer_ip, p_acb->peer_2nd_nbns_addr, 0, 0);
            opt_accept = CONFIG_NAK;
            *p_optdata = (u8) (p_acb->peer_2nd_nbns_addr >> 24);
```

```
            *(p_optdata + 1) = (u8) (p_acb->peer_2nd_nbns_addr >> 16);
            *(p_optdata + 2) = (u8) (p_acb->peer_2nd_nbns_addr >> 8);
            *(p_optdata + 3) = (u8) (p_acb->peer_2nd_nbns_addr & 0xff);
        }
        else
        {
            /* Blindly accept because the Net side didn't */
            /* engage in 2nd NBNS Addr negot (for whatever reason). */
            opt_accept = CONFIG_REJ;
        }
        break;
    case IP_COMPR_TYPE:   /* IP header compression */
        /* VJ_Compression enabled? */
        if (p_acb->peer_negotiated_vj_comp)
        {
            TRACE(TR_PPP, TR_LVL3, " VJ compression\n",
                0, 0, 0, 0);
            ilen = 4;
            if (optdatalen != ilen)
            {
                /* Short option data; reject packet */
                opt_accept = CONFIG_REJ;
                break;
            }
            /* Get proposed value from packet */
            comp_prot = *p_optdata;
            comp_prot = (comp_prot << 8) | *(p_optdata + 1);
            if (comp_prot != PPP_COMP_TCP_PID)
            {
                /* Unsupported IP Compression Protocol */
                opt_accept = CONFIG_REJ;
                break;
            }
            else
            {
                /* If the Net side NAKed the Apps original Slot-ID */
                /* we need to smack the App back to accept the */
                /* Slot-IDs that the Net gave us. */
                if ((*(p_optdata + 2) != p_acb->peer_vj_max_slot_id) ||
                    (*(p_optdata + 3) != p_acb->peer_vj_comp_slot_id))
                {
                    TRACE(TR_PPP, TR_LVL3,
                        "   Changing VJ Slot-ID values to match Net\n",
                        0, 0, 0, 0);
                    opt_accept = CONFIG_NAK;
                    *(p_optdata + 2) = p_acb->peer_vj_max_slot_id;
                    *(p_optdata + 3) = p_acb->peer_vj_comp_slot_id;
                }
                else
                {
                    /* Accept (Slot IDs were correct) */
                    opt_accept = CONFIG_ACK;
                }
            }
        }
        else
        {
            TRACE(TR_PPP, TR_LVL3,
                " VJ_COMP, NOT ENABLED - reject it!\n",
                0, 0, 0, 0);
            /*** THIS OPTION IS NOT ENABLED, REJECT ***/
            ilen = optdatalen;
            opt_accept = CONFIG_REJ;
        }
        break;
    default:                /* Unknown option */
        TRACE(TR_PPP, TR_LVL3,
            " UNIMP option: %x, len: %d\n",
            p_opthdr->type, p_opthdr->len, 0, 0);
        opt_accept = CONFIG_REJ;
        /* protect from bogus packet or buffer overrun */
        if ((p_opthdr->len <= 0) || (alloptslen < p_opthdr->len))
        {
            p_opthdr->len = (u8) alloptslen;
            ilen = alloptslen-2;
        }
        else
        {
            ilen = optdatalen;
```

-continued

```
                }
                break;
        }
}
if ((opt_accept == CONFIG_ACK) && (cnf_accept != CONFIG_ACK))
{
        /* This option was good, but a previous    */
        /* option was not. Return only those options */
        /* which are being nacked/rejected.        */
        continue;
}
if (opt_accept == CONFIG_NAK)
{
        if (cnf_accept == CONFIG_REJ)
        {
                /* Return only those options  */
                /* which are being rejected.  */
                continue;
        }
                if (cnf_accept == CONFIG_ACK)
                {
                        /* Discard current list of good options */
                        /* Rest buffer bytecount */
                        p_ACK_pkt->CurrentLength = 0;
                        /* Reinit ptr to CFG_ACK buffers option field */
                        p_ACK_buf = ((u8 *)p_ACK_pkt->CurrentBuffer) + PPP_HDRLEN + CNF HDRLEN;
                        /* Send a list of nacked options */
                        cnf_accept = CONFIG_NAK;
                }
        }
        if (opt_accept == CONFIG_REJ)
        {
                if (cnf_accept != CONFIG_REJ)
                {
                        /* Discard current list of good options */
                        /* Rest buffer bytecount */
                        p_ACK_pkt->CurrentLength = 0;
                        /* Reinit ptr to CFG_ACK buffers option field */
                        p_ACK_buf = ((u8 *)p_ACK_pkt->CurrentBuffer) + PPP_HDRLEN + CNF_HDRLEN;
                        /* Send a list of rejected options */
                        cnf_accept = CONFIG_REJ;
                }
        }
        /* Add option response to the return list */
        *p_ACK_buf++ = p_opthdr->type;
        *p_ACK_buf++ = ilen + OPT_HDRLEN;
        for (i = 0; i < ilen; i++)
        {
                *p_ACK_buf++ = *p_optdata++;
        }
        /* Bump buffer bytecount by size of REPLY option */
        p_ACK_pkt->CurrentLength += ilen + OPT_HDRLEN;
} // for each option
/*
* Here is the Mother of all Kludges thanks to Microsoft. If the
* MS IPCP has originally requested a DNS or NBNS Server Address
* (in the first 3 packets) and has fallen back (4th–10th packet),
* we need to NAK the IPCP CFG_REQ pkt and inject the DNS and NBNS
* option into the packet so that the MS IPCP will again include this
* option in the IPCP CFG_REQ (in which we will then ACK).
*/
if (p_acb->neg_1st_dns_addr && layer == IPCP_LAYER &&
                                    //BUGIPX2
        (req_contains_1st_dns_option == FALSE) && (cnf_accept != CONFIG_REJ))
{
        if (cnf_accept == CONFIG_ACK)
        {
                /* Discard current list of good options */
                /* Rest buffer bytecount */
                p_ACK_pkt->CurrentLength = 0;
                /* Reinit ptr to CFG_ACK buffers option field */
                p_ACK_buf = ((u8 *)p_ACK_pkt->CurrentBuffer) + PPP_HDRLEN + CNF_HDRLEN;
                /* Send a list of nacked options */
                cnf_accept = CONFIG_NAK;
        }
        TRACE(TR_PPP, TR_LVL2,
                "[appp_chkreq] NAKing to JUMPSTART 1st DNS addr: %x\n".
                p_acb->my_1st_dns_addr, 0, 0, 0);
        /* Add option response to the return list */
```

```
            *p_ACK_buf++ = IP_1st_DNS_SERVER;
            *p_ACK_buf++ = 6;
            /* have to do this in chars or else fields get */
            /* overwritten when they align */
            *p_ACK_buf++ = (u8) (p_acb->my_1st_dns_addr >> 24);
            *p_ACK_buf++ = (u8) (p_acb->my_1st_dns_addr >> 16);
            *p_ACK_buf++ = (u8) (p_acb->my_1st_dns_addr >> 8);
            *p_ACK_buf++ = (u8) p_acb->my_1st_dns_addr;
            /* Bump buffer bytecount by size of REPLY option */
            p_ACK_pkt->CurrentLength += 6;
        }
        if (p_acb->neg_1st_nbns_addr && p_acb->peer_negotiated_1st_nbns_addr &&
            layer == IPCP_LAYER &&
                //BUGIPX2
            (req_contains_1st_nbns_option == FALSE) && (cnf_accept != CONFIG_REJ))
        {
            if (cnf_accept == CONFIG_ACK)
            {
                /* Discard current list of good options */
                /* Rest buffer bytecount */
                p_ACK_pkt->CurrentLength = 0;
                /* Reinit ptr to CFG_ACK buffers option field */
                p_ACK_buf = ((u8 *)p_ACK_pkt->CurrentBuffer) + PPP_HDRLEN + CNF_HDRLEN;
                /* Send a list of nacked options */
                cnf_accept = CONFIG_NAK;
            }
            TRACE(TR_PPP, TR_LVL2,
                "[appp_chkreq] NAKing to JUMPSTART 1st NBNS addr: %x\n",
                p_acb->my_1st_nbns_addr, 0, 0, 0);
            /* Add option response to the return list */
            *p_ACK_buf++ = IP_1st_NBNS_SERVER;
            *p_ACK_buf++ = 6;
            /* have to do this in chars or else fields get */
            /* overwritten when they align */
            *p_ACK_buf++ = (u8) (p_acb->my_1st_nbns_addr >> 24);
            *p_ACK_buf++ = (u8) (p_acb->my_1st_nbns_addr >> 16);
            *p_ACK_buf++ = (u8) (p_acb->my_1st_nbns_addr >> 8);
            *p_ACK_buf++ = (u8) p_acb->my_1st_nbns_addr;
            /* Bump buffer bytecount by size of REPLY option */
            p_ACK_pkt->CurrentLength += 6;
        }
        if (p_acb->neg_2nd_dns_addr && p_acb->peer_negotiated_2nd_dns_addr &&
            layer == IPCP_LAYER &&
                //BUGIPX2
            (req_contains_2nd_dns_option == FALSE) && (cnf_accept != CONFIG_REJ))
        {
            if (cnf_accept == CONFIG_ACK)
            {
                /* Discard current list of good options */
                /* Rest buffer bytecount */
                p_ACK_pkt->CurrentLength = 0;
                /* Reinit ptr to CFG_ACK buffers option field */
                p_ACK_buf = ((u8 *)p_ACK_pkt->CurrentBuffer) + PPP_HDRLEN + CNF_HDRLEN;
                /* Send a list of nacked options */
                cnf_accept = CONFIG_NAK;
            }
            TRACE(TR_PPP, TR_LVL2,
                "[appp_chkreq] NAKing to JUMPSTART 2nd DNS addr: %lx\n",
                p_acb->my_2nd_dns_addr, 0, 0, 0);
            /* Add option response to the return list */
            *p_ACK_buf++ = IP_2nd_DNS_SERVER;
            *p_ACK_buf++ = 6;
            /* have to do this in chars or else fields get */
            /* overwritten when they align */
            *p_ACK_buf++ = (u8) (p_acb->my_2nd_dns_addr >> 24);
            *p_ACK_buf++ = (u8) (p_acb->my_2nd_dns_addr >> 16);
            *p_ACK_buf++ = (u8) (p_acb->my_2nd_dns_addr >> 8);
            *p_ACK_buf++ = (u8)p_acb->my_2nd_dns_addr;
            /* Bump buffer bytecount by size of REPLY option */
            p_ACK_pkt->CurrentLength += 6;
        }
        if (p_acb->neg_2nd_nbns_addr && p_acb->peer_negotiated_2nd_nbns_addr &&
            layer == IPCP_LAYER &&
                //BUGIPX2
            (req_contains_2nd_nbns_option == FALSE) && (cnf_accept != CONFIG_REJ))
        {
            if (cnf_accept == CONFIG_ACK)
            {
                /* Discard current list of good options */
```

-continued

```
            /* Rest buffer bytecount */
            p_ACK_pkt->CurrentLength = 0;
            /* Reinit ptr to CFG_ACK buffers option field */
            p_ACK_buf = ((u8 *)p_ACK_pkt->CurrentBuffer) + PPP_HDRLEN + CNF_HDRLEN;
            /* Send a list of nacked options */
            cnf_accept = CONFIG_NAK;
        }
        TRACE(TR_PPP, TR_LVL2,
            "[appp_chkreq] NAKing to JUMPSTART 2nd NBNS addr: %lx\n",
            p_acb->my_2nd_nbns_addr, 0, 0, 0);
        /* Add option response to the return list */
        *p_ACK_buf++ = IP_2nd_NBNS_SERVER;
        *p_ACK_buf++ = 6;
        /* have to do this in chars or else fields get */
        /* overwritten when they align */
        *p_ACK_buf++ = (u8) (p_acb->my_2nd_nbns_addr >> 24);
        *p_ACK_buf++ = (u8) (p_acb->my_2nd_nbns_addr >> 16);
        *p_ACK_buf++ = (u8) (p_acb->my_2nd_nbns_addr >> 8);
        *p_ACK_buf++ = (u8) p_acb->my_2nd_nbns_addr;
        /* Bump buffer bytecount by size of REPLY option */
        p_ACK_pkt->CurrentLength += 6;
    }
    /* Send ACK/NAK/REJ to remote host */
    if (cnf_accept == CONFIG_ACK)
    }
    TRACE(TR_PPP, TR_LVL3, "Accept all options requested by peer\n",
            0, 0, 0, 0);
        /* Accept configuration requested by remote host */
        appp_sendreply(lpSession, layer, p_ACK_pkt, CONFIG_ACK, p_cnfhdr->id);
        p_acp->cpstate = ack_cpstate;
        /* if we just transitioned to OPEN state */
        if (p_acp->cpstate == CP_OPEN)
        {
            appp_open(lpSession, layer);    /* CP link now open */
        }
    }
    else
    {
        TRACE(TR_PPP, TR_LVL3, "Options requested by peer not accepted: %s\n",
                (DWORD) ((cnf_accept==CONFIG_NAK) ? "NAK" : "REJ"), 0, 0, 0);
        /* NAK/REJ config request made by remote host */
        appp_sendreply(lpSession, layer, p_ACK_pkt, cnf_accept, p_cnfhdr->id);
        p_acp->cpstate = nak_cpstate;
    }
    return;
}
/*
*    appp_rcvack -- Process the received ACK from the peer.
*
*    Remote peer ACKed our configuration request.
*    Update the CP state depending upon validity of the ACK.
*    Proper states are CP_REQ_SENT or CP_ACK_SENT; others are
*    exception states.
*
*    Parameters:
*            lpSession            - Connection Call Record.
*            layer                - Protocol layer
*            p_pkt                - Ptr to PPP buffer to be encapsulated
*                                    and then transmitted.
*
*    Returns:
*            None
*
*/
void
appp_rcvack(PSESSIONINFO lpSession, PPP_layer_t layer, PNDIS_WAN_PACKET p_pkt)
{
    APPP_CB_t                *p_acb = &(lpSession->appp);      /*  APPP CB
*/
    S_CPCTL                  *p_acp = &lpSession->appp.a_cpctl[layer];
    S_CNFHDR                 *p_cnfhdr;
    TRACE(TR_PPP, TR_LVL3, "[APPP] appp_rcvack(%s) \n",
            (DWORD)Layers[layer], 0, 0, 0);
    clear_timer(lpSession);
    switch (p_acp->cpstate)
    {
    case CP_INITIAL:    /* Unexpected event */
    case CP_STARTING:   /* Unexpected event */
        TRACE(TR_PPP, TR_LVL2,
```

-continued

```
                "[appp_rcvack]: RX'd UNEXPECTED PKT(%s): State: %s, CP code: %s\n",
                (DWORD)Layers[layer],
                (DWORD) CPStates[p_acp->cpstate],
                (DWORD)CPCodes[CONFIG_ACK], 0);
            break;
        case CP_CLOSED:
            p_cnfhdr = (S_CNFHDR *) (((u8 *)p_pkt->CurrentBuffer) + PPP_HDRLEN);
            appp_sendtermack(lpSession, layer, CP_CLOSED, p_cnfhdr->id);
            break;
        case CP_STOPPED:
            p_cnfhdr = (S_CNFHDR *) (((u8 *)p_pkt->CurrentBuffer) + PPP_HDRLEN);
            appp_sendtermack(lpSession, layer, CP_STOPPED, p_cnfhdr->id);
            break;
        case CP_CLOSING:
            /* We are attempting to close connection; wait */
            /* for timeout to resend a Terminate Request */
            break;
        case CP_STOPPING:
            /* We are attempting to stop connection; wait */
            /* for timeout to resend a Terminate Request    */
            break;
        case CP_REQ_SENT:
            /* Make sure ACK is proper */
            if (appp_chkack(lpSession, layer, p_pkt) != -1)
            {
                p_acp->cpstate = CP_ACK_RCVD;       /* Remote host accepted our req */
                TRACE(TR_PPP, TR_LVL2, "[appp_rcvack(%s)]: New State: %s\n",
                    (DWORD)Layers[layer], (DWORD)CPStates[p_acp->cpstate], 0, 0);
            }
            else
            {
                TRACE(TR_PPP, TR_LVL2,
                    "[appp_rcvack(%s)]: -1 ret from appp_chkack !!\n",
                    0, 0, 0, 0);
            }
            /* Still need to settle request from remote host */
            set_timer(&lpSession->SessionTimer, PPP_RESTART_TIMEOUT);
            break;
        case CP_ACK_RCVD:
            appp_sendreq(lpSession, layer);
            p_acp->cpstate = CP_REQ_SENT;
            break;
        case CP_ACK_SENT:
            /* Make sure ACK is proper */
            if (appp_chkack(lpSession, layer, p_pkt) == -1)
            {
                /* Error in ACK from remote host */
                /* Wait for another ACK, then send another request */
                set_timer(&lpSession->SessionTimer, PPP_RESTART_TIMEOUT);
            }
            else
            {
                p_acp->cpstate = CP_OPEN;
                /* CP negotiation complete */
                appp_open(lpSession, layer);
            }
            break;
        case CP_OPEN:
            /* Something went wrong; restart negotiations */
            appp_restart(lpSession, layer);
            /* Send our configuration request */
            appp_sendreq(lpSession, layer);
            p_acp->cpstate = CP_REQ_SENT;
            break;
        default:
            /* ignore */
            break;
    }
    return;
}
/*
 *   appp_chkack -- Check the received ACK from the peer.
 *
 *       Verify that the received ACK matches the options we sent out
 *       in our CFG_REQ packet.
 *
 *       LCP Configuration options supported:
 *               - Maximum Receive Unit
 *
```

```
*       IPCP Configuration options supported:
*               - IP address
*                       Remote peers address ONLY
*
*       IPXCP Configuration options supported:
*
*       NBFCP Configuration options supported:
*
*       BRCP Configuration options supported:
*
*       CCP Configuration options supported:
*
*       Parameters:
*               lpSession               - Connection Call Record.
*               layer                   - Protocol layer
*               p_pkt                   - Ptr to PPP buffer to be encapsulated
*                                               and then transmitted.
*
*       Returns:
*               0                       - Valid ACK
*               -1                      - Invalid ACK
*
*/
int
appp_chkack(PSESSIONINFO lpSession, PPP_layer_t layer, PNDIS_WAN_PACKET p_pkt)
{
    APPP_CB_t                   *p_acb = &(lpSession->appp);       /*   APPP CB
*/
    S_CPCTL                     *p_acp = &lpSession->appp.a_cpctl[layer];
    S_CNFHDR                    *p_ACK_cnfhdr;
    S_OPTHDR                    *p_ACK_opthdr;
    PCOBRA_WAN_BUFFER    p_REQ_pkt;
    S_OPTHDR                    *p_REQ_opthdr;
    s16                                 ACK_optslen, REQ_optslen;
    u8                                  *p_ACK_optdata;
    u8                                  *p_REQ_optdata;
    s16                                 ackerr = 0;
    u16                                 reqi16, acki16;
    u32                                 req_ip, ack_ip;
    s16                                 minoptlen;
    TRACE(TR_PPP, TR_LVL3, "[APPP] appp_chkack(%s)\n",
        (DWORD)Layers[layer], 0, 0, 0);
    p_ACK_cnfhdr = (S_CNFHD     *)(((u8 *)p_pkt->CurrentBuffer) + PPP_HDRLEN);
    pACK_opthdr = (S_OPTHDR *) (((u8 *)p_ACK_cnfhdr) + CNF_HDRLEN);
    /* CP ID field must match last request we sent */
    if (p_ACK_cnfhdr->id != p_acp->lastid)
        {
        return -1;
        }
    /* Get packet for REQ to ACK comparison check */
    if ((p_REQ_pkt = ppp_get_pkt(20)) == NULL)
        {
        return -1;
        }
    /* Set ptr to REQ option header */
    p_REQ_opthdr = (S_OPTHDR *) (((u8 *)p_REQ_pkt->CurrentBuffer) + PPP_HDRLEN +
        CNF_HDRLEN)
;
/* Get a copy of last request we sent */
    p_REQ_pkt->CurrentLength = appp_makereq(lpSession, layer, (u8 *)p_REQ_opthdr);
    /* Get size of REQ and ACK options field */
    ACK_optslen = swap16(p_ACK_cnfhdr->len) - CNF_HDRLEN;
    REQ_optslen = (u8) p_REQ_pkt->CurrentLength;
    /* Overall buffer length should match */
    if (ACK_optslen != REQ_optslen)
        {
        ackerr = 1;
        }
    minoptlen = 2;     // Any option has to have type + length
    /* ACK must echo all options we requested in the order requested */
    for (; (REQ_optslen >= minoptlen) && (!ackerr);
    REQ_optslen -= p_REQ_opthdr->len, p_REQ_opthdr =
    (S_OPTHDR *) ((u8 *)p_REQ_opthdr + p_REQ_opthdr->len),
    ACK_optslen -= p_ACK_opthdr->len, p_ACK_opthdr =
    (S_OPTHDR *) ((u8 *)p_ACK_opthdr + p_ACK_opthdr->len))
        {
        /* Must have as many acked options as requested */
        if (ACK_optslen < minoptlen)
            {
```

```
                ackerr = 1;
                break;
                }
        /* Set ptr to current REQ option data field */
        p_REQ_optdata = ((u8 *)p_REQ_opthdr) + 2;
        /* Set ptr to current ACK option data field */
        p_ACK_optdata = ((u8 *)p_ACK_opthdr) + 2;
        /* Config option headers must match */
        if ((p_ACK_opthdr->type != p_REQ_opthdr->type) ||
            (p_ACK_opthdr->len != p_REQ_opthdr->len))
            {
            ackerr = 1;
            break;
            }
if (layer == LCP_LAYER)
{
        /* Config option values must match */
        switch(p_REQ_opthdr->type)
        {
        case MAX_RCV_UNIT:    /* Maximum Receive Unit */
            acki16 = (*p_ACK_optdata << 8) | *(p_ACK_optdata+1);
            reqi16 = (*p_REQ_optdata << 8) | *(p_REQ_optdata+1);
            if (acki16 != reqi16)
                ackerr = 1;
            break;
        case AUTH_TYPE:       /* Auth Protocol Type */
            acki16 = (*p_ACK_optdata << 8) | *(p_ACK_optdata+1);
            reqi16 = (*p_REQ_optdata << 8) | *(p_REQ_optdata+1);
            if (acki16 != reqi16)
                ackerr = 1;
            break;
        case PROT_COMPRESS:   /* Protocol Compression */
        case AC_COMPRESS:     /* Addr/Control Compression */
            /* its now okay */
            break;
case MPP_MRRU:        /* MPP MRRU */
case MPP_ENDPOINT_ID:     /* MPP Endpoint ID */
        case ASYNC_CTL_MAP:   /* Async Control Map */
        case MAGIC_NUMBER:    /* Magic Number not implemented */
        case FCS_32:                    /* 32-bit FCS not implemented */
        case QUALITY_PROTOCOL:   /* Link Qual Monitor not implemented */
case MPP_SHORTSEQNUM:     /* MPP Short Sequence Numbers */
        default:                    /* Shouldnt happen */
            ackerr = 1;
            break;
        }
}
else if (layer == IPCP_LAYER)
{
        /* Config option values must match */
        switch (p_REQ_opthdr->type)
        {
        case IP_ADDRS_NEW:                  /* IP address */
case IP_1st_DNS_SERVER:       /* 1st DNS address */
case IP_1st_NBNS_SERVER:      /* 1st NBNS address */
case IP_2nd_DNS_SERVER:       /* 2nd DNS address */
case IP_2nd_NBNS_SERVER:      /* 2nd NBNS address */
            /* Echoed values must match our request */
            req_ip = *p_REQ_optdata++;
            req_ip = (req_ip << 8) | *p_REQ_optdata++;
            req_ip = (req_ip << 8) | *p_REQ_optdata++;
            req_ip = (req_ip << 8) | *p_REQ_optdata++;
            ack_ip = *p_ACK_optdata++;
            ack_ip = (ack_ip << 8) | *p_ACK_optdata++;
            ack_ip = (ack_ip << 8) | *p_ACK_optdata++;
            ack_ip = (ack_ip << 8) | *p_ACK_optdata++;
            if (ack_ip != req_ip)
                ackerr = 1;
            break;
        case IP_COMPR_TYPE:   /* IP header compr */
            /* Echoed values must match our request */
            reqi16 = *p_REQ_optdata++;
            reqi16 = (reqi16 << 8) | *p_REQ_optdata;
            acki16 = *p_ACK_optdata++;
            acki16 = (acki16 << 8) | *p_ACK_optdata;
            if (reqi16 != acki16)
                ackerr = 1;
            break;
        default:                    /* Shouldnt happen */
```

-continued

```
                    ackerr = 1;
                    break;
                }
            }
        }
    }
    ppp_rls_pkt(p_REQ_pkt, PPP_FROM_APP, 20);
    if (ackerr)
        {
        /* Error in configuration ACK */
        TRACE(TR_PPP, TR_LVL3, "[APPP] improper CP ACK echo\n", 0, 0, 0, 0);
        return -1;
        }
    / ACK matches last request we made */
    TRACE(TR_PPP, TR_LVL3, "[APPP] valid CP ACK echo\n", 0, 0, 0, 0);
    return 0;
}
/*
*   appp_rcvnak -- Process the received NAK from the peer.
*
*       Remote peer NAKed our configuration request.
*       Update the CP state depending upon validity of the NAK.
*       Proper states are CP_REQ_SENT or CP_ACK_SENT; others are
*       exception states.
*
*       Parameters:
*               lpSession               - Connection Call Record.
*               layer                   - Protocol layer
*               p_pkt                   - Ptr to PPP buffer to be encapsulated
*                                           and then transmitted.
*
*       Returns:
*               None
*
*/
void
appp_rcvnak(PSESSIONINFO lpSession, PPP_layer_t layer, PNDIS_WAN_PACKET p_pkt)
{
    APPP_CB_t                 *p_acb = &(lpSession->appp);      /*   APPP CB
*/
    S_CPCTL                   *p_acp = &lpSession->appp.a_cpctl[layer];
    S_CNFHDR                  *p_cnfhdr;
    TRACE(TR_PPP, TR_LVL3, "[APPP] appp_rcvnak(%s)\n",
            (DWORD)Layers[layer], 0, 0, 0);
    clear_timer(lpSession);
    switch(p_acp->cpstate)
    {
    case CP_INITIAL:     /* Unexpected event */
    case CP_STARTING:    /* Unexpected event */
        TRACE(TR_PPP, TR_LVL2,
            "[appp_rcvnak]: RX'd UNEXPECTED PKT(%s): State: %s, CP code: %s\n",
            (DWORD)Layers[layer],
            (DWORD)CPStates[p_acp->cpstate],
            (DWORD)CPCodes[CONFIG_NAK], 0);
        break;
    case CP_CLOSED:
        TRACE(TR_PPP, TR_LVL1, "[appp_rcvnak( )] CP_CLOSED\n", 0, 0, 0, 0);
        p_cnfhdr = (S_CNFHDR *) (((u8 *)p_pkt->CurrentBuffer) + PPP_HDRLEN);
        appp_sendtermack(lpSession, layer, CP_CLOSED, p_cnfhdr->id);
        break;
    case CP_STOPPED:
        TRACE(TR_PPP, TR_LVL1, "[appp_rcvnak( )] CP_STOPPED\n", 0, 0, 0, 0);
        p_cnfhdr = (S_CNFHDR *) (((u8 *)p_pkt->CurrentBuffer) + PPP_HDRLEN);
        appp_sendtermack(lpSession, layer, CP_STOPPED, p_cnfhdr->id);
        break;
    case CP_CLOSING:
        TRACE(TR_PPP, TR_LVL1, "[appp_rcvnak( )] CP_CLOSING\n", 0, 0, 0, 0);
        /* We are attempting to close connection; wait   */
        /* for timeout to resend a Terminate Request     */
        break;
    case CP_STOPPING:
        TRACE(TR_PPP, TR_LVL1, "[appp_rcvnak( )] CP_STOPPING\n", 0, 0, 0, 0);
        /* We are attempting to stop connection; wait    */
        /* for timeout to resend a Terminate Request     */
        break;
    case CP_REQ_SENT:
    case CP_ACK_SENT:
        TRACE(TR_PPP, TR_LVL1, "[appp_rcvnak( )] CP_xxx_SENT\n", 0, 0, 0, 0);
        /* Update our config request to reflect NAKed options */
        if (appp_chknak(lpSession, layer, p_pkt) == -1)
```

-continued

```
        {
            /* Bad NAK packet */
            /* Wait for another; resend request on timeout */
            set_timer(&lpSession->SessionTimer, PPP_RESTART_TIMEOUT);
        }
        else
        {
            /* Send updated config request */
            appp_sendreq(lpSession, layer);
        }
        break;
    case CP_ACK_RCVD:
        TRACE(TR_PPP, TR_LVL1, "[appp_rcvnak( )] CP_ACK_RECD\n", 0, 0, 0, 0);
        /* Send our configuration request */
        appp_sendreq(lpSession, layer);
        p_acp->cpstate = CP_REQ_SENT;
        break;
    case CP_OPEN:
        TRACE(TR_PPP, TR_LVL1, "[appp_rcvnak( )] CP_OPEN\n", 0, 0, 0, 0);
        /* Something went wrong; restart negotiations */
        appp_restart(lpSession, layer);
        /* Send our configuration request */
        appp_sendreq(lpSession, layer);
        p_acp->cpstate = CP_REQ_SENT;
        break;
    default:
        TRACE(TR_PPP, TR_LVL1, "[appp_rcvnak( )] default(%x)\n",
            p_acp->cpstate, 0, 0, 0);
        /* ignore */
        break;
    }
    return;
}
/*
*   appp_chknak -- Check the received NAK from the peer.
*
*       Verify that the received NAK is valid. If valid, save suggested
*       value(s) for the NAKed option(s) so that next time a CFG_REQ goes
*       out, these values will be used.
*
*       In fact, if IP_ADDRESS negotiations are enabled, it is normal
*       course to receive a NAK on the IP_Address option; this is the
*       mechanism the peer uses to inform us of his IP address.
*
*       Parameters:
*               lpSession       - Connection Call Record.
*               layer           - Protocol layer
*               p_pkt           - Ptr to PPP buffer to be encapsulated
*                                 and then transmitted.
*
*       Returns:
*               0               - Valid NAK
*               -1              - Invalid NAK
*
*/
int
appp_chknak(PSESSIONINFO lpSession, PPP_layer_t layer, PNDIS_WAN_PACKET p_pkt)
{
    APPP_CB_t               *p_acb = &(lpSession->app);      /* APPP CB
*/
    S_CPCTL                 *p_acp = &lpSession->appp.a_cpctl[layer];
    S_CNFHDR                *p_NAK_cnfhdr;
    S_OPTHDR                *p_NAK_opthdr;
    PCOBRA_WAN_BUFFER       p_REQ_pkt;
    S_OPTHDR                *p_REQ_opthdr;
    s16                             NAK_optslen, REQ_optslen;
    u8                              *p_NAK_optdata;
    s16                             nakerr = 0;
    u16                     naki16;
    u16                     optdatalen;
                            //BUGIPX2
    s16                     minoptlen;
    TRACE(TR_PPP, TR_LVL3, "[APPP] Check_Nak (%s)\n",
        (DWORD)Layers[layer], 0, 0, 0);
    p_NAK_cnfhdr = (S_CNFHDR *) (((u8 *)p_pkt->CurrentBuffer) + PPP_HDRLEN);
    p_NAK_opthdr = (S_OPTHDR *) (((u8 *)p_NAK_cnfhdr) + CNF_HDRLEN);
    /* CP ID field must match last request we sent */
    if (p_NAK_cnfhdr->id != p_acp->lastid)
    {
```

-continued

```
        return -1;
    }
}
/* Get packet for REQ to NAK comparison check */
if ((p_REQ_pkt = (PCOBRA_WAN_BUFFER) ppp_get_pkt(20)) == NULL)
{
    return -1;
}
/* Set ptr to REQ option header */
p_REQ_opthdr = (S_OPTHDR *) (((u8 *)p_REQ_pkt->CurrentBuffer) + PPP_HDRLEN +
CNF_HDRLEN)
/* Get a copy of last request we sent */
p_REQ_pkt->CurrentLength = appp_makereq(lpSession, layer, (u8 *)p_REQ_opthdr);
/* Get size of REQ and NAK options field */
NAK_optslen = swap16(p_NAK_cnfhdr->len) - CNF_HDRLEN;
REQ_optslen = (u8) p_REQ_pkt->CurrentLength;
/* Check overall buffer length */
if (NAK_optslen >REQ_optslen)
{
    /* Remote cant NAK more options than we requested */
    nakerr = 1;
}
minoptlen = 2;      // Any option has to have type + length
/* NAKed options must be same order as our original request */
for (; (NAK_optslen >= minoptlen) && (!nakerr);
REQ_optslen -= p_REQ_opthdr->len, p_REQ_opthdr =
(S_OPTHDR *)((u8 *)p_REQ_opthdr + p_REQ_opthdr->len),
NAK_optslen -= p_NAK_opthdr->len, p_NAK_opthdr =
(S_OPTHDR *)((u8 *)p_NAK_opthdr + p_NAK_opthdr->len))
{
    /* Must find match to each NAKed option */
    if (REQ_optslen < minoptlen)
    {
        nakerr = 1;
        break;
    }
    /* Maybe not all options were NAKed; look    */
    /* for matching option in our request        */
    while (p_REQ_opthdr->type != p_NAK_opthdr->type)
    {
        /* This option not NAKed; eat rest    */
        /* of option from the request packet  */
        REQ_optslen -= p_REQ_opthdr->len;
        p_REQ_opthdr = (S_OPTHDR *) ((u8 *)p_REQ_opthdr +
            p_REQ_opthdr->len);
        /* Must find match to each NAKed option */
        if (REQ_optslen < minoptlen)
        {
            p_REQ_opthdr->type = 0;
            nakerr = 1;
            break;
        }
    }
    /* Config option headers must match */
    if ((p_NAK_opthdr->type != p_REQ_ophdr->type) ||
        (p_NAK_opthdr->len != p_REQ_opthdr->len))
    {
        nakerr = 1;
        break;
    }
    /* Set ptr to current NAK option field to compare */
    p_NAK_optdata = ((u8 *)p_NAK_opthdr) + 2;
                                                    //BUGIPX2
    optdatalen    = p_NAK_opthdr->len - 2;    /* Get curr opts data len */
    if (layer == LCP_LAYER)
    {
        /* Remote host replaced our request with new suggestion */
        switch (p_REQ_opthdr->type)
        {
        case MAX_RCV_UNIT:   /* Maximum Receive Unit */
            /* Get suggested MRU */
            naki16 = (*p_NAK_optdata << 8) | *(p_NAK_optdata+1);
            TRACE(TR_PPP, TR_LVL3,
                " naki = %x, lcl_mru = %x\n",
                naki16, p_acb->lcl_mru, 0, 0);
            /****
            We used to check this value but found you should not
            NAK the other guys MRU.
            ****/
            /* Save new request value */
```

```
                    p_acb->lcl_mru = naki16;
                break;
            case AUTH_TYPE:     /* Authentication Protocol Type */
                /* We are requesting AUTH because the Net is requesting */
                /* Authentication. We cannot allow the App to negotiate */
                /* it away, so IGNORE IT. */
                TRACE(TR_PPP, TR_LVL3,
                    " Net req AUTH, Can't turn off App AUTH . . . \n",
                    0, 0, 0, 0);
                nakerr = 1;
                break;
        case MPP_MRRU:      /* MPP MRRU */
        case MPP_ENDPOINT_ID:       /* MPP Endpoint ID */
            case ASYNC_CTL_MAP: /* Async Control Map */
            case MAGIC_NUMBER:  /* Magic Number */
            case PROT_COMPRESS:
            case AC_COMPRESS:
            case FCS_32:                        /* 32-Bit FCS not implemented */
            case QUALITY_PROTOCOL:   /* Link Qual Monitor not implemented */
        case MPP_SHORTSEQNUM:    /* MPP Short Sequence Numbers */
            default:                    /* Shouldnt happen */
                TRACE(TR_PPP, TR_LVL3,
                    " Option %d NAK'd\n",
                    p_REQ_opthdr->type, 0, 0, 0);
                nakerr = 1;
                break;
        }
    }
    else if (layer == IPCP_LAYER)
    {
        u16 comp_prot;
        /* Remote host replaced our request with new suggestion */
        switch(p_REQ_opthdr->type)
        {
        case IP_ADDRS_NEW:    /* IP address */
            /* App NOT allowed to give me MY IP Address !! */
            TRACE(TR_PPP, TR_LVL3,
                " IP_ADDRS_NEW: Can't give me my IP_ADDR\n",
                    0, 0, 0, 0);
            nakerr = 1;
            break;
        case IP_1st_DNS_SERVER:   /* 1st DNS address */
            /* App NOT allowed to give me MY 1st DNS Address !! */
            TRACE(TR_PPP, TR_LVL3,
                " IP_1st_DNS_SERVER: Can't give me my DNS Addr\n",
                    0, 0, 0, 0);
            nakerr = 1;
            break;
        case IP_1st_NBNS_SERVER:              /* 1st NBNS address */
            /* App NOT allowed to give me MY 1st NBNS Address !! */
            TRACE(TR_PPP, TR_LVL2,
                " IP_1st_NBNS_SERVER: Can't give me my NBNS Addr\n",
                    0, 0, 0, 0);
            nakerr = 1;
            break;
        case IP_2nd_DNS_SERVER:   /* 2nd DNS address */
            /* App NOT allowed to give me MY 2nd DNS Address !! */
            TRACE(TR_PPP, TR_LVL3,
                    IP_2nd_DNS_SERVER: Can't give me my DNS Addr\n",
                        0, 0, 0, 0)
                nakerr = 1;
                break;
            case IP_2nd_NBNS_SERVER: /* 2nd NBNS address */
                /* App NOT allowed to give me MY 2nd NBNS Address !! */
                TRACE(TR_PPP, TR_LVL3,
                    " IP_2nd_NBNS_SERVER: Can't give me my NBNS Addr\n",
                        0, 0, 0, 0)
                nakerr = 1;
                break;
            case IP_COMPR_TYPE: /* IP header compr */
                /* Get proposed value from packet */
                comp_prot = *p_NAK_optdata;
                comp_prot = (comp_prot << 8) | * (p_NAK_optdata + 1);
                if (comp_prot != PPP_COMP_TCP_PID)
                {
                    TRACE(TR_PPP, TR_LVL3,
                        " Uncompatable VJ_COMP protocols\n",
                        0, 0, 0, 0);
                    /*
```

-continued

```
                **      NOTE: since the Net side brought up VJ already (because
                **              the App intially wanted it too), we
                **              cannot simply turn it off. We will need
                **              to negotiate until the call comes down or
                **              the silly ass above us accepts it.
                */
            }
            break;
        default:            /* Shouldnt happen */
            nakerr = 1;
            break;
        }
    }
}
ppp_rls_pkt(p_REQ_pkt, PPP_FROM_APP, 20);
if (nakerr)
{
    /* Error in configuration NAK */
    TRACE(TR_PPP, TR_LVL3, "Improper CP NAK echo\n", 0, 0, 0, 0);
    return -1;
}
/* NAK matches last request we made */
TRACE(TR_PPP, TR_LVL3, "Valid CP NAK echo\n", 0, 0, 0, 0);
return 0;
}
/*
*   appp_rcvrej -- Process the received REJECT from the peer.
*
*       Remote peer REJECTed our configuration request.
*       Update the CP state depending upon validity of the REJECT.
*       Proper states are CP_REQ_SENT or CP_ACK_SENT; others are
*       exception states.
*
*       Parameters:
*               lpSession                       - Connection Call Record.
*               layer               - Protocol layer
*               p_pkt               - Ptr to PPP buffer to be encapsulated
*                                               and then transmitted.
*
*       Returns:
*               None
*
*/
void
appp_rcvrej(PSESSIONINFO lpSession, PPP_layer_t layer, PNDIS_WAN_PACKET p_pkt)
{
    APPP_CB_t               *p_acb = &(lpSession->appp);       /*   APPP CB
*/
    S_CPCTL                 *p_acp = &lpSession->appp.a_cpctl[layer];
    S_CNFHDR                *p_cnfhdr;
    TRACE(TR_PPP, TR_LVL1, "[appp_rcvrej(%s)]\n",
        (DWORD)Layers[layer], 0, 0, 0);
    clear_timer(lpSession);
    switch(p_acp->cpstate)
    {
    case CP_INITIAL:        /* Unexpected event */
    case CP_STARTING:       /* Unexpected event */
        TRACE(TR_PPP, TR_LVL2,
            "[appp_rcvrej]: RX'd UNEXPECTED PKT(%s): State: %s, CP code: %s\n",
            (DWORD)Layers[layer],
            (DWORD)CPStates[p_acp->cpstate],
            (DWORD)CPCodes[CONFIG_REJ], 0);
        break;
    case CP_CLOSED:
        p_cnfhdr = (S_CNFHDR *)(((u8 *)p_pkt->CurrentBuffer) + PPP_HDRLEN);
        appp_sendtermack(lpSession, layer, CP_CLOSED, p_cnfhdr->id);
        break;
    case CP_STOPPED:
        p_cnfhdr = (S_CNFHDR *)(((u8 *)p_pkt->CurrentBuffer) + PPP_HDRLEN);
        appp_sendtermack(lpSession, layer, CP_STOPPED, p_cnfhdr->id);
        break;
    case CP_CLOSING:
        /* We are attempting to close connection; wait   */
        /* for timeout to resend a Terminate Request     */
        break;
    case CP_STOPPING:
        /* We are attempting to stop connection; wait    */
        /* for timeout to resend a Terminate Request     */
        break;
```

-continued

```
        case CP_REQ_SENT:
        case CP_ACK_SENT:
            /* Update our config request to reflect NAKed options */
            if (appp_chkrej(lpSession, layer, p_pkt) == -1)
            {
                /* Bad reject packet */
                /* Wait for another; resend request on timeout */
                set_timer(&lpSession->SessionTimer, PPP_RESTART_TIMEOUT);
            }
            else
            {
            /* Send updated config request */
            appp_sendreq(lpSession, layer);
            }
            break;
        case CP_ACK_RCVD:
            /* Send our configuration request */
            appp_sendreq(lpSession, layer);
            p_acp->cpstate = CP_REQ_SENT;
            break;
        case CP_OPEN:
            /* Something went wrong; restart negotiations */
            appp_restart(lpSession, layer);
            /* Send our configuration request */
            appp_sendreq(lpSession, layer);
            p_acp->cpstate = CP_REQ_SENT;
            break;
        default:
            /* ignore */
            break;
        }
        return;
}
/*
 *  appp_chkrej -- Check the received REJECT from the peer.
 *
 *      Verify that the received REJECT is valid. If valid, set the
 *      rejected option to its default value and turn off negotiation for
 *      that option (so that next time a CFG_REQ goes out, the rejected
 *      options will not be negotiated).
 *
 *      Parameters:
 *              lpSession               - Connection Call Record.
 *              layer                   - Protocol layer
 *              p_pkt                   - Ptr to PPP buffer to be encapsulated
 *                                        and then transmitted.
 *
 *      Returns:
 *              0                       - valid REJ
 *              -1                      - Invalid REJ
 *
 */
int
appp_chkrej (PSESSIONINFO lpSession, PPP_layer_t layer, PNDIS_WAN_PACKET p_pkt)
{
    APPP_CB_t               *p_acb = &(lpSession->appp);           /*    APPP CB
*/
    S_CPCTL                 *p_acp = &lpSession->appp.a_cpctl[layer];
    S_CNFHDR                *p_REJ_cnfhdr;
    S_OPTHDR                *p_REJ_opthdr;
    PCOBRA_WAN_BUFFER       p_REQ_pkt;
    S_OPTHDR                *p_REQ_opthdr;
    s16                     REJ_optslen, REQ_optslen;
    s16                     rejerr = 0;
    s16                     minoptlen;
    TRACE(TR_PPP, TR_LVL3, "[APPP] Check_Reject (%s)\n",
        (DWORD)Layers[layer], 0, 0, 0);
    p_REJ_cnfhdr = (S_CNFHDR *)(((u8 *)p_pkt->CurrentBuffer) + PPP_HDRLEN);
    p_REJ_opthdr = (S_OPTHDR *)(((u8 *)p_REJ_cnfhdr) + CNF_HDRLEN);
    /* CP ID field must match last request we sent */
    if (p_REJ_cnfhdr->id != p_acp->lastid)
    {
        return -1;
    }
    /* Get packet for REQ to REJ comparison check */
    if ((p_REQ_pkt = PPP_get_pkt(20)) == NULL)
    {
        return(-1);
    }
```

-continued

```
/* Set ptr to REQ option header */
p_REQ_opthdr = (S_OPTHDR *) (((u8 *)p_REQ_pkt->CurrentBuffer) + PPP_HDRLEN +
CNF_HDRLEN)
/* Get a copy of last request we sent */
p_REQ_pkt->CurrentLength = appp_makereq(lpSession, layer, (u8 *)p_REQ_opthdr);
/* Get size of REQ and REJ options field */
REJ_optslen = swap16(p_REJ_cnfhdr->len) - CNF_HDRLEN;
REQ_optslen = (u8) p_REQ_pkt->CurrentLength;
/* Check overall buffer length */
if (REJ_optslen >REQ_optslen)
    {
    /* Remote cant REJ more options than we requested */
    rejerr = 1;
    }
minoptlen = 2;       // Any option has to have type + length
/* Rejected options must be same order as our original request */
for (; (REJ_optslen >= minoptlen) && (!rejerr);
REQ_optslen -= p_REQ_opthdr->len, p_REQ_opthdr =
(S_OPTHDR *)((u8 *)p_REQ_opthdr + p_REQ_opthdr->len),
REJ_optslen -= p_REJ_opthdr->len, p_REJ_opthdr =
(S_OPTHDR *)((u8 *)p_REJ_opthdr + p_REJ_opthdr->len))
{
    /* Must find match to each Rejected option */
    if (REQ_optslen > minoptlen)
    {
    rejerr = 1;
    break;
    }
/* Maybe not all options were Rejected; look */
/* for matching option in our request */
while (p_REQ_opthdr->type != p_REJ_opthdr->type)
    {
    /* This option not REJed; eat rest      */
    /* of option from the request packet    */
    REQ_optslen -= p_REQ_opthdr->len;
    p_REQ_opthdr = (S_OPTHDR *)((u8 *)p_REQ_opthdr +
    p_REQ_opthdr->len);
    /* Must find match to each REJed option */
    if (REQ_optslen < minoptlen)
        {
        p_REQ_opthdr->type = 0;
        rejerr = 1;
        break;
        }
    }
/* Config option headers must match */
if ((p_REJ_opthdr->type != p_REQ_opthdr->type) ||
    (p_REJ_opthdr->len != p_REQ_opthdr->len))
    {
    rejerr = 1;
    break;
    }
TRACE(TR_PPP, TR_LVL3,
    " Option = %d\n", p_REQ_opthdr->type, 0, 0, 0);
if (layer == LCP_LAYER)
{
    /* Remote host wont negotiate this option */
    switch(p_REQ_opthdr->type)
    {
    case MAX_RCV_UNIT:   /* Maximum Receive Unit */
        /* Dont attempt to negotiate MRU */
        p_acb->neg_mru = 0;
        p_acb->lcl_mru = MAX_FRAME_LENGTH + sizeof(S_PPPHDR);
        break;
    case PROT_COMPRESS:  /* Protocol Compression */
        p_acb->rx_proto_comp = FALSE;
        break;
    case AC_COMPRESS:    /* Addr/Ctl Compression */
        p_acb->rx_ac_comp = FALSE;
        break;
    case AUTH_TYPE:      /* Authentication Protocol Type */
        /* We are requesting AUTH because the Net is requesting */
        /* Authentication. We cannot allow the App to negotiate */
        /* it away, so IGNORE IT. */
        rejerr = 1;
        break;
    default:             /* Shouldnt happen */
        rejerr = 0;
        break;
```

```
            }
        }
        else if (layer == IPCP_LAYER)
        {
            /* Remote host won't negotiate this option */
            switch(p_REQ_opthdr->type)
            {
            case IP_ADDRS_NEW:          /* IP address */
                /* Abandon attempt to negotiate IP addrs */
                p_acb->neg_ip_addrs = 0;
                /****
                Reflect that link is being established with NO IP ADDRS
                assigned. Used to do this until we got rejected by Gandalf.
                p_acb->my_ip_addr = 0;
                ****/
                break;
            case IP_COMPR_TYPE:   /* IP header compression */
                /****
                NOTE: since the Net side brought up VJ already (because
                     the App intially wanted it too), we
                     cannot simply turn it off. We will need
                     to negotiate until the call comes down or
                     the silly ass above us accepts it.
                ****/
            default:                    /* Shouldnt happen */
                rejerr = 1;
                break;
            }
        }
    }
    ppp_rls_pkt(p_REQ_pkt, PPP_FROM_APP, 20);
    if (rejerr)
    {
        /* Error in configuration reject */
        TRACE(TR_PPP, TR_LVL3,
            " Error in configuration reject.\n", 0, 0, 0, 0);
        return -1;
    }
    /* Reject matches last request we made */
    TRACE(TR_PPP, TR_LVL3,
        " Valid Reject message.\n", 0, 0, 0, 0);
    return 0;
}
/*
*   appp_rcvtermreq -- Process the received TERMINATE REQUEST from
*                   the peer.
*
*   Remote peer has requested that we close the PPP connection.
*   Send a TERMINATE_ACK packet, inform upper layers, and close down.
*
*   Parameters:
*           lpSession             - Connection Call Record.
*           layer                 - Protocol layer
*           p_pkt                 - Ptr to received TermReq PPP buffer
*
*   Returns:
*           None
*
*/
void
appp_rcvtermreq(PSESSIONINFO lpSession, PPP_layer_t layer, PNDIS_WAN_PACKET p_pkt)
{
    APPP_CB_t              *p_acb = &(lpSession->appp);          /*    APPP CB */
    S_CPCTL                *p_acp = &lpSession->appp.a_cpctl[layer];
    S_CNFHDR               *p_cnfhdr;
    TRACE(TR_PPP, TR_LVL3, "[APPP] (%s): Peer requested close\n",
        (DWORD)Layers[layer], 0, 0, 0);
    switch(p_acp->cpstate)
    {
    case CP_INITIAL:      /* Unexpected event */
    case CP_STARTING:     /* Unexpected event */
        break;
    case CP_CLOSED:
    case CP_STOPPED:
    case CP_CLOSING:
    case CP_STOPPING:
    case CP_REQ_SENT:
        p_cnfhdr = (S_CNFHDR *)(((u8 *)p_pkt->CurrentBuffer) + PPP_HDRLEN);
```

```
            appp_sendtermack(lpSession, layer, p_acp->cpstate, p_cnfhdr->id);
            break;
        case CP_ACK_RCVD:
        case CP_ACK_SENT:
            p_cnfhdr = (S_CNFHDR *)(((u8 *)p_pkt->CurrentBuffer) + PPP_HDRLEN);
            appp_sendtermack(lpSession, layer, CP_REQ_SENT, p_cnfhdr->id);
            break;
        case CP_OPEN:
            /* Something went wrong; restart negotiations */
            appp_restart(lpSession, layer);
            /* Send terminate ack */
            p_cnfhdr = (S_CNFHDR *)(((u8 *)p_pkt->CurrentBuffer) + PPP_HDRLEN);
            appp_sendtermack(lpSession, layer, CP_STOPPED, p_cnfhdr->id);
            appp_sendtermreq(lpSession, layer, CP_STOPPED);
            break;
        default;
            /* ignore */
            break;
    }
    return;
}
/*
*       appp_rcvtermack -- Process the received TERMINATE ACK from the peer.
*
*       Remote peer has closed the PPP connection.
*       The action is dependent upon our current CP state.
*       Most proper state is CP_TERMINATE. The suprise (OH SHIT) state
*       is if we are in the CP_OPEN state (which means that our peer has
*       abruptly closed).
*
*       Parameters:
*               lpSession               - Connection Call Record.
*               layer           - Protocol layer
*
*       Returns:
*               None
*
*/
void
appp_rcvtermack(PSESSIONINFO lpSession, PPP_layer_t layer)
{
    APPP_CB_t                   *p_acb = &(lpSession->appp);       /*    APPP CB
*/
    S_CPCTL                     *p_acp = &lpSession->appp.a_cpctl[layer];
    TRACE(TR_PPP, TR_LVL3, "[APPP] (%s): Received terminate ack.\n",
          (DWORD)Layers[layer], 0, 0, 0);
    switch(p_acp->cpstate)
    {
    case CP_INITIAL:        /* Unexpected event */
    case CP_STARTING:       /* Unexpected event */
        break;
    case CP_CLOSED:
    case CP_STOPPED:
    case CP_REQ_SENT:
    case CP_ACK_SENT:
        /* stay in same state */
        break;
    case CP_CLOSING:
        /* completes transition to down state, indicate this fact */
        appp_restart(lpSession, layer);
        break;
    case CP_STOPPING:
        /* completes transition to down state, indicate this fact */
        appp_restart(lpSession, layer);
        break;
    case CP_ACK_RCVD:
        p_acp->cpstate = CP_REQ_SENT;
        break;
    case CP_OPEN:
        /* Something went wrong; restart negotiations */
        appp_restart(lpSession, layer);
        /* Send our configuration request */
        appp_sendreq(lpSession, layer);
        p_acp->cpstate = CP_REQ_SENT;
        break;
    default:
        /* ignore */
        break;
    }
```

```
    return;
}
/*
 *  appp_rcvcoderej -- Process the received CODE REJ from the peer.
 *
 *      The Remote peer didn't like our the code field for a previously sent pkt.
 *      Determine if the code field returned was indeed valid (but just not
 *      supported on the remote side) or if it is indeed catastrophic.
 *      Take action dependent upon the findings.
 *
 *      Parameters:
 *              lpSession             - Connection Call Record.
 *              layer                 - Protocol layer
 *              p_pkt                 - Ptr to PPP buffer to be encapsulated
 *                                      and then transmitted.
 *
 *      Returns:
 *              None
 *
 */
void
appp_rcvcoderej(PSESSIONINFO lpSession, PPP_layer_t layer, PNDIS_WAN_PACKET p_pkt)
{
    APPP_CB_t         *p_acb = &(lpSession->appp);           /*   APPP CB
*/
    S_CPCTL           *p_acp = &lpSession->appp.a_cpctl[layer];
    TRACE(TR_PPP, TR_LVL3, "[APPP] Recieved Code-Reject %s. \n",
          (DWORD)Layers[layer], 0, 0, 0);
    /* catastrophic code error */
    switch(p_acp->cpstate)
    {
    case CP_INITIAL:      /* Unexpected event */
    case CP_STARTING:     /* Unexpected event */
        break;
    case CP_CLOSED:
    case CP_CLOSING:
        p_acp->cpstate = CP_CLOSED;
        break;
    case CP_STOPPED:
    case CP_STOPPING:
    case CP_REQ_SENT:
    case CP_ACK_RCVD:
    case CP_ACK_SENT:
        p_acp->cpstate = CP_STOPPED;
        break;
    case CP_OPEN:
        appp_close(lpSession, layer, CP_STOPPING, CP_CLOSED);
        break;
    default:
        /* ignore */
        break;
    }
    return;
}
/*
 *  appp_rcvprotorej -- Process the received PROTO REJ from the peer.
 *
 *      The Remote peer didn't like our the proto field for a previously sent pkt.
 *      Determine if the proto field returned was indeed valid (but just not
 *      supported on the remote side) or if it is indeed catastrophic.
 *      Take action dependent upon the findings.
 *
 *      Parameters:
 *              lpSession             - Connection Call Record.
 *              layer                 - Protocol layer
 *              p_pkt                 - Ptr to PPP buffer to be encapsulated
 *                                      and then transmitted.
 *
 *      Returns:
 *              None
 *
 */
void
appp_rcvprotorej(PSESSIONINFO lpSession, PPP_layer_t layer, PNDIS_WAN_PACKET p_pkt)
{
    APPP_CB_t         *p_acb = &(lpSession->appp);           /*   APPP CB
*/
    S_CPCTL           *p_acp = &lpSession->appp.a_cpctl[layer];
    S_CNFHDR          *p_cnfhdr;
```

```
        u16                             rej_proto;
        TRACE(TR_PPP, TR_LVL3, "[APPP] (%s): Received protocol reject.\n",
            (DWORD)Layers[layer], 0, 0, 0);
        p_cnfhdr = (S_CNFHDR *)(((u8 *)p_pkt->CurrentBuffer) + PPP_HDRLEN);
        rej_proto = *(u16 *)(((u8 *)p_cnfhdr) + CNF_HDRLEN);
        /* check the proto the remote chocked on */
        if (rej_proto == swap16(PPP_LCP_PID))
            {
            SPYLOG("CATASTOPHIC : APPLICATION REJECTED LCP PROTOCOL\n",
                0, 0, 0, 0);
            appp_close(lpSession, layer, CP_STOPPING, CP_CLOSED);
            }
        else
        if ((rej_proto == PPP_BRCP_PID) || (rej_proto ==PPP_BR_PID))
            {
            /* turn down attempting to bring up BRCP */
            p_acb->protocols &= ~PPP_PROT_BR;
            appp_reset(lpSession, BRCP_LAYER, CP_STOPPED, TRUE);
            /* alarm unexpected link renegotiations */
            SPYLOG("Application Does NOT support Bridging, DISABLING.\n",
                0, 0, 0, 0);
            }
        else
        if ((rej_proto == swap16(PPP_IPCP_PID)) ||
            (rej_proto == swap16(PPP_IP_PID)) ||
            (rej_proto == swap16(PPP_COMP_TCP_PID)) ||
            (rej_proto == swap16(PPP_UNCOMP_TCP_PID)))
            {
            /* turn down attempting to bring up IPCP */
            p_acb->protocols &= ~PPP_PROT_IP;
            appp_reset(lpSession, IPCP_LAYER, CP_STOPPED, TRUE);
            /* alarm unexpected link renegotiations */
            SPYLOG("Application Does NOT support IP, DISABLING.\n",
                0, 0, 0, 0);
            }
        else
        if ((rej_proto == swap16(PPP_IPXCP_PID)) ||
            (rej_proto == swap16(PPP_IPX_PID)))
            {
            /* turn down attempting to bring up IPXCP */
            p_acb->protocols &= ~PPP_PROT_IPX;
            appp_reset(lpSession, IPXCP_LAYER, CP_STOPPED, TRUE);
            /* alarm unexpected link renegotiations */
            SPYLOG("Application Does NOT support IPX, DISABLING.\n",
                0, 0, 0, 0);
            }
        else
        if ((rej_proto == swap16(PPP_NBFCP_PID)) ||
            (rej_proto == swap16(PPP_NBF_PID)))
            {
            /* turn down attempting to bring up NBFCP */
            p_acb->protocols &= ~PPP_PROT_NBF;
            appp_reset(lpSession, NBFCP_LAYER, CP_STOPPED, TRUE);
            /* alarm unexpected link renegotiations */
            SPYLOG("Application Does NOT support NetBEUI, DISABLING.\n",
                0, 0, 0, 0);
            }
        return;
}
/*
*       appp_rcvunknown -- Process the received pkt with an UNKNOWN CODE
*                   from the peer.
*
*
*       The action is dependent upon our current CP state.
*       All states cause a CODE REJECT to be sent out. Other actions are
*       dependent upon the state.
*
*
*       Parameters:
*               lpSession               - Connection Call Record.
*               layer                   - Protocol layer
*               p_pkt                   - Ptr to PPP buffer to be encapsulated
*                                         and then transmitted.
*
*
*       Returns:
*               None
*
*/
void
appp_rcvunknown(PSESSIONINFO lpSession, PPP_layer_t layer, PNDIS_WAN_PACKET p_pkt)
```

-continued

```
{
    APPP_CB_t              *p_acb &(lpSession->appp);        /*   APPP CB
*/
    S_CPCTL                *p_acp = &lpSession->appp.a_cpctl[layer];
    TRACE(TR_PPP, TR_LVL3, "[APPP] (%s): Received unkown message.\n",
        (DWORD)Layers[layer], 0, 0, 0);
    switch(p_acp->cpstate)
    {
    case CP_INITIAL:       /* Unexpected event */
    case CP_STARTING:      /* Unexpected event */
        break;
    case CP_CLOSED:
    case CP_STOPPED:
    case CP_CLOSING:
    case CP_STOPPING:
    case CP_REQ_SENT:
    case CP_ACK_RCVD:
    case CP_ACK_SENT:
    case CP_OPEN:
//CIUG102196
        appp_sendcoderej(lpSession, layer, p_pkt, p_acp->cpstate);
        break;
    default:
        /* ignore */
        break;
    }
    return;
}
/*
*   appp_sendprotorej -- Send a PROT REJECT to the application
*
*       Send a PROT REJECT to the application. Layer should be inactive.
*
*       Parameters:
*               lpSession               - Connection Call Record.
*               pid                     - Protocol we are rejecting
*               p_pkt                   - Ptr to received PPP packet
*
*       Returns:
*               None
*
*/
void
appp_sendprotorej(PSESSIONINFO lpSession, u16 pid, PCOBRA_WAN_BUFFER p_pkt)
{
    PCOBRA_WAN_BUFFER      p_PR_pkt;
    S_PPPHDR               *p_ppphdr;
    u8                     *p_from;
    u8                     *p_to;
    s16                    numbytes;
    u16                    i;
    APPP_CB_t              *p_acb = &lpSession->appp;         /* APPP CB */
    TRACE(TR_PPP, TR_LVL3, "[APPP] Sending Proto-Reject for protocol %d\n",
            pid, 0, 0, 0);
    p_ppphdr = (S_PPPHDR *)p_pkt->CurrentBuffer;
    /* subtract PPP Header from packet length (total bytes in pkt) */
    p_pkt->CurrentLength -= PPP_HDRLEN;
    /* Get packet for the sending of a PROTOCOL REJECT to peer */
    if ((p_PR_pkt = ppp_get_pkt(5)) == NULL)
        {
        return;
        }
/****
    need to copy info field from RX pkt into PROTO_REJ pkt
    make sure it doesn't exceed max negotiated length
****/
    p_from = ((u8 *)p_ppphdr) + PPP_HDRLEN;
    p_to   = ((u8 *)p_PR_pkt->CurrentBuffer) + PPP_HDRLEN;
    if (p_pkt->CurrentLength < (UINT) p_acb->rem_mru)
        numbytes = (u8) p_pkt->CurrentLength;
    else
        numbytes = p_acb->rem_mru;
    for (i = 0; i < numbytes; i++)
        *p_to++ = *p_from++;
    p_PR_pkt->CurrentLength += numbytes;
    appp_sendreply
            (
            lpSession,
            LCP_LAYER,
```

```
                p_PR_pkt,
                PROTO_REJ,
                0
                );
        return;
}
```

We claim:

1. A method of providing support for network protocols for a host source of data at one end of a network, said host source of data communicating with a remote peer at another point in said network, comprising the steps of:
   (a) emulating a negotiation of a first network protocol between said host source of data and a remote router on said network, wherein said first network protocol is supported by said host source of data but is not supported by said router on said network; and
   (b) translating headers of data packets transmitted between said host source of data and said remote peer; said step of translating headers comprising the step of:
      (1) for transmission of data from said host source of data to said remote peer, translating a header associated with said first network protocol into a header associated with a second network protocol, wherein said second network protocol is supported by said remote router but not supported by said host source of data; and
      (2) for receipt of data from said remote peer destined for said host, translating a header associated with said second network protocol into a header associated with said first network protocol;
   wherein said step of emulating is performed by a spoofing module associated with said host source of data and wherein the method further comprises the step of providing user defined configuration parameters permitting said spoofing module to negotiate control protocols between said host source of data and said remote router.

2. The method of claim 1, wherein said second network protocol comprises a network protocol associated with an asynchronous mode of data transmission.

3. The method of claim 1, wherein said first network protocol comprises a protocol associated with RFC 1483.

4. The method of claim 1, wherein said second network protocol comprises a Point-to-Point Protocol.

5. The method of claim 1, wherein said host source of data and said remote peer communicate with each other over an asynchronous digital subscriber line.

6. A computer-readable storage medium containing a set of instructions for configuring a computing platform, said computing platform interfacing with a network, said set of instructions comprising:
   (a) instructions implementing a spoofing module, wherein said spoofing module provides for emulating a negotiation of a first network protocol between said computing platform and a remote router on said network, wherein said first network protocol is supported by said computing platform but is not supported by said remote router;
   (b) instructions translating headers of data packets transmitted between said computing platform and said remote router; said instructions for translating headers comprising instructions:
      (1) for transmission of data from said computing platform to said remote router, instructions translating a header associated with said first network protocol into a header associated with a second network protocol, wherein said second network protocol is supported by said remote router but not supported by said computing platform; and
      (2) for receipt of data from said remote router destined for said computing platform, instructions for translating a header associated with said second network protocol into a header associated with said first network protocol; and
   (c) wherein said spoofing module instructions also provide for receiving user defined configuration parameters to be used in emulating negotiation of control protocols between said computing platform and said remote router, such that said negotiation of said first network protocol is accomplished.

7. The computer readable storage medium of claim 6, wherein said computing platform comprises a general-purpose computer operated by a Windows operating system of Microsoft Corporation.

8. The computer readable storage medium of claim 6, wherein said computing platform comprises a computing platform integrated into a communications element interfacing with said network.

9. The computer readable storage medium of claim 8, wherein said communications element comprises a bridge.

10. In an operating system for a general-purpose computer, said general-purpose computer interfacing with a network, said operating system supporting a first network protocol but not supporting second network protocol, an improvement to said operating system, the improvement comprising:
    a spoofing module comprising (1) a network protocol emulation module for exchanging control messages associated with said first network protocol with a network protocol module implemented by said operating system to thereby emulate protocol negotiation between said general-purpose computer and a remote router; wherein said remote router supports said second network protocol but not said first network protocol; and (2) a header translation module for translating headers of packets associated with said first network protocol into headers associated with said second network protocol and vice versa; wherein said remote router forwards packets to said general purpose computer in accordance with said second network protocol, said translating of headers enabling said operating system to process packets from said router and enabling said router to process packets from said general purpose computer;
    wherein said operating system further comprises a routine displaying information on a graphical user interface for said general-purpose computer for enabling a user to enter Internet Protocol and address configuration parameters into said general-purpose computer and wherein said general purpose computer further comprises a memory storing said parameters for use by said network protocol emulation module.

11. Apparatus coupling a host computer system to a network, said host computer system generating packets of data, said host computer system implementing a transport layer protocol stack and a Point-to-Point Protocol (PPP) stack, comprising:

a PPP peer emulation module simulating a negotiation of a PPP protocol between said PPP stack and a remote router; and a packet header translation module receiving packets of data from said transport layer protocol stack having PPP headers and translating said PPP headers into RFC 1483 headers, said packet header translation module forwarding said packets of data from said transport layer protocol stack with said RFC 1483 headers to a driver for transmission on said network to said remote router;

said packet header translation module receiving packets of data from said network having RFC 1483 headers and translating said RFC 1483 headers in said packets of data from said network into PPP headers and forwarding said packets of data from said network with said PPP headers to said transport module;

wherein said PPP peer emulation module retrieves user-provided remote and local network address information from a memory in said host computer system and negotiates control protocols between said host computer system and said remote router.

12. The apparatus of claim 11, said control protocols are selected from the group of control protocols consisting of link control protocols, Internet Protocol control protocols and Internet Protocol Exchange Control Protocols.

\* \* \* \* \*